(12) United States Patent
Hansen et al.

(10) Patent No.: US 12,318,983 B2
(45) Date of Patent: Jun. 3, 2025

(54) INJECTION MOLDING APPARATUS WITH COOLED INTEGRATED ACTUATOR ELECTRONIC DRIVE

(71) Applicant: Synventive Molding Solutions, Inc., Peabody, MA (US)

(72) Inventors: Deven Hansen, Somerville, MA (US); Vito Galati, Rowley, MA (US)

(73) Assignee: SYNVENTIVE MOLDING SOLUTIONS, INC., Peabody, MA (US)

( * ) Notice: Subject to any disclaimer, the term of this patent is extended or adjusted under 35 U.S.C. 154(b) by 0 days.

(21) Appl. No.: 18/207,340

(22) Filed: Jun. 8, 2023

(65) Prior Publication Data

US 2023/0311385 A1 Oct. 5, 2023

Related U.S. Application Data

(63) Continuation of application No. PCT/US2021/062318, filed on Dec. 8, 2021.
(Continued)

(51) Int. Cl.
*B29C 45/72* (2006.01)
*B29C 45/27* (2006.01)
(Continued)

(52) U.S. Cl.
CPC ........ *B29C 45/281* (2013.01); *B29C 45/2737* (2013.01); *H02K 9/19* (2013.01);
(Continued)

(58) Field of Classification Search
CPC ............ B29C 45/2737; B29C 45/2824; B29C 45/7271
See application file for complete search history.

(56) References Cited

U.S. PATENT DOCUMENTS

| 10,322,537 B2 | 6/2019 | Tan |
| 2013/0087950 A1 | 4/2013 | Guenther |
| 2014/0037781 A1 | 2/2014 | Bazzo |

FOREIGN PATENT DOCUMENTS

| EP | 3921130 A1 | 12/2021 |
| WO | 2019/043517 A1 | 3/2019 |

OTHER PUBLICATIONS

International Search Report and Written Opinion in related international application PCT/US2021/062318 issued on Mar. 16, 2022.

*Primary Examiner* — James Sanders
(74) *Attorney, Agent, or Firm* — CANTOR COLBURN LLP

(57) ABSTRACT

An injection molding apparatus (10) comprising:
a heatable manifold (40) arranged to receive molten injection fluid (18);
one or more nozzles (20, 22, 24);
a flow channel (19, 42, 44, 46) arranged to deliver the molten injection fluid to a gate (32, 34, 36) of a mold cavity (30);
an electrical drive (940*d*, 941*d*, 942*d*) adapted to receive and distribute electrical energy in controllably varied amounts during an injection cycle;
a valve pin (1040, 1041, 1042);
an actuator (940, 941, 942) coupled to the valve pin, the actuator having:
a driver (940*dr*, 941*dr*, 942*dr*), arranged to receive the controllably varied electrical energy from the electrical drive,
an actuator housing (940*h*, 941*h*, 942*h*);
a source of heat absorptive fluid (260, 125*f*); and
at least one channel (25, 33, 125) formed in or proximate one or the other or both of the actuator housing (940*h*, 941*h*, 942*h*) and the drive mount (940*ds*, 941*ds*)
(Continued)

wherein the heat absorptive fluid absorbs heat from one or the other or both of the actuator housing and the drive mount.

20 Claims, 36 Drawing Sheets

Related U.S. Application Data

(60) Provisional application No. 63/122,618, filed on Dec. 8, 2020.

(51) Int. Cl.
*B29C 45/28* (2006.01)
*H02K 9/19* (2006.01)

(52) U.S. Cl.
CPC .................. *B29C 2045/2824* (2013.01); *B29C 2045/7271* (2013.01)

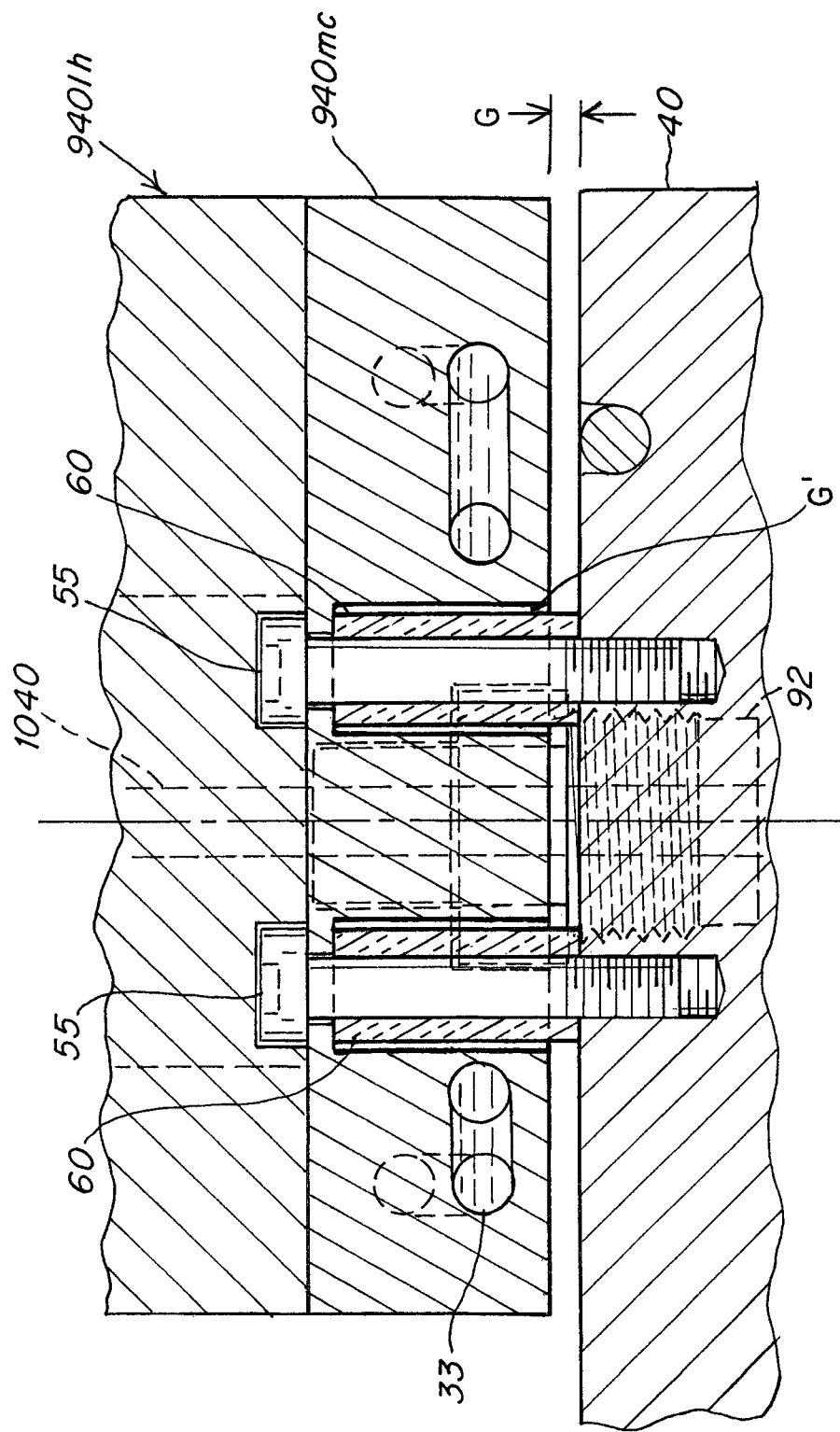

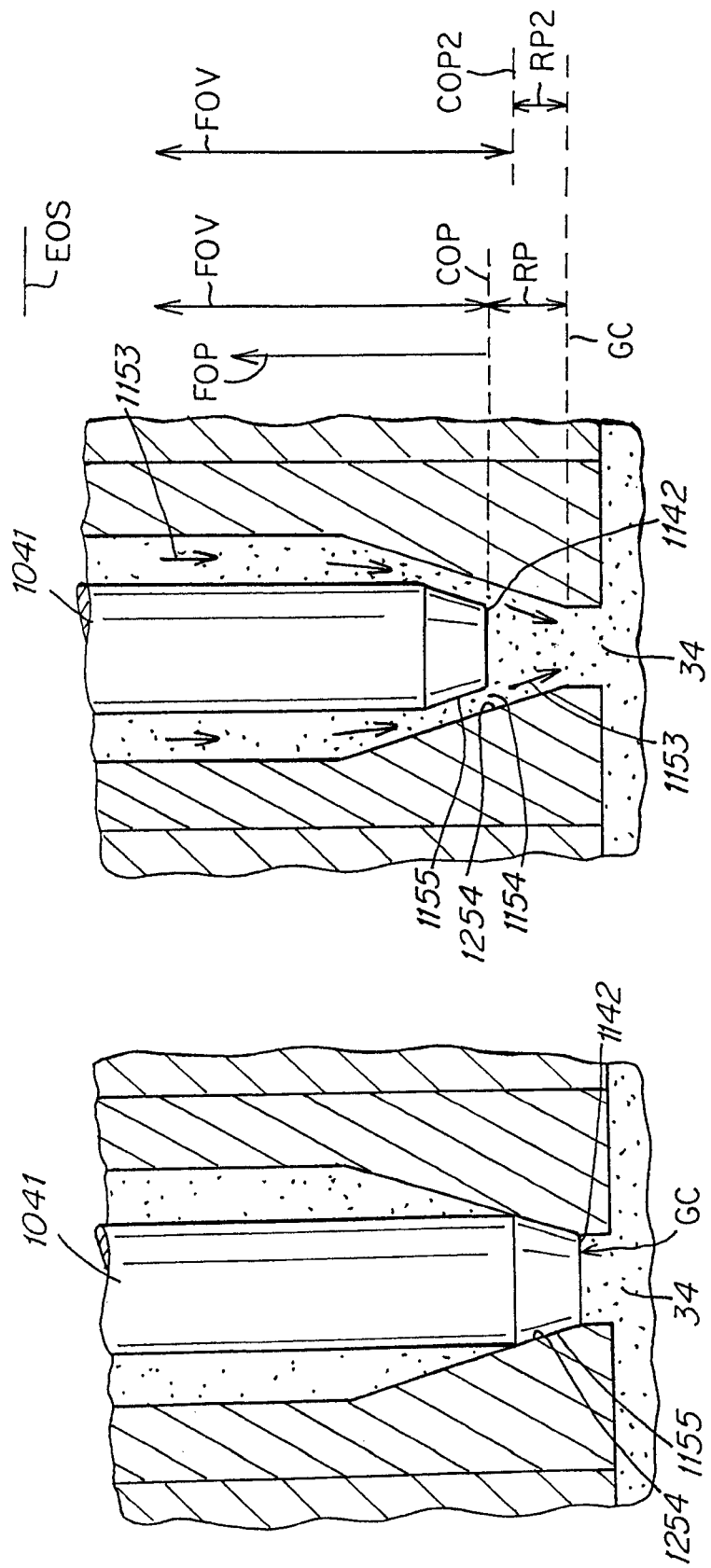

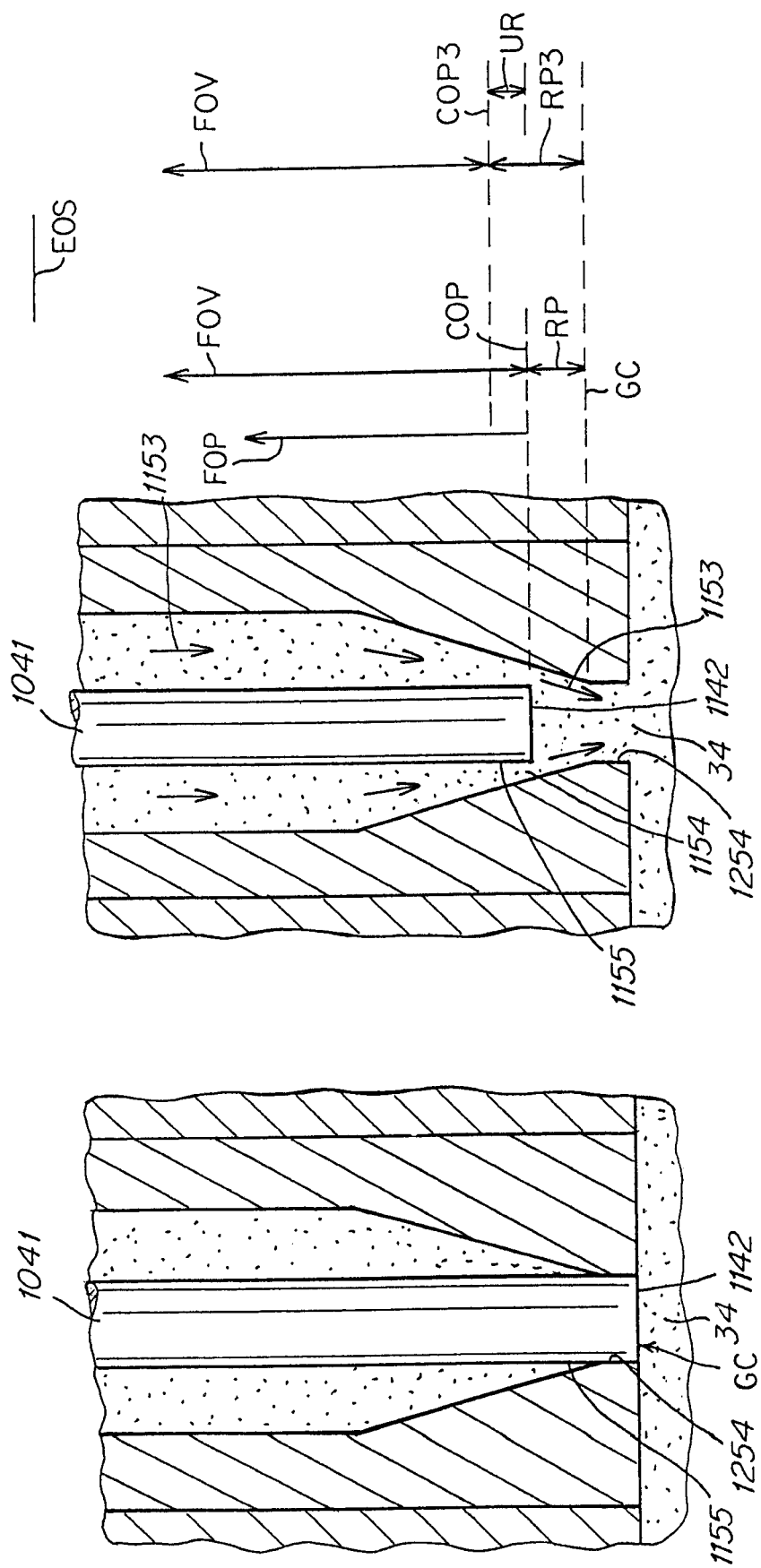

INJECTION MOLDING APPARATUS WITH COOLED INTEGRATED ACTUATOR ELECTRONIC DRIVE

RELATED APPLICATIONS

This application claims the benefit of priority to U.S. provisional application 63/122,618 filed Dec. 8, 2020, the disclosure of which is incorporated by reference in its entirety as if fully set forth herein.

This application further claims the benefit of priority to U.S. provisional application 63/226,779 filed Jul. 29, 2021, the disclosure of which is incorporated by reference in its entirety as if fully set forth herein.

The disclosures of all of the following are incorporated by reference in their entirety as if fully set forth herein: U.S. Pat. Nos. 5,894,025, 6,062,840, 6,294,122 (7018), U.S. Pat. Nos. 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. No. 6,062,840 (7052), U.S. Pat. No. 6,261,075 (7052US1), U.S. Pat. Nos. 6,599,116, 7,234,929 (7075US1), U.S. Pat. No. 7,419,625 (7075US2), U.S. Pat. No. 7,569,169 (7075US3), U.S. Pat. No. 8,297,836 (7087) U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), International Application WO2011119791 filed Mar. 24, 2011 (7094), U.S. application Ser. No. 10/101,278 filed Mar. 19, 2002 (7070) and PCT Application No. PCT/US11/062099 (7100WO0) and PCT Application No. PCT/US11/062096 (7100WO1), U.S. Pat. Nos. 8,562,336, 8,091,202 (7097US1) and U.S. Pat. No. 8,282,388 (7097US2), U.S. Pat. No. 9,205,587 (7117US0), U.S. application Ser. No. 15/432,175 (7117US2) filed Feb. 14, 2017, U.S. Pat. No. 9,144,929 (7118US0), U.S. Publication No. 20170341283 (7118US3), U.S. Pat. No. 9,724,861 (7129US4), U.S. Pat. No. 9,662,820 (7129US3), international application WO2014172100 (7131WO0), Publication No. WO2014209857 (7134WO0), international application WO2015066004 (7140WO0), Publication No. WO2015006261 (7135WO0), International application Publication No. WO2016153632 (7149WO2), International application publication no. WO2016153704 (7149WO4), U.S. Pat. No. 9,937,648 (7135US2), U.S. Pat. No. 10,569,458 (7162US1), International Application WO2017214387 (7163WO0), International Application PCT/US17/043029 (7165WO0) filed Jul. 20, 2017, International Application PCT/US17/043100 (7165WO1), filed Jul. 20, 2017 and International Application PCT/US17/036542 (7163WO0) filed Jun. 8, 2017 and International Application WO2018129015 (7169WO0), International application WO2018148407 (7170WO0), International application WO2018148407 (7171WO0), international application WO2018175362 (7172WO0), international application WO2018194961 (7174WO0), international application WO2018200660 (7176WO0), international application WO2019013868 (7177WO0), international application WO2019100085 (7178WO0), international application WO2020176479 (7185WO0), international application WO2021/034793 (7187WO0), international application WO2021080767 (7188WO0).

BACKGROUND OF THE INVENTION

Injection molding systems have been developed for performing injection molding cycles controlled by an electric motor actuator mounted for protection from overheating. The electrical drive systems and devices, typically including or containing an electrical interface, pulse-width modulator, inverter, comparator or the like, that are used in such prior systems are mounted in a location or environment in, on or around the system that is relatively cool, insulated or isolated from direct thermal communication or contact with the actuator or with the fluid distribution manifold that is typically heated to exceptionally high or elevated temperatures.

SUMMARY OF THE INVENTION

In accordance with the invention there is provided an injection molding apparatus, comprising:

a heatable manifold (40) arranged to receive molten injection fluid (18) from an injection molding machine (13) and substantially maintain the molten injection fluid at a selected temperature;

one or more nozzles (20, 22, 24);

a flow channel (19, 42, 44, 46) formed through the manifold and at least one of the one or more nozzles, the flow channel arranged to pass the molten injection fluid received by the manifold and deliver the molten injection fluid to a gate (32, 34, 36) of a mold cavity (30);

an electrical drive (940*d*, 941*d*, 942*d*) having an interface arranged to receive and distribute electrical energy in controllably varied amounts during an injection cycle;

a valve pin (1040, 1041, 1042));

an actuator (940, 941, 942) coupled to the valve pin and arranged to control a flow of molten injection fluid toward the mold cavity (30) by controllably moving the valve pin, the actuator having:

a driver (940*dr*, 941*dr*, 942*dr*), arranged to receive the controllably varied electrical energy from the electrical drive (940*d*, 941*d*, 942*d*) and drive the actuator (940, 941, 942) in response to the controllably varied electrical energy from the electrical drive; and an actuator housing (940*h*, 941*h*, 942*h*) that houses the driver (940*dr*, 941*dr*, 942*dr*), wherein the electrical drive (940*d*, 941*d*, 942*d*) is housed within or by the actuator housing (940*h*, 941*h*, 942*h*) or mounted on or to the actuator housing via a drive mount (20, 940*ds*, 941*ds*);

a source of heat absorptive fluid (260, 125*f*); and at least one channel (25, 33, 125) formed in or proximate one or the other or both of the actuator housing (940*h*, 941*h*, 942*h*) and the drive mount (940*ds*, 941*ds*) and sealably interconnected to the source, wherein concurrent the injection cycle, the heat absorptive fluid is routed through the at least one channel (25, 33, 125) in a flow that absorbs heat from one or the other or both of the actuator housing and the drive mount.

In such an apparatus the drive mount (940*ds*, 941*ds*) is typically mounted in heat communication or contact with the actuator housing (940*h*, 941*h*, 942*h*).

One or the other or both of the actuator housing (20, 940*h*, 941*h*, 942*h*) and the electrical drive (940*d*, 941*d*, 942*d*) are typically in substantial heat communication with the heatable manifold (40).

The at least one channel (25, 33, 125) can be disposed within a heat conductive housing body (20, 940*ds*, 941*ds*)

mountable in heat communication or contact with the actuator housing (940*h*, 941*h*, 942*h*).

The heat conductive housing body (20, 940*ds*, 941*ds*) can be adapted to be readily attachable to and detachable from the actuator housing (940*h*, 941*h*, 942*h*).

The at least one channel (25, 33, 125) can be disposed within a heat conductive mount (940*mc*, 940*mc*1, 940*mc*2, 941*mc*, 942*mc*) mounted in heat conductive communication or contact with the heatable manifold (40).

The heat conductive mount (940*mc*, 940*mc*1, 940*mc*2, 941*mc*, 942*mc*) can be adapted to be readily attachable to and detachable from the heatable manifold (40)

One or more of the actuator housing (20, 940*h*, 941*h*, 942*h*) and the electrical drive (940*d*, 941*d*, 942*d*) can be mounted in heat conductive communication or contact with the heat conductive mount (940*mc*, 940*mc*1, 940*mc*2, 941*mc*, 942*mc*).

One or more of the actuator housing (20, 940*h*, 941*h*, 942*h*) and the electrical drive (940*d*, 941*d*, 942*d*) can be adapted to be readily attachable to and detachable from the heat conductive mount (940*mc*, 940*mc*1, 940*mc*2, 941*mc*, 942*mc*).

Such an apparatus as above can further comprise a linear travel converter (15) interconnected to the actuator (940, 941, 942) in an arrangement that allows the valve pin (1040, 1041, 1042) to be driven along a linear axis (X) that is either non coaxial or coaxial relative to a drive axis (Y) of the actuator.

In such an apparatus the at least one channel (25, 33, 125) can be disposed within a heat conductive mount (940*mc*, 940*mc*1, 940*mc*2, 941*mc*, 942*mc*) mounted in heat conductive communication or contact with the heatable manifold (40) wherein the linear travel converter (15) is adapted to be mounted in heat conductive communication with the heat conductive mount (940*mc*, 940*mc*1, 940*mc*2, 941*mc*, 942*mc*).

In such an embodiment, the linear travel converter (15) is typically adapted to be readily attachable to and detachable from the heat conductive mount (940*mc*, 940*mc*1, 940*mc*2, 941*mc*, 942*mc*).

In such an apparatus the actuator typically further comprises:
  a drive member (150, 940*l*, 940*ld*); and
  a drive mechanism, the drive mechanism being either a transmission (190, 191) that permits the driver (100, 200, 940*dr*, 941*dr*, 942*dr*) to rotatably drive the drive member (150) linearly via a rotor (250, 940*r*, 941*r*, 942*r*) or a linear drive mechanism (940*dr*, 940*ld*) that permits the driver to directly drive the drive member (940*ld*) linearly.

One or the other or both of the actuator housing (20, 940*h*, 941*h*, 942*h*) and the drive mount (940*ds*, 941*ds*) are typically comprised, at least in part, of a metal material and can be mounted in substantially direct metal to metal heat conductive communication or contact with the heatable manifold (40).

One or the other or both of the actuator housing (20, 940*h*, 941*h*, 942*h*) and the drive mount (940*ds*, 941*ds*) can be mounted in substantially direct metal to metal heat conductive communication or contact with the heatable manifold (40) via a mount (60, 60*s*) that is comprised of either a heat insulative material or a heat conductive material.

The electrical drive (940*d*, 941*d*, 942*d*) typically includes a pulse-width modulator (PWM) that converts received electrical energy into a reciprocating voltage waveform signal, the reciprocating voltage waveform signal being adapted to drive a corresponding phase-coil of the actuator driver (940*dr*, 941*dr*, 942*dr*).

The linear travel converter typically further comprises:
  a converter housing (120, 940*lh*) mounted in direct or indirect heat conductive communication or contact with the heatable manifold (40) and the actuator housing (20, 940*h*, 941*h*, 942*h*).

Such an apparatus as described above can further comprise:
  one or more sensors (950, 951, 952) arranged to generate one or more sensor signals indicative of one or more of:
  a rotational position of the actuator (940, 941, 942);
  a linear position of the actuator (940, 941, 942);
  a position of a valve pin (1040, 1041, 1042) associated with the actuator (940, 941, 942);
  a pressure of the molten injection fluid (18) within the flow channel (19);
  a temperature of the molten injection fluid (18) within the flow channel (19) of the heatable manifold (40);
  a pressure of the molten injection fluid (18) within a nozzle channel (42, 44, 46);
  a temperature of the molten injection fluid (18) within the nozzle channel (42, 44, 46;
  a pressure of the molten injection fluid (18) within the mold cavity (30);
  a temperature of the molten injection fluid (18) within the mold cavity (30);
  a pressure of the molten injection fluid (18) within a barrel of the injection molding machine (13); and
  a temperature of the molten injection fluid (18) within the barrel of the injection molding machine (13); and
  an actuator controller (16) arranged, in response to at least one of the one or more sensor signals, to direct at least one operation of the actuator (5, 940, 941, 942) or its associated valve pin (1040, 1041, 1042), the at least one operation including to:
travel during the injection cycle to positions that correspond to a predetermined profile, wherein the predetermined profile is associated with a set of injection fluid pressures, linear or rotational pin positions, linear actuator or valve pin positions, barrel screw positions, barrel pressures or actuator drive fluid pressures corresponding to the at least one of the one or more sensor signals; or,
withdraw from a closed gate position upstream at a reduced velocity over a selected path of upstream travel and subsequently at a selected higher velocity than the reduced velocity; or,
travel downstream at a reduced velocity over a selected path of downstream travel where a distal tip end of the valve pin travels to a gate closed position; or,
travel upstream or downstream to an intermediate position between a gate closed position and a fully upstream position, wherein the valve pin is maintained in the intermediate position for a selected period of time during the injection cycle, and wherein, in the intermediate position, the distal tip end of the valve pin restricts flow of the molten injection fluid to less than a maximum flow.

In another aspect of the invention there is provided an injection molding method, comprising:
  providing an actuator housing (940*h*, 941*h*, 942*h*) adapted to support an electrical drive (940*d*, 941*d*, 942*d*), wherein supporting the electrical drive includes housing the electrical drive within the actuator housing or mounting the electrical drive on or to the actuator housing via a drive mount (941*ds*, 942*ds*);

heating a manifold (40);

receiving at the manifold a molten injection fluid (18) from an injection molding machine (13);

substantially maintaining the molten injection fluid at a selected temperature;

receiving the molten injection fluid from the manifold in a flow channel (19, 42, 44, 46) formed through the manifold (40) and at least one nozzle 20, 22, 24);

delivering the molten injection fluid to a gate (32, 34, 36) of a mold cavity (30);

distributing, with the electrical drive (940*d*, 941*d*, 942*d*), electrical energy in controllably varied amounts during the course of an injection cycle to a driver (940*dr*, 941*dr*, 942*dr*);

driving an actuator in response to the controllably varied electrical energy;

moving a valve pin (1040, 1041, 1042) with the actuator and thereby controlling a flow of molten injection fluid (18) toward the mold cavity (30);

concurrent the injection cycle, routing a heat absorptive fluid (260) through at least one channel (25, 33, 125) formed in or proximate one or the other or both of the actuator housing (940*h*, 941*h*, 942*h*) and the drive mount (940*ds*, 941*ds*); and absorbing heat from one or the other or both of the actuator housing and the drive mount into the heat absorptive fluid (260).

In such a method driving the actuator (940, 941, 942) can include:

driving a drive member (150) along a linear drive axis (Y); and driving the valve pin (1040, 1041, 1042) along a non-coaxial pin axis (X).

In such a method driving the actuator (940, 941, 942) can include:

driving a drive member (940*l*, 940*ld*) along a linear drive axis (X); and driving the valve pin (1040, 1041, 1042) along a coaxial pin axis (X).

In another aspect of the invention there is provided an injection molding apparatus (10) comprising an injection molding machine (13) that injects a flow of injection fluid (18) to a heated manifold (40) that distributes the injection fluid (18) to a flow channel that delivers the injection fluid to a gate (32, 34, 36) of a mold cavity (30), the injection molding apparatus (10) comprising:

an actuator (5, 940, 941, 942) comprised of a rotor (250, 940*r*, 941*r*, 942*r*) having a drive axis (X, Y) and a driver (100, 200, 940*dr*, 941*dr*, 942*dr*) interconnected to the rotor (250, 940*r*, 941*r*, 942*r*) adapted to controllably drive the rotor rotatably around the drive axis (X, Y), the driver (100, 200, 940*dr*, 941*dr*, 942*dr*) receiving electrical energy or power from an electrical drive (940*d*, 941*d*, 942*d*), the electrical drive (940*d*, 941*d*, 942*d*) comprising an interface that receives and controllably distributes electrical energy or power in controllably varied amounts during the course of an injection cycle to the driver (100, 200, 940*dr*, 941*dr*, 942*dr*), the actuator having an actuator housing (20, 940*h*, 941*h*, 942*h*) that houses the rotor (250, 940*r*, 941*r*, 942*r*) and the driver (100, 200, 940*dr*, 941*dr*, 942*dr*), the actuator housing being adapted to support the rotor (250, 940*r*, 941*r*, 942*r*), the electrical drive (940*d*, 941*d*, 942*d*) being housed within or by the actuator housing (20, 940*h*, 941*h*, 942*h*) or being mounted on or to the housing (20, 940*h*, 941*h*, 942*h*) via a drive mount (940*ds*, 941*ds*), wherein one or the other or both of the actuator housing (20, 940*h*, 941*h*, 942*h*) and the drive mount (940*ds*, 941*ds*) include a tube or channel (25) sealably interconnected to a source (260) of heat absorptive fluid (25*f*) in an arrangement such that the heat absorptive fluid (25*f*) is routed through the tube or channel (25) in a flow that absorbs heat from one or the other or both of the actuator housing (20, 940*h*, 941*h*, 942*h*) and the drive mount (940*ds*, 941*ds*).

In such an apparatus one or the other or both of the actuator housing (20, 940*h*, 941*h*, 942*h*) and the drive mount (940*ds*, 941*ds*) can be mounted in proximity or disposition relative to the heated manifold (40) such that one or the other or both of the housing (20, 940*h*, 941*h*, 942*h*) and the electrical drive (940*d*, 941*d*, 942*d*) is or are in substantial heat communication or contact with the heated manifold (40).

The electric actuators (5, 940, 941, 942) typically comprise a driver (100, 200, 940*dr*, 941*dr*, 942*dr*) comprised of one or more of a stator and armature that are interconnected to a rotatably mounted rotor or shaft (250, 940*r*, 941*r*, 942*r*) such that when the drivers (100, 200, 940*dr*, 941*dr*, 942*dr*) rotate on application and receipt of electrical energy or power, the rotor (250, 940*r*, 941*r*, 942*r*) are rotated.

The driver (100, 200, 940*dr*, 941*dr*, 942*dr*) is typically interconnected to the rotor (250, 940*r*, 941*r*, 942*r*) and adapted to controllably drive the rotor (250, 940*r*, 941*r*, 942*r*) rotatably around the drive axis (X, Y).

The driver (100, 200, 940*dr*, 941*dr*, 942*dr*) typically receives electrical energy or power from the electrical drive (940*d*, 941*d*, 942*d*).

The electrical drive typically receives electrical energy or power from a power source (PS) and controllably distributes the received electrical energy or power in controllably varied amounts during the course of an injection cycle to the drivers (100, 200, 940*dr*, 941*dr*, 942*dr*).

The driver (100, 200, 940*dr*, 941*dr*, 942*dr*) is preferably adapted to drivably rotate (940*rt*, 941*rt*, 942*rt*) the rotor (250, 940*r*, 941*r*, 942*r*).

One or the other or both of the actuator housing (20, 940*h*, 941*h*, 942*h*) and the drive mount (940*ds*, 941*ds*) is typically thermally or heat conductive such that the housing receives heat or thermal energy from the manifold (40), the housing (940*h*, 941*h*, 942*h*) being in thermally conductive communication or contact with the manifold (40).

One or the other or both of the actuator housing (20, 940*h*, 941*h*, 942*h*) and the drive mount (940*ds*, 941*ds*) can be in in a direct or indirect heat conductive communication or contact with the heated manifold (40) such that one or the other or both of the actuator housing (20, 940*h*, 941*h*, 942*h*) and the electrical drive (940*d*, 941*d*, 942*d*) are in substantial heat or thermal communication or contact with the heated manifold (40).

One or the other or both of the actuator housing (20, 940*h*, 941*h*, 942*h*) and the drive mount (940*ds*, 941*ds*) can be mounted on or to mounts (60, 940*mc*) comprised of a metal material that are mounted in direct metal to metal contact or communication with the heated manifold (40).

The electrical drive (940*d*, 941*d*, 942*d*) preferably includes a pulse-width modulator (PWM) that converts received electrical energy or power into sinusoidal voltage waveforms, each sinusoidal voltage waveform being adapted to drive a corresponding phase-coil of the actuator driver (940*dr*, 941*dr*, 942*dr*).

The pulse-width modulator (PWM) typically comprises an inverter or a comparator.

The pulse width modulator (PWM) typically comprises a three-phase inverter that converts electrical energy or power received from the interface into three sinusoidal voltage waveforms, each one of the three sinusoidal voltage waveforms being adapted to drive a corresponding one of three phase-coils of the actuator driver.

The electrical energy or power received at or by the pulse width modulator (PWM) can comprise a DC bus voltage.

The interface of the electrical drive (940*d*, 941*d*, 942*d*) can be adapted to receive one or more control signals from a controller (16) of the injection molding apparatus (10) and to convert electrical energy or power received the power source (PS) into sinusoidal waveforms based on the one or more control signals.

The interface is typically comprised of the pulse width modulator (PWM) which converts electrical energy or power received from the power source into sinusoidal waveforms based on the one or more control signals.

The one or more control signals received by the interface can contain control information causing the pulse width modulator (PWM) to convert the received electrical energy or power into sinusoidal waveforms adapted to drive the corresponding phase-coils of the actuator driver to adjust one or more of a position, a velocity or torque of the actuator rotor (250, 940*r*, 941*r*, 942*r*).

The one or more control signals can comprise analog electrical signals received at the electrical drive from the controller (16).

The electrical drive (940*d*, 941*d*, 942*d*) can comprise one or the other or both of a digital signal receiving (16*r*) and transmitting (16*s*) device, wherein: the digital signal receiving and transmitting device is adapted to receive (16*r*) and transmit (16*s*) digital signals between the electrical drive (940*d*, 941*d*, 942*d*) and the controller (16) of the injection molding apparatus (10); and wherein, the digital signals include the one or more control signals, where the one or more control signals are digital control signals received from the controller.

The digital control signals typically include one or more of differential position commands, differential current commands, and differential velocity commands.

The digital signal receiving and transmitting device (16*r*, 16*s*) is preferably adapted to receive digital signals from the actuator, wherein: the digital signals received from the actuator include one or more feedback signals corresponding to operation of one or more of the actuator and the actuator rotor.

The pulse width modulator (PWM) typically converts the electrical energy or power received from the interface into sinusoidal waveforms adapted to drive the corresponding phase-coils of the actuator driver based at least in part on the one or more feedback signals.

The one or more feedback signals received from the actuator typically includes one or more of an incremental feedback signal and an absolute feedback signal.

The actuator housing (20, 940*h*, 941*h*, 942*h*) of the actuator can be interconnected to a linear travel converter (15, 940*l*, 9411, 9421) in an arrangement wherein the valve pin (1040, 1041, 1042) is adapted to be driven along a linear axis (XX) that is non coaxial relative to the drive axis (Y) of the rotor (250, 940*r*, 941*r*, 942*r*), the linear travel converter (15) having a linear drive member, (940*l*, 9411, 9421) being mounted on or to or disposed in heat conductive communication with the heated manifold (40).

The linear travel converter (15, 940*l*, 9411, 9421) is typically mounted on or to one or the other or both of the heated manifold (40) or a clamping plate (80).

The linear travel converter typically includes a converter housing (120, 940*lh*) mounted in direct or indirect heat conductive contact to or with the heated manifold (40), the actuator housing (20, 940*h*, 941*h*, 942*h*) being connected to the converter housing (120, 940*lh*) in thermally conductive contact therewith.

The linear travel converter typically includes a converter housing (940*lh*) comprised of a metal material that is mounted in direct metal to metal contact or communication with the heated manifold (40).

In such an embodiment the linear travel converter housing (940*lh*) is typically mounted on or to an actively cooled mount (940*mc*, 940*mc*1) that is mounted on or to the heated or heatable manifold (40)

The actuator housing (940*h*, 941*h*, 942*h*) is typically mounted on or to a clamping plate (80) in an arrangement such that one or the other or both of the actuator housing (20, 940*h*, 941*h*, 942*h*) and the electrical drive (940*d*, 941*d*, 942*d*) are in substantial heat or thermal communication with the heated manifold (40).

In another aspect of the invention there is provided an injection molding apparatus (10) comprising an injection molding machine (13) that injects a flow of injection fluid (18) to a heated manifold (40) that distributes the injection fluid (18) to a flow channel that delivers the injection fluid to a gate (32, 34, 36) of a mold cavity (30), the injection molding apparatus (10) comprising:

an actuator (5, 940, 941, 942) comprised of a rotor (250, 940*r*, 941*r*, 942*r*) having a drive axis (X, Y) and a driver (100, 200, 940*dr*, 941*dr*, 942*dr*) interconnected to the rotor (250, 940*r*, 941*r*, 942*r*) adapted to controllably drive the rotor rotatably around the drive axis (X, Y), the driver (100, 200, 940*dr*, 941*dr*, 942*dr*) receiving electrical energy or power from an electrical drive (940*d*, 941*d*, 942*d*), the electrical drive (940*d*, 941*d*, 942*d*) comprising an interface that receives and controllably distributes electrical energy or power in controllably varied amounts during the course of an injection cycle to the driver (100, 200, 940*dr*, 941*dr*, 942*dr*), the actuator having an actuator housing (20, 940*h*, 941*h*, 942*h*) that houses the rotor (250, 940*r*, 941*r*, 942*r*) and the driver (100, 200, 940*dr*, 941*dr*, 942*dr*), the actuator housing being adapted to support the rotor (250, 940*r*, 941*r*, 942*r*), the electrical drive (940*d*, 941*d*, 942*d*) being housed within or by the actuator housing (20, 940*h*, 941*h*, 942*h*) or being mounted on or to the actuator housing (20, 940*h*, 941*h*, 942*h*) via a drive mount (940*ds*, 941*ds*), the apparatus including a linear travel converter (15, 940*l*, 9411, 9421) interconnected to the rotor (250, 940*r*, 941*r*, 942*r*) in an arrangement wherein the valve pin (1040, 1041, 1042) is adapted to be driven along a linear axis (XX) that is non coaxial relative to the drive axis (Y) of the rotor (250, 940*r*, 941*r*, 942*r*), the linear travel converter (15, 940*l*, 9411, 9421) comprising a converter housing (120, 940*lh*, 941*lh*, 942*lh*) that includes a tube or channel (25) sealably interconnected to a source (260) of heat absorptive fluid (25*f*) in an arrangement such that the heat absorptive fluid (25f) is routed through the tube or channel (125) in a flow that absorbs heat from the converter housing.

The linear travel converter (15, 940l, 9411, 9421) can be mounted on or to one or the other or both of the heated manifold (40) or a clamping plate (80).

The linear travel converter can be mounted in direct or indirect heat conductive contact to or with the heated manifold (40), the actuator housing (20, 940h, 941h, 942h) being connected to the converter housing (120, 940lh) in thermally conductive contact therewith.

The converter housing (940lh) is preferably comprised of a metal material that is mounted in direct metal to metal contact or communication with the heated manifold (40).

The electric actuators (940, 941, 942) typically comprise a driver (100, 200, 940dr, 941dr, 942dr) comprised of one or more of a stator and armature that are interconnected to a rotatably mounted rotor or shaft (940r, 941r, 942r) such that when the drivers (940dr, 941dr, 942dr) rotate on application and receipt of electrical energy or power, the shafts (940r, 941r, 942r) are rotated.

The rotor (940r, 941r, 942r) typically has a drive axis (X, Y), the driver (100, 200, 940dr, 941dr, 942dr) being interconnected to the rotor (940r, 941r, 942r) and adapted to controllably drive the rotor (940r, 941r, 942r) rotatably around the drive axis Y.

The driver (100, 200, 940dr, 941dr, 942dr) typically receives electrical energy or power from the electrical drive (940d, 941d, 942d).

The electrical drive typically receives electrical energy or power from a power source (PS) and controllably distributes the received electrical energy or power in controllably varied amounts during the course of an injection cycle to the drivers (100, 200, 940dr, 941dr, 942dr).

The driver (100, 200, 940dr, 941dr, 942dr) is preferably adapted to drivably rotate (940rt, 941rt, 942rt) the rotor (250, 940r, 941r, 942r).

One or the other or both of the actuator housing (20, 940h, 941h, 942h) and the drive mount (940ds, 941ds) is typically thermally or heat conductive such that the housing receives heat or thermal energy from the manifold (40), the housing (940h, 941h, 942h) being in thermally conductive communication or contact with the manifold (40).

One or the other or both of the actuator housing (20, 940h, 941h, 942h) and the drive mount (940ds, 941ds) is preferably in a direct or indirect heat conductive communication or contact with the heated manifold (40) such that one or the other or both of the actuator housing (20, 940h, 941h, 942h) and the electrical drive (940d, 941d, 942d) are in substantial heat or thermal communication or contact with the heated manifold (40).

One or the other or both of the actuator housing (20, 940h, 941h, 942h) and the drive mount (940ds, 941ds) are typically mounted on or to mounts comprised of a metal material that are mounted in direct metal to metal contact or communication with the heated manifold (40).

The electrical drive (940d, 941d, 942d) typically includes a pulse-width modulator (PWM) that converts received electrical energy or power into sinusoidal voltage waveforms, each sinusoidal voltage waveform being adapted to drive a corresponding phase-coil of the actuator driver (940dr, 941dr, 942dr).

The pulse-width modulator (PWM) preferably comprises an inverter or a comparator.

The pulse width modulator (PWM) can comprise a three-phase inverter that converts electrical energy or power received from the interface into three sinusoidal voltage waveforms, each one of the three sinusoidal voltage waveforms being adapted to drive a corresponding one of three phase-coils of the actuator driver.

The electrical energy or power received at or by the pulse width modulator (PWM) can comprise a DC bus voltage.

The interface of the electrical drive (940d, 941d, 942d) can be adapted to receive one or more control signals from a controller (16) of the injection molding apparatus (10) and to convert electrical energy or power received the power source (PS) into sinusoidal waveforms based on the one or more control signals.

The interface is typically comprised of the pulse width modulator (PWM) which converts electrical energy or power received from the power source into sinusoidal waveforms based on the one or more control signals.

The one or more control signals received by the interface typically contains control information causing the pulse width modulator (PWM) to convert the received electrical energy or power into sinusoidal waveforms adapted to drive the corresponding phase-coils of the actuator driver to adjust one or more of a position, a velocity or torque of the actuator rotor (940r, 941r, 942r).

The one or more control signals typically comprises analog electrical signals received at the electrical drive from the controller (16).

The electrical drive (940d, 941d, 942d) typically comprises one or the other or both of a digital signal receiving (16r) and transmitting (16s) device, wherein: the digital signal receiving and transmitting device is adapted to receive (16r) and transmit (16s) digital signals between the electrical drive (940d, 941d, 942d) and the controller (16) of the injection molding apparatus (10); and wherein, the digital signals include the one or more control signals, where the one or more control signals are digital control signals received from the controller.

The digital control signals typically include one or more of differential position commands, differential current commands, and differential velocity commands.

The digital signal receiving and transmitting device (16r, 16s) is preferably adapted to receive digital signals from the actuator, wherein: the digital signals received from the actuator include one or more feedback signals corresponding to operation of one or more of the actuator and the actuator rotor.

The pulse width modulator (PWM) can convert the electrical energy or power received from the interface into sinusoidal waveforms adapted to drive the corresponding phase-coils of the actuator driver based at least in part on the one or more feedback signals.

The one or more feedback signals received from the actuator typically includes one or more of an incremental feedback signal and an absolute feedback signal.

In another aspect of the invention there is provided an injection molding apparatus (10) comprising an injection molding machine (13) that injects a flow of injection fluid (18) to a heated manifold (40) that distributes the injection fluid (18) to a flow channel that delivers the injection fluid to a gate (32, 34, 36) of a mold cavity (30), the injection molding apparatus (10) comprising:

an actuator (5, 940, 941, 942) comprised of a rotor (250, 940r, 941r, 942r) having a drive axis (X, Y) and a driver (100, 200, 940dr, 941dr, 942dr) interconnected to the rotor (250, 940r, 941r, 942r) adapted to controllably drive the rotor rotatably around the drive axis (X, Y), the driver (100, 200, 940dr, 941dr, 942dr) receiving electrical energy or power from an electrical drive (940d, 941d, 942d), the electrical drive (940*d*, 941*d*, 942*d*) comprising an interface that receives and controllably distributes electrical energy or power in controllably varied amounts during the course of an injection cycle to the driver (100, 200, 940*dr*, 941*dr*, 942*dr*), the electrical drive (940*d*, 941*d*, 942*d*) including a pulse-width modulator (PWM) that converts received electrical energy or power into sinusoidal voltage waveforms, each sinusoidal voltage waveform being adapted to drive a corresponding phase-coil of the actuator driver (100, 200, 940*dr*, 941*dr*, 942*dr*).

the actuator having an actuator housing (20, 940*h*, 941*h*, 942*h*) that houses the rotor (250, 940*r*, 941*r*, 942*r*) and the driver (100, 200, 940*dr*, 941*dr*, 942*dr*), the actuator housing being adapted to support the rotor (250, 940*r*, 941*r*, 942*r*), the electrical drive (940*d*, 941*d*, 942*d*) being housed within or by the actuator housing (20, 940*h*, 941*h*, 942*h*) or being mounted on or to the housing (20, 940*h*, 941*h*, 942*h*) via a drive mount (940*ds*, 941*ds*), wherein one or the other or both of the actuator housing (20, 940*h*, 941*h*, 942*h*) and the drive mount (940*ds*, 941*ds*) include a tube or channel (25) sealably interconnected to a source (260) of heat absorptive fluid (25*f*) in an arrangement such that the heat absorptive fluid (25*f*) is routed through the tube or channel (25) in a flow that absorbs heat from one or the other or both of the actuator housing (20, 940*h*, 941*h*, 942*h*) and the drive mount (940*ds*, 941*ds*).

Such an apparatus (10) typically further comprises one or more sensors (950, 951, 952) that detect and generate one or more sensor signals indicative of one or more of rotational or linear position of an actuator (5, 940, 941, 942) or its associated valve pin (1040, 1041, 1042), pressure or temperature of the injection fluid (18) within a fluid channel (19) of the manifold (40) or within a nozzle channel (42, 44, 46) or within the cavity (30) of the mold (33) or within a barrel of the injection molding machine (IMM), the apparatus (10) including an actuator controller (16) that receives and uses the one or more sensor signals in a program that:

instructs the actuator (5, 940, 941, 942) or its associated valve pin (1040, 1041, 1042) to travel during the course of the injection cycle to positions that correspond to a predetermined profile of injection fluid pressures, linear or rotational pin positions, linear actuator or valve pin positions, barrel screw positions, barrel pressures or actuator drive fluid pressures or that, instructs the actuator (940*e*, 941*e*, 942*e*, 940*p*, 941*p*, 942*p*) or its associated valve pin (1040, 1041, 1042) such that the valve pin is withdrawn from a closed gate position upstream at a reduced velocity over a selected path of upstream travel, or that, instructs the actuator (940*e*, 941*e*, 942*e*, 940*p*, 941*p*, 942*p*) or its associated valve pin (1040, 1041, 1042) to travel such that the valve pin is driven downstream at a reduced velocity over a selected path of travel where a distal tip end of the pin travels from upstream of the gate to a gate closed position, or that, instructs the actuator (940*e*, 941*e*, 942*e*, 940*p*, 941*p*, 942*p*) or its associated valve pin (1040, 1041, 1042) to travel such that the valve pin is driven upstream or downstream to an intermediate position between a gate closed position and a fully upstream position where the valve pin is maintained in the intermediate position for a selected period of time during the course of the injection cycle wherein, in the intermediate position, the distal tip end of the valve pin restricts flow of injection of the injection to less than a maximum flow.

In such an apparatus one or more of the valve pins (1040, 1041) have a tip end (1142, 1155), the one or more selected actuators (940, 941, 942) being controllably instructed to move an associated valve pin upstream along a path of travel between a downstream gate closed position (GC) and one or more intermediate upstream gate open positions (COP, COP2), the downstream gate closed position (GC) being a position wherein the tip end (1142, 1155) of the valve pin obstructs the gate (34, 36) to prevent fluid material from flowing into the mold cavity, the one or more intermediate upstream gate open positions (COP, COP2) being predetermined positions between the downstream gate closed position and an end of stroke position (EOS) upstream of the intermediate upstream gate open positions, wherein the gate (34, 36) is partially open when the valve pin (1040, 1041) is in the one or more intermediate upstream gate open positions (COP, COP2) and the gate is more fully open when the valve pin is in the end of stroke position, the apparatus including:

a position sensor (950, 951, 952) that senses position of a selected valve pin (1041) or an associated selected actuator (941), the controller (16) including instructions that instruct the selected actuator (951) to drive the valve pin (1041):

upstream at one or more selected intermediate velocities over the course of travel of the valve pin through the one or more intermediate upstream gate open positions in response to receipt by the controller of a signal from the position sensor that the valve pin is disposed in the one or more intermediate upstream gate open positions, upstream at a higher upstream velocity than the one or more selected intermediate velocities during the course of upstream travel of the valve pin between the one or more intermediate upstream gate open positions and the end of stroke (EOS) position.

Such an apparatus can include:

first and second actuators (940, 941) interconnected to first and second valve pins respectively (1040, 1041) having a tip end (1142, 1155), the second actuator (941) being instructed by the controller (16) to drive the second valve pin (1041) upstream along a path of travel (RP, RP2) between a downstream gate closed position (GC), one or more intermediate upstream gate open positions (COP, COP2) and an end of stroke position (EOS) at which the fluid material (18, NM, 100*b*) flows at a selected maximum rate through the gate, the downstream gate closed position (GC) being a position wherein the tip end of the valve pin obstructs the gate (32, 34) to prevent fluid material from flowing into the mold cavity, the one or more intermediate upstream gate open positions (COP, COP2) being predetermined positions between the downstream gate closed position (GC) and the end of stroke position (EOS), wherein at least one position sensor (951) senses position of the second valve pin (1041) or the second actuator (941), the controller (16) controlling movement of the second actuator (941) at least in part according to instructions that instruct the second actuator (941):

to open the second gate (34) after fluid material (100*p*) has been injected through the first gate (32) and flowed downstream through the cavity (30) and, to drive the second valve pin (1041) upstream at one or more selected intermediate velocities over the course of travel of the second valve pin (1041) through the one or more intermediate upstream gate open positions (COP, COP2) in response to a signal from the position sensor (951) that the second valve pin (1041) is disposed in a selected intermediate upstream gate open position and to drive the second valve pin (1041) at a higher velocity than the one or more selected intermediate velocities in response a signal from the position sensor (951) that the second valve pin is disposed in the selected intermediate upstream gate open position (COP, COP2).

In such an apparatus the controller (16) typically includes instructions that instruct the second actuator (941) to open the second gate (34) after the fluid material (100p) injected through the first gate (32) has flowed downstream through the cavity (30) past the second gate (34).

In another aspect of the invention there is provided a method of performing an injection molding cycle comprising operating any of the systems or apparatuses of claims 1-58 to perform an injection cycle.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, an element may be described as being substantially insulated or isolated from heat or thermal communication with another element such as a heated manifold. Or an element may be described as being in substantial heat or thermal communication with another element such as a heated manifold. In these cases the element that is described as being in substantial heat communication would be disposed relative to the heated or heat emitting component such as a heated manifold such that heat is readily conducted to the subject element. Similarly, a length or velocity or time may be described as being about a certain specified length or velocity or time. In these cases, the use of "about" to modify the characteristic permits a variance of the characteristic by up to 30 percent. Accordingly, a path length that is described as being between about 1 and about 8 mm includes a path that is between 0.7 or 1.3 mm and 5.6 or 10.4 mm.

BRIEF DESCRIPTION OF THE DRAWINGS

The accompanying drawings contain numbering of components and devices that correspond to the numbering appearing in the following Summary.

FIG. 2BB is a closeup sectional view of the standoffs or mounts by which the rotary to linear converter 940l and its housing 940lh (together with the speed reducing device 46 and actuator 940 to which the converter 940l is subassembled) is mounted to the heated manifold (40).

FIG. 2I is a sectional view of the FIG. 2H apparatus taken along lines 2I-2I.

FIGS. 14A-14B show tapered end valve pin positions at various times and positions between a starting closed position as in FIG. 14A and various upstream opened positions, RP representing a selectable path length over which the velocity of withdrawal of the pin upstream from the gate closed position to an open position is reduced relative to the velocity of upstream movement that the valve pin would normally have over the uncontrolled velocity path FOV when pin velocity is at its maximum;

FIGS. 15A-15B show an apparatus having a valve pin that has a cylindrically configured tip end, the tips ends of the pins being positioned at various times and positions between a starting closed position as in FIG. 15A and various upstream opened positions, RP wherein RP represents a path of selectable length over which the velocity of withdrawal of the pin upstream from the gate closed position to an open position is reduced relative to the velocity of upstream movement that the valve pin would normally have over the uncontrolled velocity path FOV when the pin velocity is at its maximum.

DETAILED DESCRIPTION OF THE INVENTION

Figure 1:
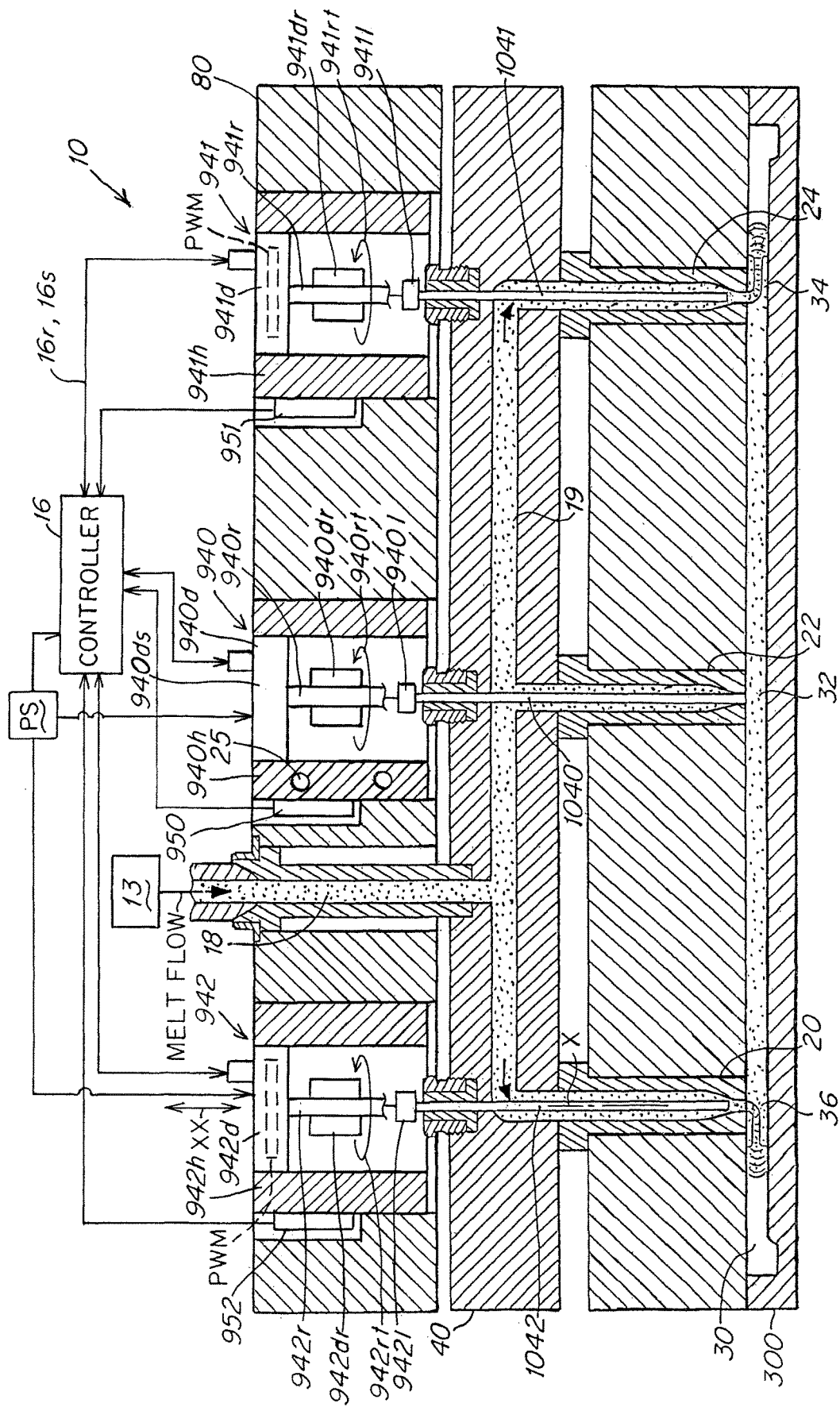
FIG. 1 is a side schematic view of an injection molding apparatus having a center valve with associated actuator (940) and two downstream valves with associated actuators (941, 942) that are opened to a mold cavity in a predetermined sequence after the center valve is first opened, the actuators (940, 941, 942) each comprising an electric motor having an electric drive (940d, 941d, 942d) that is incorporated into or physically onto the housing (940h, 941h, 942h) of the actuator such that the electric drive (940d, 941d, 942d) is in direct thermal communication with the housing (940h, 941h, 942h) of the actuator, the housings of each of the actuators (940, 941, 942) being mounted on or to or in close physical proximity to or in direct thermal communication with a heated manifold.
Figure 1A:
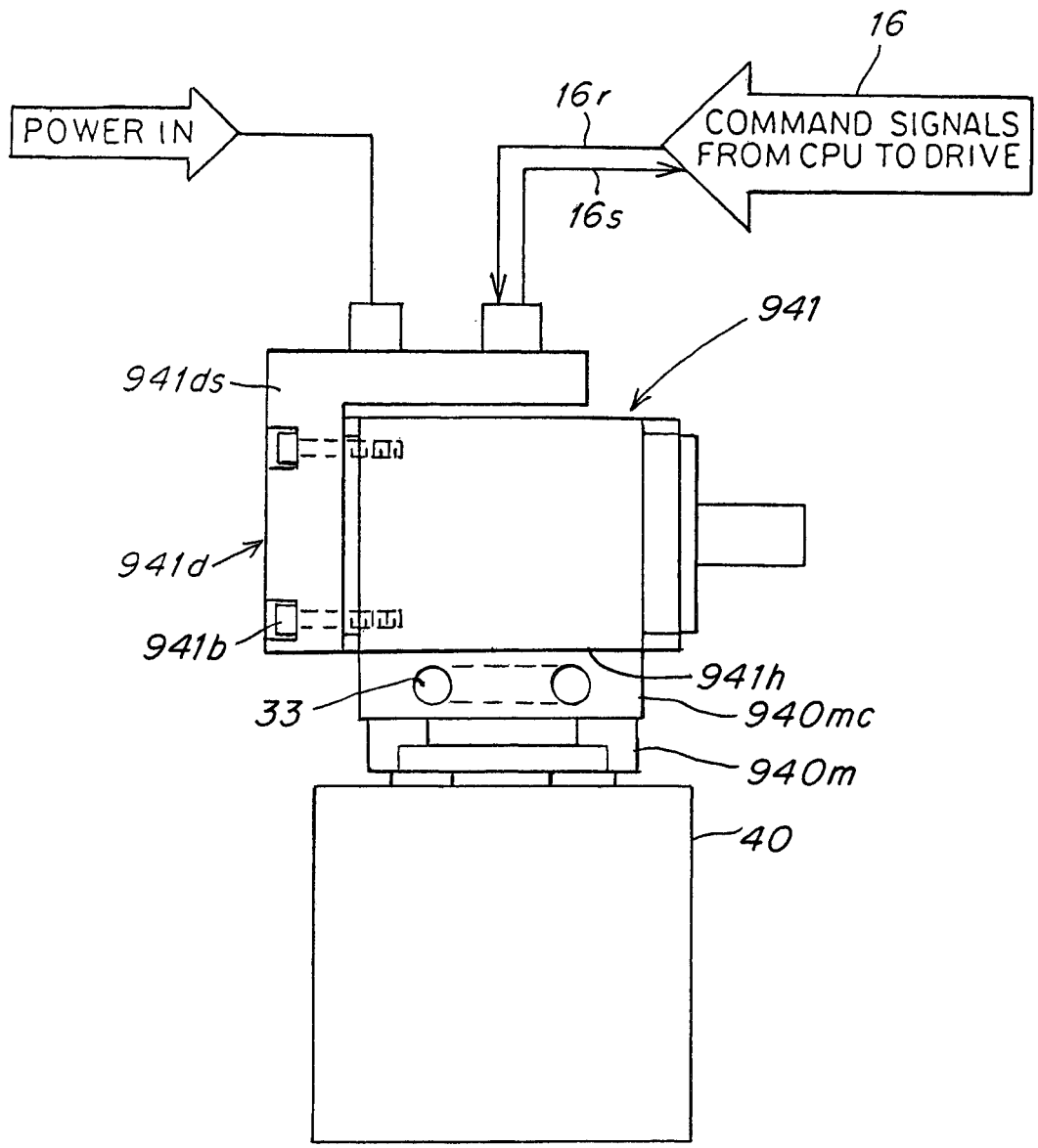
FIG. 1A is a side schematic view of an electric actuator (941) comprised of a housing (941h) and an electric drive (941d) that is readily attachable to and detachable from the housing (941h) of the actuator via a conventional attachment and detachment mechanism such as bolts (941b).
Figure 1B:
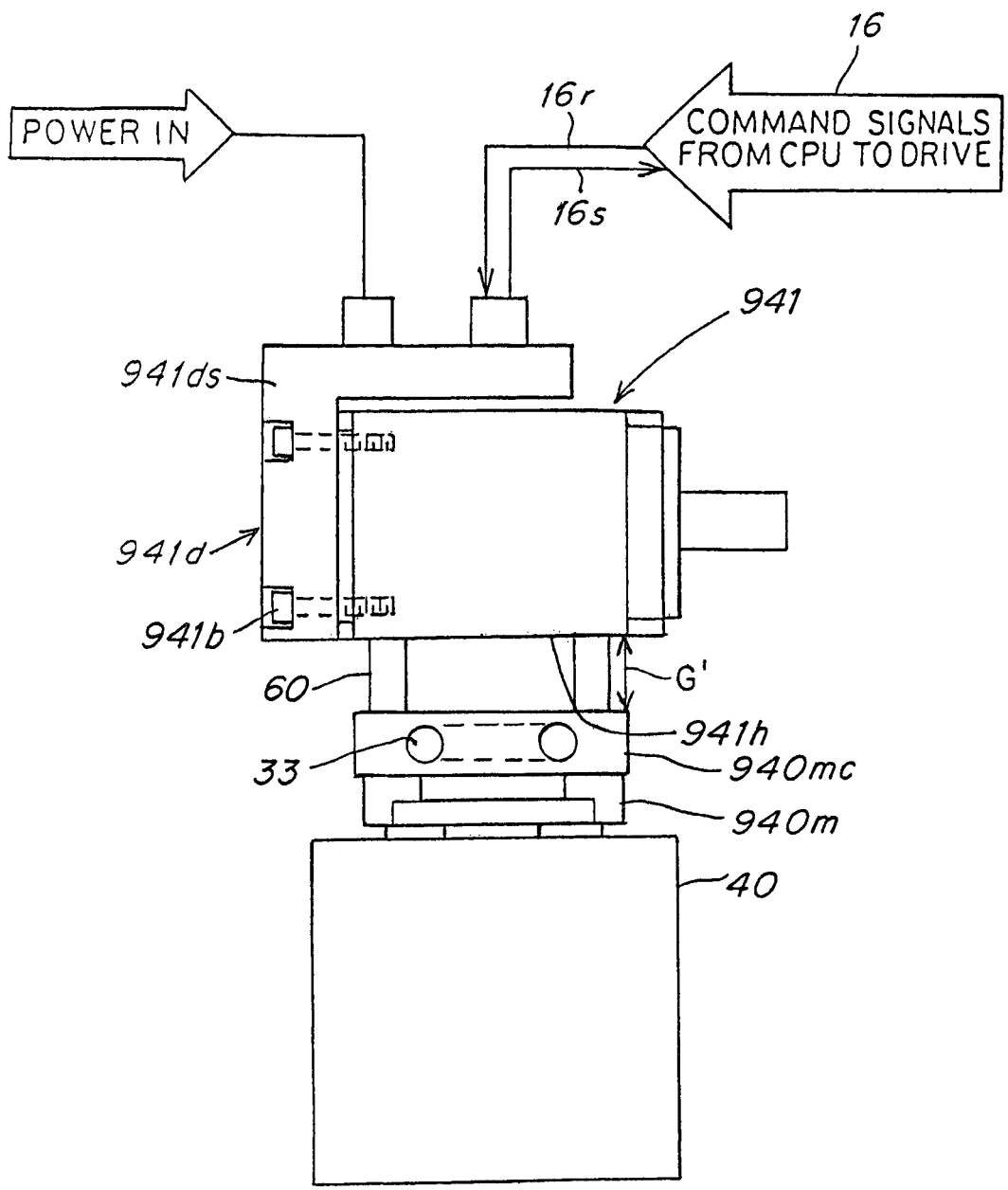
FIG. 1B is a side schematic view of an electrical actuation (941) assembled to a heated manifold (40) via mounts (60).

FIG. 1 shows an injection molding apparatus having a center valve with associated actuator (940) and two downstream valves with associated actuators (941, 942) that are opened to a mold cavity 30 in a predetermined sequence as described herein after the center valve is first opened, the actuators (940, 941, 942) each comprising an electric motor having an electric drive (940d, 941d, 942d). The electric drive (940d, 941d, 942d) can be housed within the same housing (940h, 941h, 942h) as the driver components of the electric actuator (940, 941, 941), or the electric drive (940d, 941d, 942d) can be housed within a physically separate thermally conductive housing (941ds) such as shown in FIG. 1A that is readily attachable to and detachable from the housing (941h) that houses the driver components (stator, armature) and rotor component of the electric actuator via conventional device such as bolts, screws, clamps, magnets or the like (941b). As shown in FIG. 1A, the thermally conductive housing (941ds) is disposed in substantial thermally conductive communication or contact with the heated manifold (40) via the thermally conductive mounting of the thermally conductive housing (941ds) to the actuator housing (940h) which is in turn mounted via mount device (940mm) in substantial heat or thermally conductive communication or contact with the heated manifold (40).

Figure 8:
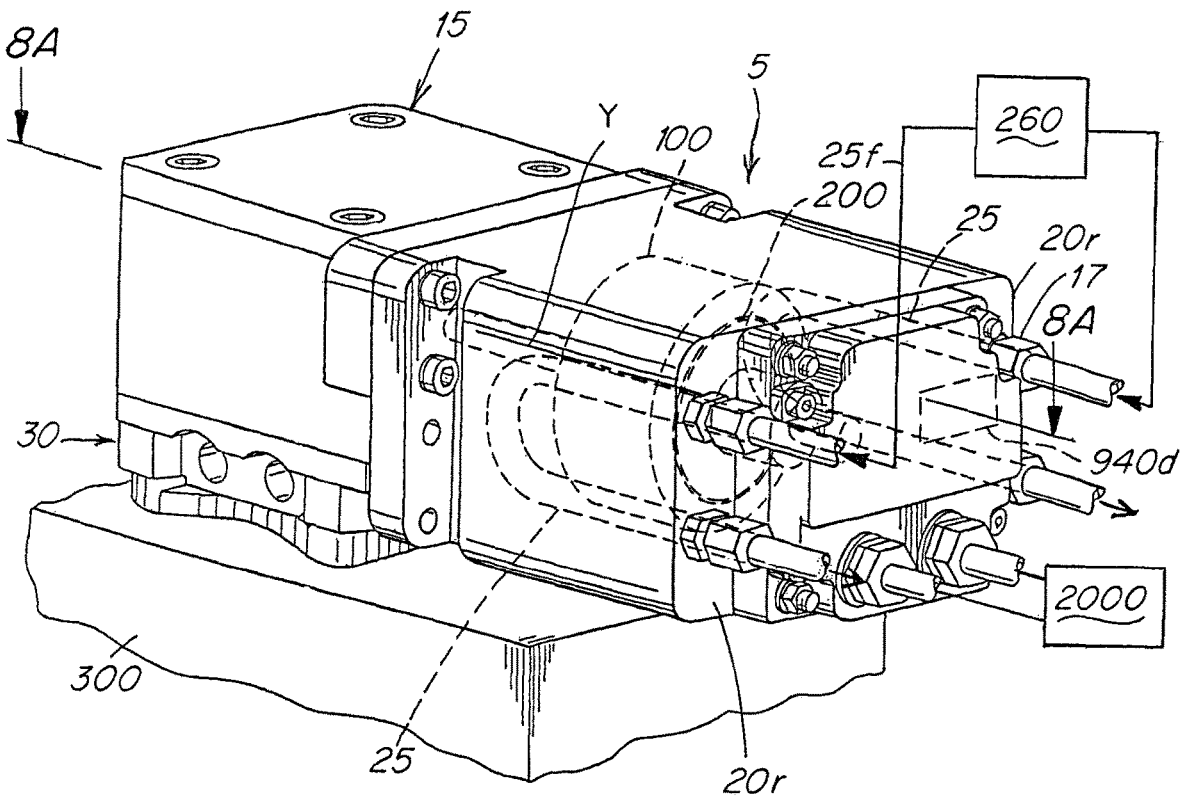
FIG. 8 is a top left rear perspective view of an injection molding system with the housing cooling components disposed and extending along a pair of opposing side radial walls of the actuator housing with actively cooled cooling channels disposed within the side radial walls.
Figure 8A:
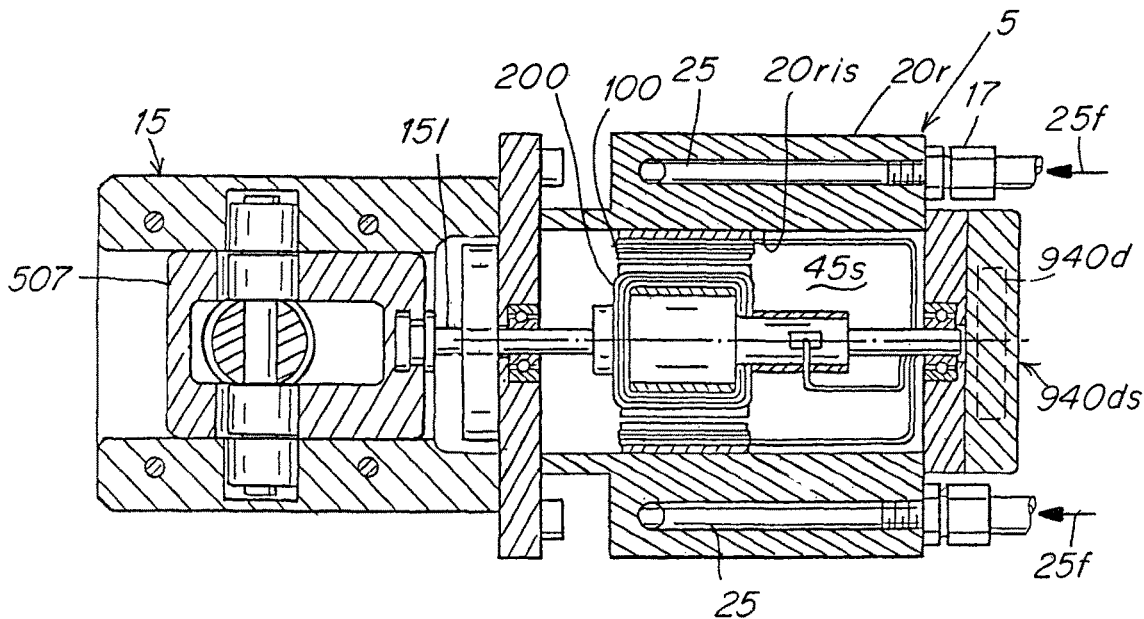
FIG. 8A is a sectional view along lines 8A-8A of FIG. 8.
Figure 9:
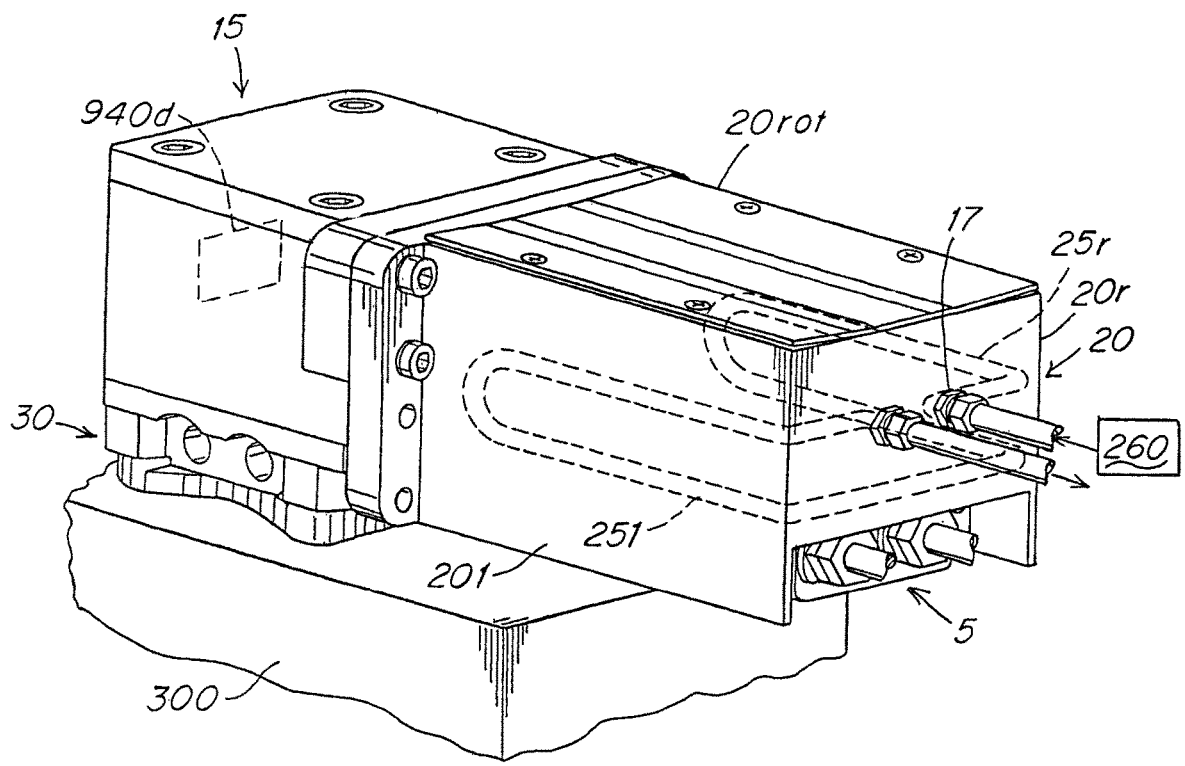
FIG. 9 is a top rear perspective view of an injection molding system having an actuator housing wall comprised of a top radial plate member that is not actively cooled and a unitary housing member comprised of axial and side radial walls that are actively cooled.

As shown in FIG. 1, the housing of the actuators (940h, 941h, 942h) can be provided with cooling channels 25 embedded within the body 940h, 941h of the housing similar to the embodiment of FIGS. 8, 8A or as described herein, a readily detachable and attachable housing body component such as component 20ao containing active cooling channels 25 as described herein can be attached to the housing body 940h, 941h, 942h. Such active cooling channels are typically interconnected to a source 260 of cooling fluid 25f that is pumped through the channels 25 thus cooling the actuator housing 940h, 941h, 942h and its associated mounted or embedded components including the electric drive 940d, 941d, 942d and the drivers 100, 200.

As shown in FIG. 1A active cooling channels 25 can alternatively be provided or disposed within the body of a drive mount 940ds, 941ds, 942ds that houses an electric drive 940d, 941d, 942d. Such a drive mount can be readily attachable to and detachable from the housing 940h, 941h, 942h of the actuator housing 940h, 941h, 942h. Such active cooling channels 25 are typically interconnected to a source 260 of cooling fluid 25f that is pumped through the channels 25 thus cooling the actuator housing 940h, 941h, 942h and its associated mounted or embedded components including the electric drive 940d, 941d, 942d and the drivers 100, 200.

Figure 4:
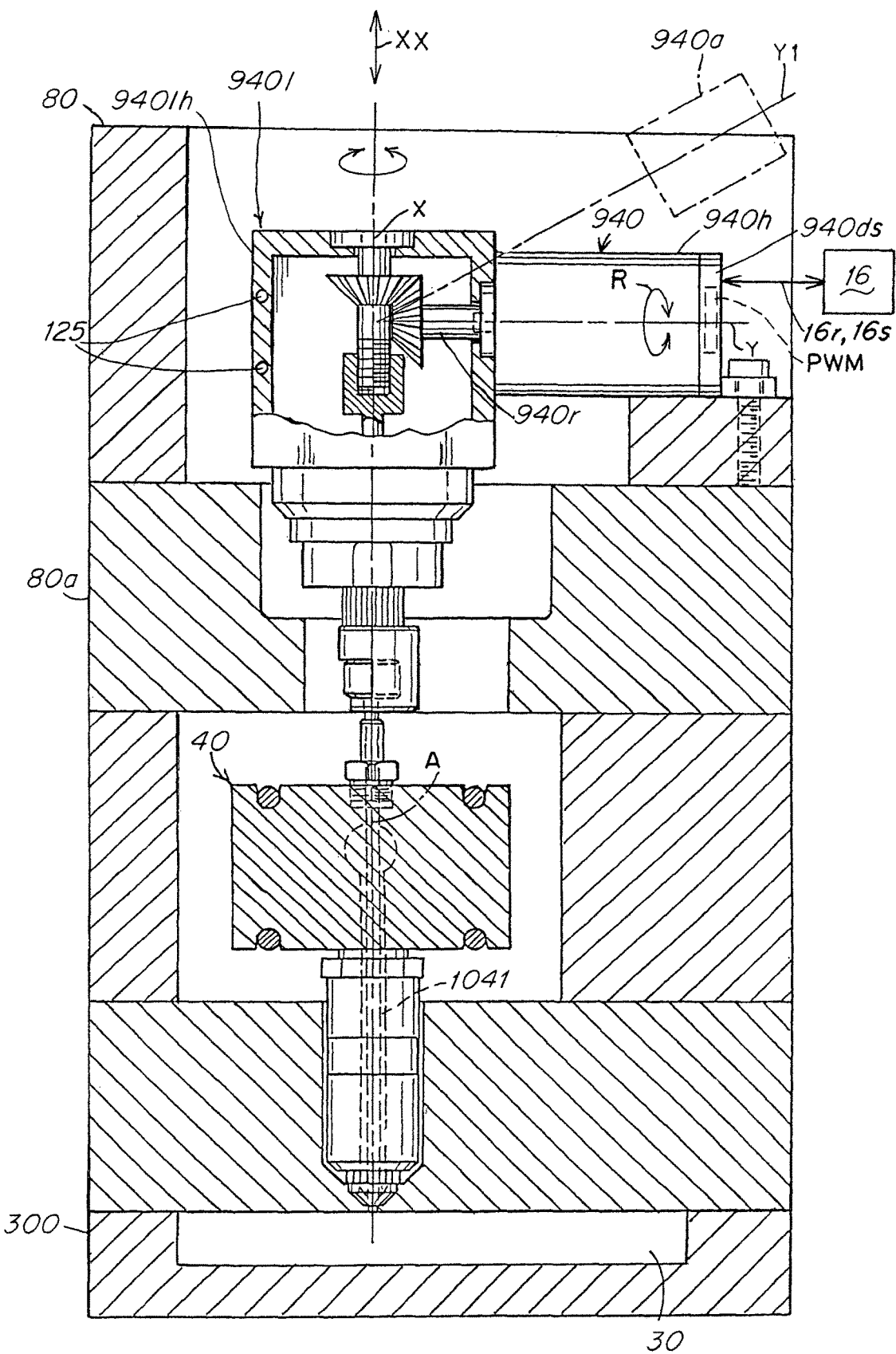
FIG. 4 is a side sectional schematic view of another electric actuator in a apparatus similar to the FIGS. 1, 2 apparatus where the actuator (940) has a drive axis Y that is arranged non-coaxially relative to the travel axis of the valve pin (1040), the actuator housing (940*h*) being mounted in one iteration (940) both to a top clamp plate (80) and to or on or in direct thermal communication with the heated manifold (40) via mounting of the actuator (940) to a linear travel converter (940*l*, 940*h*) which is in turn mounted on or to or in direct thermal communication or contact with the heated manifold (40). In another iteration (940*a*) the housing of the actuator may or may not be mounted also to the top clamp plate 80.
Figure 12:
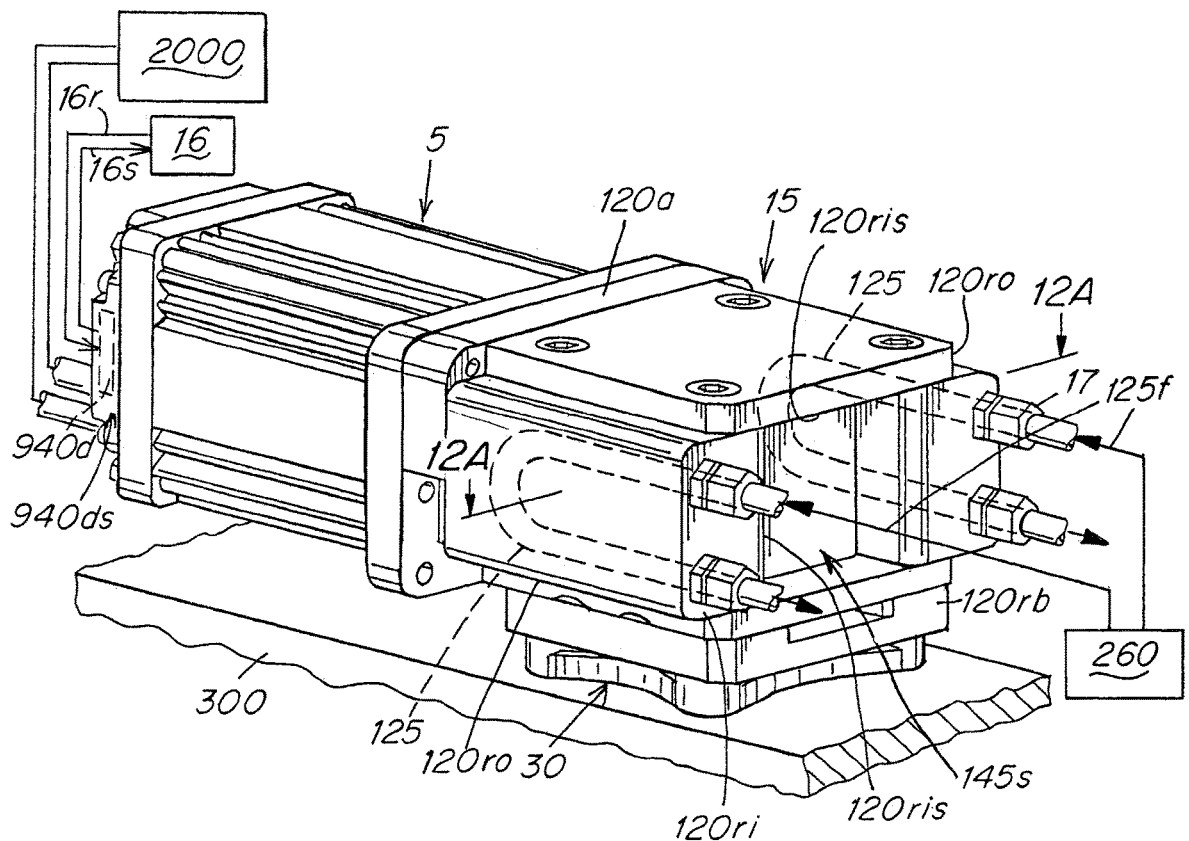
FIG. 12 is a front right perspective view of an injection molding system showing an electric motor actuator mounted to a linear to linear converter 15 having a converter housing 120 having opposing left and right radial side walls that contain actively cooled cooling channels, the side walls being assemblable together with top and bottom axial wall plates that are not actively cooled.
Figure 12A:
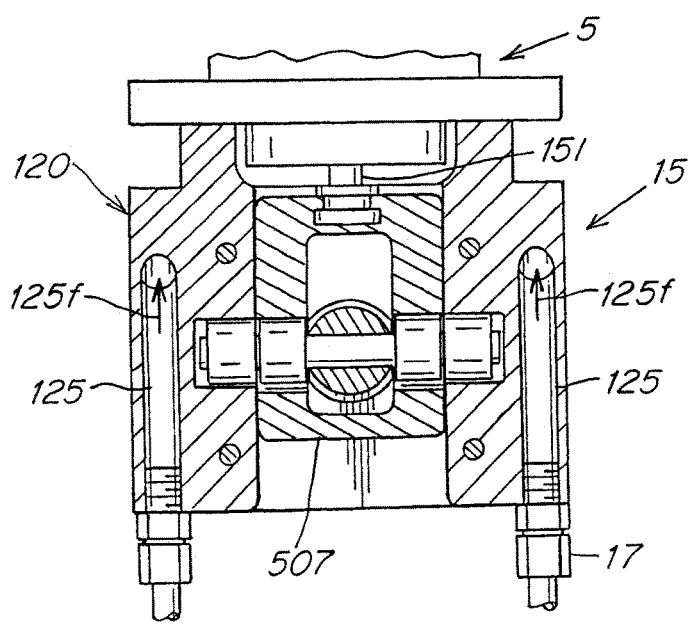
FIG. 12A is a sectional view taken along lines 12A of FIG. 12.

Similarly where a rotary to linear travel converter 15 with linear drive member 940l, FIGS. 4, 12 is interconnected to an actuator housing 20, 940, the housing 940lh, 120ro of the linear travel converter can contain cooling channels 25 that are interconnected to a source 260 of cooling fluid 25f that is pumped through the channels 25 thus cooling the actuator housing 940h, 941h, 942h and its associated mounted or embedded components including the electric drive 940d, 941d, 942d and the drivers 100, 200.

Figure 4A:
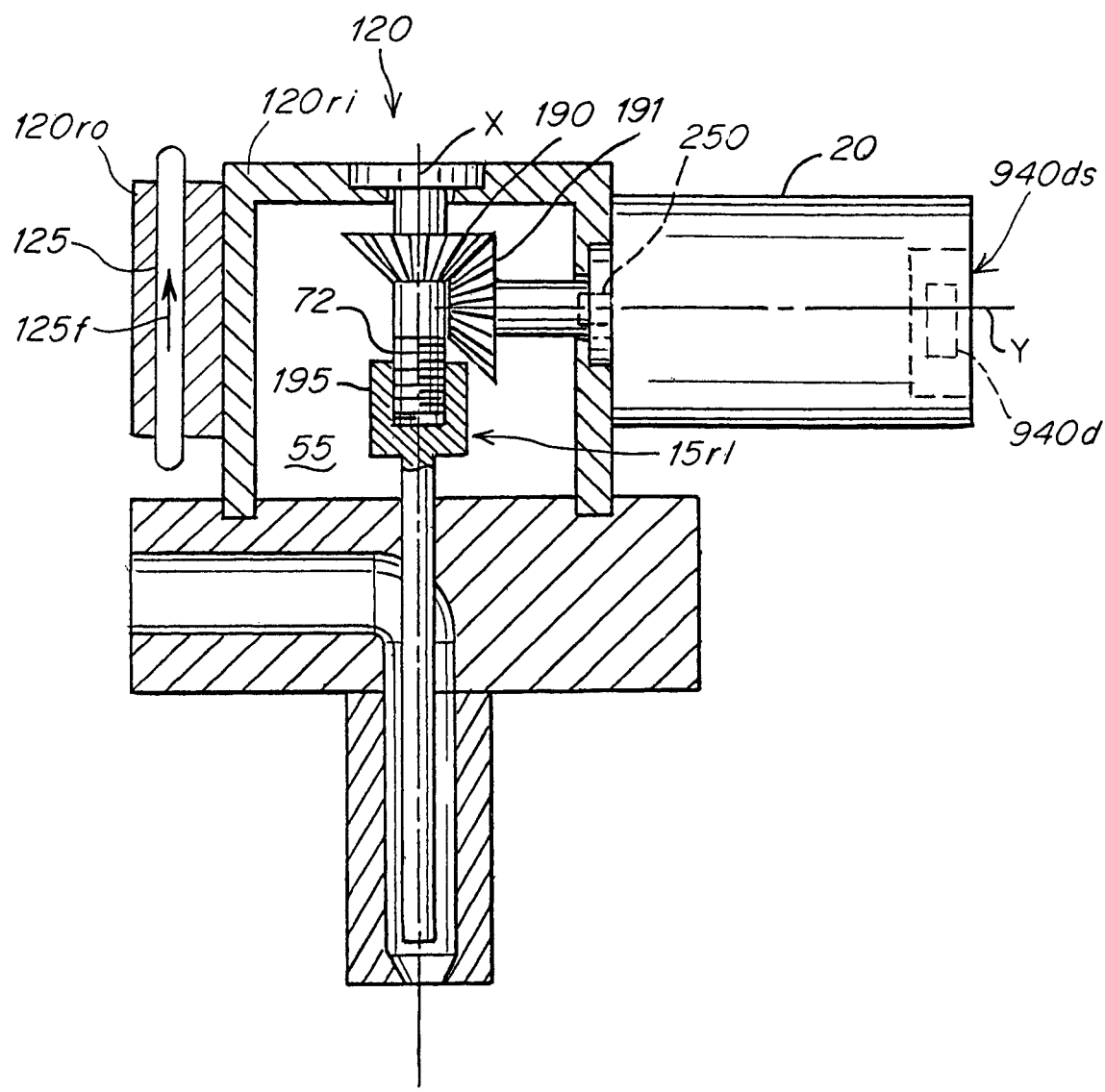
FIG. 4A is an alternative embodiment where a rotary to linear travel converter 120 is interconnected to an actuator for converting rotary motion to linear motion along a non coaxial axial axis relative to the axis of the rotor, and where a cooling channel 125 is disposed within a housing body 120*ro* that is readily attachable to and detachable from a main linear converter housing body 120*ri*.

In an alternative embodiment as shown in FIG. 4A, the cooling channels 125 can be disposed within a housing component 120ro that is readily attachable to and detachable from the main linear travel converter housing 940lh, 120ri. In such an embodiment cooling fluid 125f can be pumped through the channels 125 thus cooling the rotary to linear converter housing 120ro, 120ri and the actuator housing 940h, 941h, 942h and its associated mounted or embedded components including the electric drive 940d, 941d, 942d and the drivers 100, 200.

As shown in all of the embodiments of FIGS. 1, 1A, 2, 3, 4, 5 the electric drive (940d, 941d, 942d) is mounted on or to the actuator housing (940h, 941h, 942h) in some manner such that the drive components such as a Pulse Width Modulator (PWM) and associated electrical components are disposed in substantial heat communication or contact with the actuator housing (940h, 941h, 942h) or the heated manifold (40).

Figure 13A:
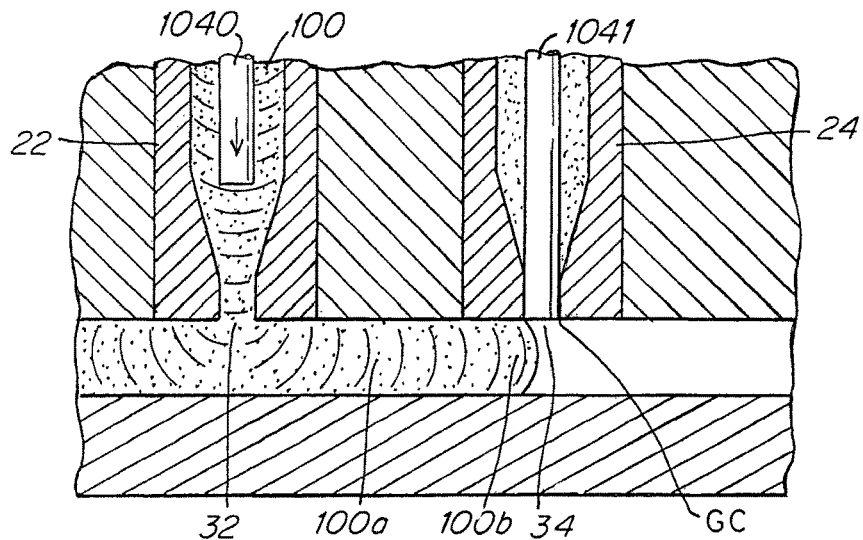
FIGS. 13A-13E are schematic cross-sectional close-up views of the center and one of the lateral gates 34 of the FIG. 1 apparatus showing various stages of the progress of sequential injection.
Figure 13B:
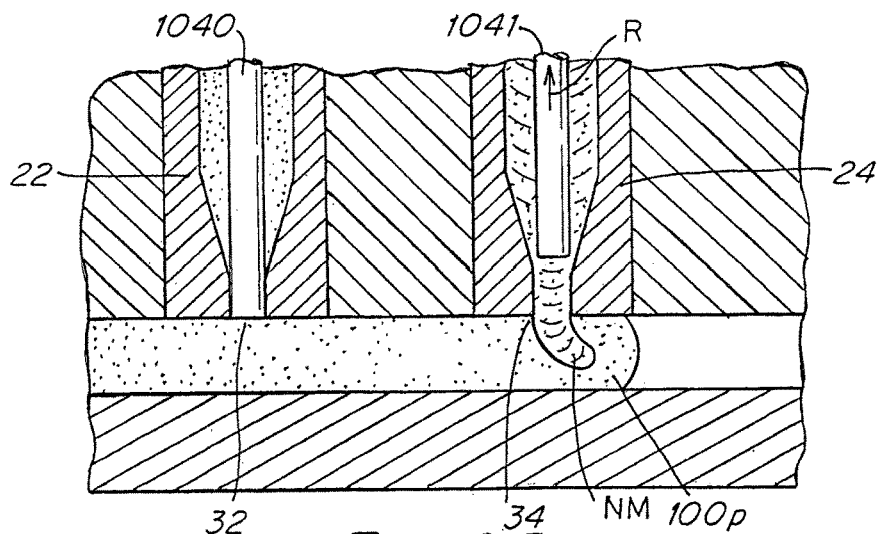
Figure 13C:
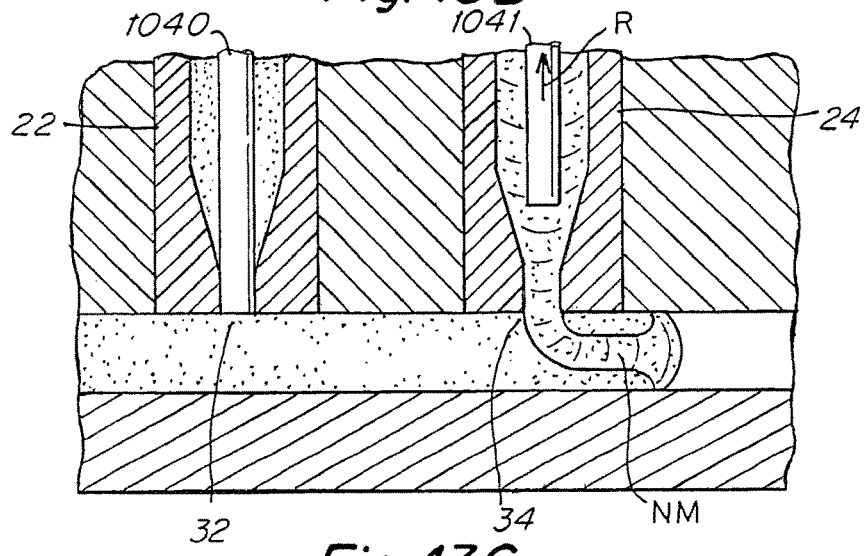

As shown in FIGS. 1, 13A-13E the injection cycle can be a cascade process where injection is effected in a sequence from the center nozzle 22 first and at a later predetermined time from the lateral nozzles 20, 24. As shown in FIG. 13A the injection cycle is started by first opening the pin 1040 of the center nozzle 22 and allowing the fluid material 100 (typically polymer or plastic material) to flow up to a position 100a in the cavity just before 100b the distally disposed entrance into the cavity 34, 36 of the gates of the lateral nozzles 24, 20 as shown in FIG. 1. After an injection cycle is begun, the gate of the center injection nozzle 22 and pin 1040 is typically left open only for so long as to allow the fluid material 100b to travel to a position 100p just past the positions 34, 36. Once the fluid material has travelled just past 100p of the lateral gate positions 34, 36, the center gate 32 of the center nozzle 22 is typically closed by pin 1040 as shown in FIGS. 13B, 13C, 13D and 13E. The lateral gates 34, 36 are then opened by upstream withdrawal of lateral nozzle pins 1041, 1042 as shown in FIGS. 13B-13E. As described below, the rate of upstream withdrawal or travel velocity of lateral pins 1041, 1042 can be controlled as described below.

In alternative embodiments, the center gate 32 and associated actuator 940 and valve pin 1040 can remain open at, during and subsequent to the times that the lateral gates 34, 36 are opened such that fluid material flows into cavity 30 through both the center gate 32 and one or both of the lateral gates 34, 36 simultaneously.

When the lateral gates 34, 36 are opened and fluid material NM is allowed to first enter the mold cavity into the stream 102p that has been injected from center nozzle 22 past gates 34, 36, the two streams NM and 102p mix with each other. If the velocity of the fluid material NM is too high, such as often occurs when the flow velocity of injection fluid material through gates 34, 36 is at maximum, a visible line or defect in the mixing of the two streams 102p and NM will appear in the final cooled molded product at the areas where gates 34, 36 inject into the mold cavity. By injecting NM at a reduced flow rate for a relatively short period of time at the beginning when the gate 34, 36 is first opened and following the time when NM first enters the flow stream 102p, the appearance of a visible line or defect in the final molded product can be reduced or eliminated.

The rate or velocity of upstream withdrawal of pins 1041, 1042 starting from the closed position is controlled via controller 16 which controls the rate and direction of drive of the electric actuators 940, 941, 942.

The user programs controller 16 via data inputs on a user interface to instruct the electric actuators to drive pins 1041, 1042 at an upstream velocity of travel that is reduced relative to a maximum velocity that the actuators can drive the pins 1041, 1042 to travel. Such reduced pin withdrawal rate or velocity is executed until a position sensor such as 951, 952 detects that an actuator 941, 952 or an associated valve pin (or another component), has reached a certain position such as the end point COP, COP2, FIGS. 14B, 15B of a restricted flow path RP, RP2. A typical amount of time over which the pins are withdrawn at a reduced velocity is between about 0.01 and 0.10 second, the entire injection cycle time typically being between about 0.3 seconds and about 3 seconds, more typically between about 0.5 seconds and about 1.5 seconds.

Figure 13D:
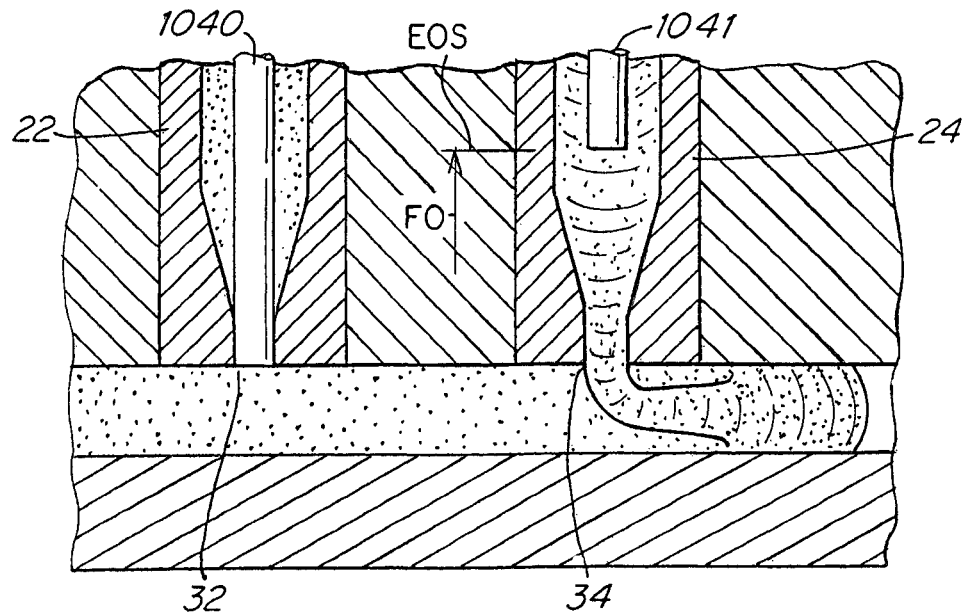
Figure 13E:
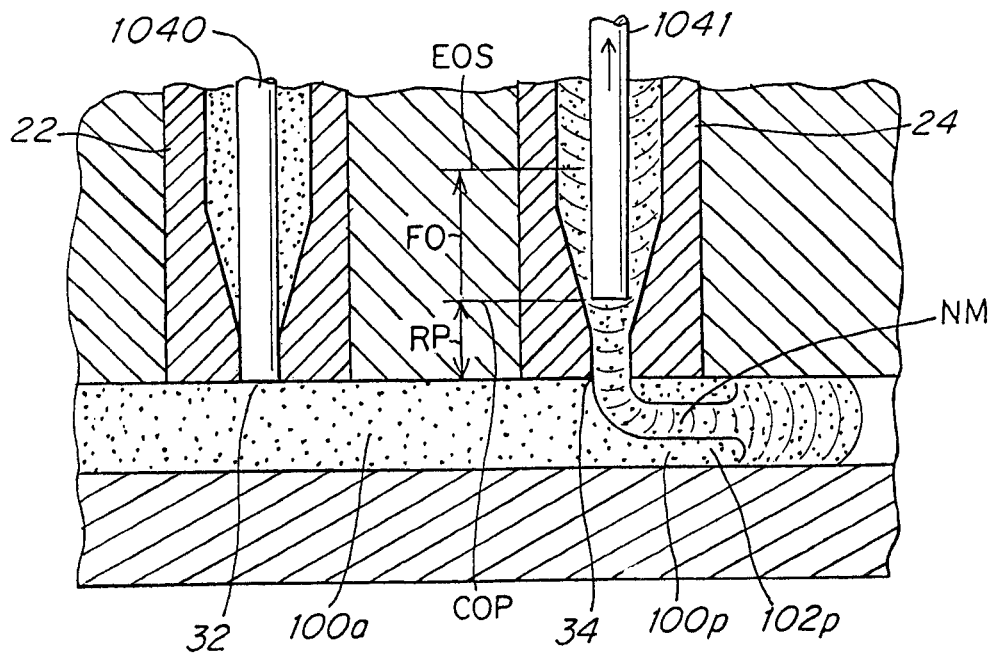

FIG. 1 shows position sensors 950, 951, 952 for sensing the position of the motors 940, 941, 942 and their associated valve pins (such as 1040, 1041, 1042) and feed such position information to controller 16 for monitoring purposes. As shown, fluid material 18 is injected from an injection machine into a manifold runner 19 and further downstream into the bores 44, 46 of the lateral nozzles 24, 22 and ultimately downstream through the gates 32, 34, 36. When the pins 1041, 1042 are withdrawn upstream to a position where the tip end of the pins 1041 are in a fully upstream open position such as shown in FIG. 13D, the rate of flow of fluid material through the gates 34, 36 is at a maximum. However when the pins 1041, 1042 are initially withdrawn beginning from the closed gate position, FIG. 13A, to intermediate upstream positions, FIGS. 13B, 13C, a gap 1154, 1156 that restricts the velocity of fluid material flow is formed between the outer surfaces 1155 of the tip end of the pins 44, 46 and the inner surfaces 1254, 1256 of the gate areas of the nozzles 24, 20. The restricted flow gap 1154, 1156 remains small enough to restrict and reduce the rate of flow of fluid material 1153 through gates 34, 36 to a rate that is less than maximum flow velocity over a travel distance RP of the tip end of the pins 1041, 1042 going from closed to upstream as shown in FIGS. 1, 13B, 13C, 13E and 14B, 15B.

The pins 1041 can be controllably withdrawn at one or more reduced velocities (less than maximum) for one or more periods of time over the entirety of the length of the path RP over which flow of mold material 1153 is restricted. Preferably the pins are withdrawn at a reduced velocity over more than about 50% of RP and most preferably over more than about 75% of the length RP. As described below with reference to FIGS. 14B, 15B, the pins 1041 can be withdrawn at a higher or maximum velocity at the end COP2 of a less than complete restricted mold material flow path RP2.

The trace or visible lines that appear in the body of a part that is ultimately formed within the cavity of the mold on cooling above can be reduced or eliminated by reducing or controlling the velocity of the pin 1041, 1042 opening or upstream withdrawal from the gate closed position to a selected intermediate upstream gate open position that is preferably 75% or more of the length of RP.

RP can be about 1-8 mm in length and more typically about 2-6 mm, more typically 2-4 mm and even more typically 1-5 mm in length. According to the invention, the position of the electric actuators are adjusted in response to sensing of position of a suitable component such as the rotor of an actuator 941, 942 or associated valve pin to less than 100% open. Adjustment of the drive of an actuator 931, 942 thus reduces the velocity of upstream travel of the pins 1041, 1042 for the selected period of time. At the end of the travel or length of path RP, RP2, a position sensor signals the controller 16, the controller 16 determines that the end COP, COP2 has been reached and the valve pin is driven at higher velocity, typically to its end of stroke (EOS) or its 100% open position to allow the actuator pistons and the valve pins 1041, 1042 to be driven at maximum upstream velocity FOV in order to reduce the cycle time of the injection cycle.

Typically the user selects one or more reduced velocities that are less than about 90% of the maximum velocity (namely velocity when the valve 600 is fully open), more typically less than about 75% of the maximum velocity and even more typically less than about 50% of the maximum velocity at which the pins 1041, 1042 are drivable by the electric actuator apparatus. The actual maximum velocity at which the actuators 941, 942 and their associated pins 1041, 1042 are driven is predetermined by selection of the size and configuration of the actuators 941, 942. The maximum drive rate of the electric actuator apparatus is predetermined by the manufacturer and the user of the apparatus and is typically selected according to the application, size and nature of the mold and the injection molded part to be fabricated.

Preferably, the valve pin and the gate are configured or adapted to cooperate with each other to restrict and vary the rate of flow of fluid material 1153, FIGS. 14A-14B, 15A-15B over the course of travel of the tip end of the valve pin through the restricted velocity path RP. Most typically as shown in FIGS. 14A, 14B the radial tip end surface 1155 of the end 1142 of pin 1041, 1042 is conical or tapered and the surface of the gate 1254 with which pin surface 1155 is intended to mate to close the gate 34 is complementary in conical or taper configuration. Alternatively as shown in FIGS. 15A, 15B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 relative to the rate of flow when the pin 1041, 1042 is at a full gate open position, namely when the tip end 1142 of the pin 1041 has travelled to or beyond the length of the restricted flow path RP.

In one embodiment, as the tip end 1142 of the pin 1041 continues to travel upstream from the gate closed GC position (as shown for example in FIGS. 14A, 15A) through the length of the RP path (namely the path travelled for the predetermined amount of time), the rate of material fluid flow 1153 through restriction gap 1154 through the gate 34 into the cavity 30 continues to increase from 0 at gate closed GC position to a maximum flow rate when the tip end 1142 of the pin reaches a position FOP (full open position), where the pin is no longer restricting flow of injection mold material through the gate. In such an embodiment, at the expiration of the predetermined amount of time when the pin tip 1142 reaches the FOP (full open) position the pin 1041 is immediately driven by at maximum velocity FOV (full open velocity). In alternative embodiments, when the predetermined time for driving the pin at reduced velocity has expired and the tip 1142 has reached the end of restricted flow path RP2, the tip 1142 may not necessarily be in a position where the fluid flow 1153 is not still being restricted. In such alternative embodiments, the fluid flow 1153 can still be restricted to less than maximum flow when the pin has reached the changeover position COP2 where the pin 1041 is driven at a higher, typically maximum, upstream velocity FOV.

In the alternative examples shown in the FIGS. 14B, 15B examples, when the pin has travelled the predetermined path length at reduced velocity and the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 14B the maximum fluid flow rate for injection material 1153 is reached at the upstream position COP of the tip end 1142. In another example shown in FIG. 14B, 15B, the pin 1041 can be driven at a reduced velocity over a shorter path RP2 that is less than the entire length of the restricted mold material flow path RP and switched over at the end COP2 of the shorter restricted path RP2 to a higher or maximum velocity FOV. In another alternative embodiment, the pin 1041 can be driven and instructed to be driven at reduced or less than maximum velocity over a longer path length RP3 having an upstream portion UR where the flow of injection fluid mold material is not restricted but flows at a maximum rate through the gate 34 for the given injection molding apparatus. In this example the velocity or drive rate of the pin 1041 is not changed over until the tip end of the pin 1041 or actuator 941 has reached the changeover position COP3. As in other embodiments, a position sensor senses either that the valve pin 1041 or an associated component has travelled the path length RP3 or reached the end COP3 of the selected path length and the controller receives and processes such information and instructs the drive apparatus to drive the pin 1041 at a higher, typically maximum velocity upstream. In another alternative embodiment, the pin 1041 can be driven at reduced or less than maximum velocity throughout the entirety of the travel path of the pin during an injection cycle from the gate closed position GC up to the end-of-stroke EOS position, the controller 16 being programmed to instruct the drive system for the actuator to be driven at one or more reduced velocities for the time or path length of an entire closed GC to fully open EOS cycle.

Typically, when the time period for driving the pin 1041 at reduced velocity has expired and the pin tip 1142 has reached the position COP, COP2, the pins 1041, 1042 are driven at the maximum velocity or rate of travel that the actuator system is capable of driving the valve pins 1041, 1042. Alternatively, the pins 1041, 1042 can be driven at a preselected FOV velocity that is less than the maximum velocity at which the pin is capable of being driven when the restriction valve 600 is fully open but is still greater than the selected reduced velocities that the pin is driven over the course of the RP, RP2 path to the COP, COP2 position.

At the expiration of the predetermined reduced velocity drive time, the pins 1041, 1042 are typically driven further upstream past the COP, COP2 position to a maximum end-of-stroke EOS position. The end-of-stroke position EOS is an upstream position selected by the user that can be the maximum upstream position that the pin can be withdrawn to or the EOS position can be a less than maximum upstream position to which the valve pin can be withdrawn. The upstream COP, COP2 position is downstream of the maximum upstream end-of-stroke EOS open position of the tip end 1142 of the pin. The length of the path RP or RP2 is typically between about 2 and about 8 mm, more typically between about 2 and about 6 mm and most typically between about 2 and about 4 mm. In practice the maximum upstream (end of stroke) open position EOS of the pin 1041, 1042 ranges from about 8 mm to about 18 inches upstream from the closed gate position GC.

As shown in each of the embodiments the electrical drive (940*d*, 941*d*, 942*d*) is incorporated into, housed within, or physically mounted onto or in direct heat communication with the actuator housing (940*h*, 941*h*, 942*h*) of the actuator such that the electric drive (940*d*, 941*d*, 942*d*) is in direct thermal communication or contact with the thermally conductive housing (940*h*, 941*h*, 942*h*) of the actuator.

The electrical drive (940*d*, 941*d*, 942*d*) can be housed or mounted in a thermally conductive housing body (940*ds*) that is readily attachable to and detachable from the actuator housing (940*h*, 941*h*, 942*h*) as shown in FIGS. 1, 1A, 3, 6, such a readily attachable and detachable housing body (940*ds*) being readily attachable or mountable to and detachable from the actuator housing (940*h*, 941*h*, 942*h*) in an arrangement such that the electrical drive (940*d*, 941*d*, 942*d*) is in direct thermally conductive contact or communication with the actuator housing (940*h*, 941*h*, 942*h*).

As shown in FIGS. 1-12A the housings (940*h*, 941*h*, 942*h*) of each of the actuators (5, 940, 941, 942) is mounted on or to or in close physical proximity to or in direct thermal communication with a heated manifold (40, 300).

The electric actuators 940, 941, 942 typically comprise a driver 940dr, 941dr, 942dr typically comprised of a stator and armature that are interconnected to a rotatably mounted rotor or shaft 940r, 941r, 942r such that when the drivers 940dr, 941dr, 942dr rotate on application and receipt of electrical energy or power, the shafts 940r, 941r, 942r are simultaneously rotatably moved and driven.

The rotor (940r, 941r, 942r) has a drive axis (Y), FIG. 1 et al. The driver (940dr, 941dr, 942dr) is interconnected to the rotor (940r, 941r, 942r) and adapted to controllably drive the rotor rotatably around the drive axis Y.

The drivers (940dr, 941dr, 942dr) receives electrical energy or power from an electrical drive (940d, 941d, 942d). The electrical drive (940d, 941d, 942d) typically comprises an interface that receives electrical energy or power from a power source PS and controllably distributes the received electrical energy or power in controllably varied amounts during the course of an injection cycle to the drivers (940dr, 941dr, 942dr).

The actuator 5, 940, 941, 942 includes a housing (940h, 941h, 942h) that houses the rotor (940r, 941r, 942r) and the driver (940dr, 941dr, 942dr) and is adapted to support the rotor (940r, 941r, 942r) such that the rotor is drivably rotatable 940rt, 941rt, 942rt. The housing (940h, 941h, 942h) is typically thermally or heat conductive such that the housing receives heat or thermal energy from devices such as the manifold (40) with which the housing (940h, 941h, 942h) may be in thermally conductive communication or contact.

The electrical drive (940d, 941d, 942d) is typically housed within or by the housing (940h, 941h, 942h) or is physically mounted on or to the housing (940h, 941h, 942h) in thermally conductive communication or contact therewith.

The housing (940h, 941h, 942h) is typically mounted in a physical proximity or disposition relative to the heated manifold (40, 300) or in a direct or indirect heat conductive contact with the heated manifold (40, 300) such that one or the other or both of the housing (940h, 941h, 942h) and the electrical drive (940d, 941d, 942d) is or are in substantial heat or thermal communication or contact with the heated manifold (40).

The electrical drive (940d, 941d, 942d) typically includes a PWM or pulse-width modulator that converts received electrical energy or power into sinusoidal voltage waveforms, each sinusoidal voltage waveform being adapted to drive a corresponding phase-coil of the actuator driver (940dr, 941dr, 942dr).

The PWM or pulse-width modulator typically comprises an inverter or comparator.

The PWM modulator typically comprises a three-phase PWM inverter that converts electrical energy or power received from the interface into three sinusoidal voltage waveforms, each one of the three sinusoidal voltage waveforms being adapted to drive a corresponding one of three phase-coils of the actuator driver.

The electrical energy or power received at or by the PWM modulator can be a DC bus voltage.

The interface of the electrical drive 940d, 941d, 942d is adapted to receive one or more control signals from a controller 16 of the injection molding apparatus and to convert electrical energy or power received the power source PS into sinusoidal waveforms based on the one or more control signals. The interface is comprised of the PWM or pulse width modulator which converts electrical energy or power received from the power source into sinusoidal waveforms based on the one or more control signals.

The one or more control signals received by the interface of the electrical drive contain control information causing the pulse width modulator to convert the received electrical energy or power into sinusoidal waveforms adapted to drive the corresponding phase-coils of the actuator driver to adjust one or more of a position, a velocity or torque of the actuator rotor 940r, 941r, 942r.

The one or more control signals can comprise analog electrical signals received at the electrical drive from the controller 16.

The electrical drive 940d, 941d, 942d can further comprise one or the other or both of a digital signal receiving (16r) and transmitting (16s) device, FIG. 1A, 12. The controller (16) includes a digital command or signal generating mechanism such as a computer drive, microcontroller, microcircuit, chipset or the like interconnected to a digital data storage medium to and from which the digital command or signal generating mechanism exchanges digital signals, data or commands. The controller (16) is adapted to send digital signals, commands, data to a digital signal receiving device (16r) contained within the electrical drive (940d, 941d, 942d). The digital commands that are received (16s) by the electrical drive (940d, 941d, 942d) are used by the drive (940d, 941d, 942d) to control distribution of electrical energy or power to the driver (940dr, 941dr, 942dr) thus controlling the speed of rotation of the rotor of the actuator (940, 941, 942) during the course of the injection cycle.

The electrical drive (940d, 941d, 942d) can also include a digital signal, data or command sending device (16s) that is typically comprised of a microcontroller, microcircuit, chipset or the like and adapted to communicate or send digital signals back to digital signal receiving device contained within the controller (16).

The digital control signals can include one or more of differential position commands, differential current commands, and differential velocity commands.

The digital signal receiving and transmitting device (16r, 16s) further can receive digital signals from the actuator, wherein the digital signals received from the actuator include one or more feedback signals corresponding to operation of one or more of the actuator and the actuator rotor.

The one or more feedback signals received by the electrical drive (940d, 941d, 942d) from the actuator can include one or more of an incremental feedback signal and an absolute feedback signal. Such incremental feedback signal or absolute feedback signal sent by the actuator to the electrical drive can be communicated or sent back to the controller (16) by the digital signal sending device (16s).

Figure 2:
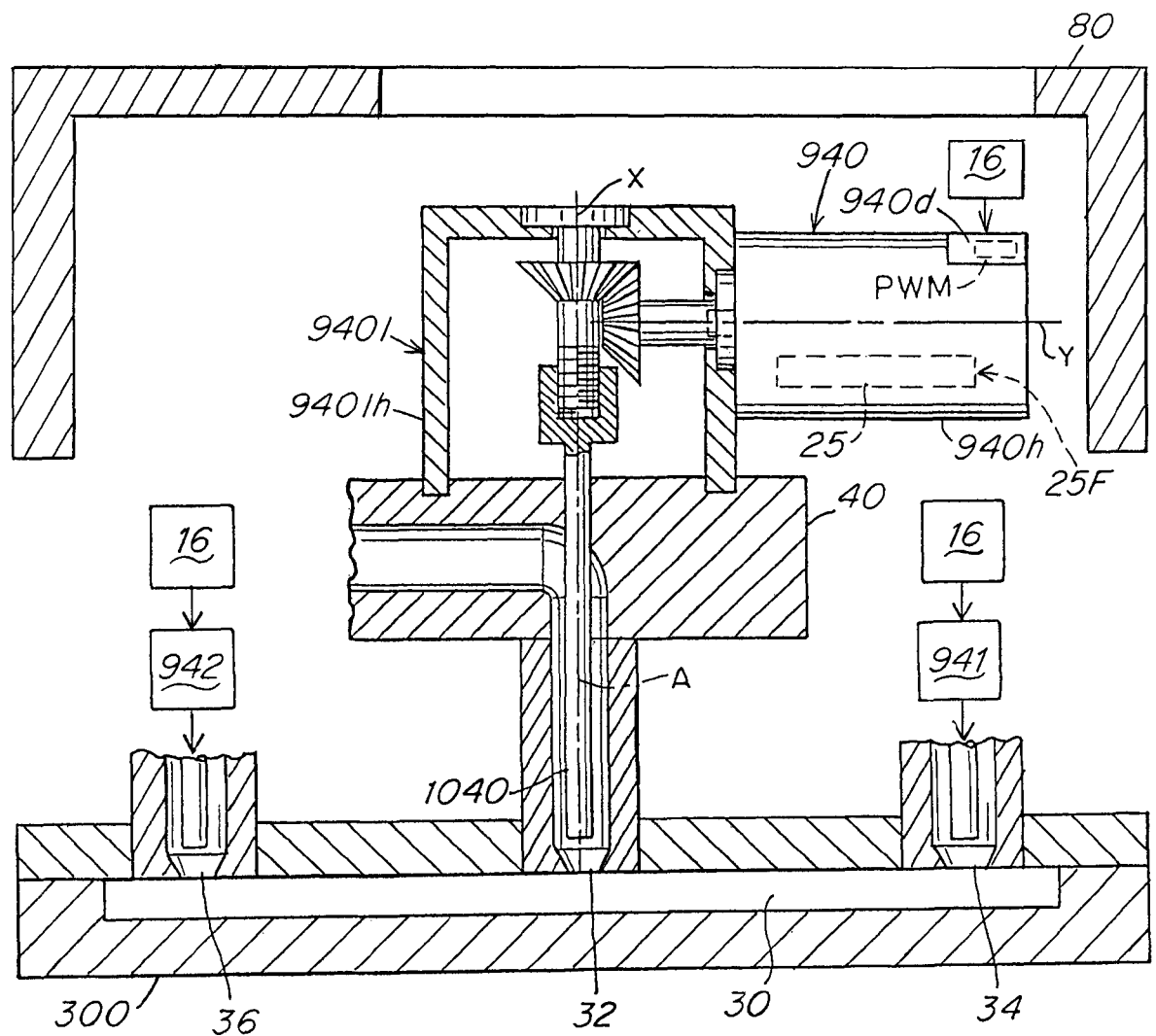
FIG. 2 is a side sectional schematic view of an electric actuator in a apparatus similar to the FIG. 1 apparatus where the actuator (940) has a drive axis Y that is arranged non-coaxially relative to the travel axis of the valve pin (1040), the actuator housing (940h) being mounted to or on or in direct thermal communication with the heated manifold (40) via mounting of the actuator (940) to a linear travel converter (940l, 940h) which is in turn mounted on or to or in direct thermal communication or contact with the heated manifold (40).

FIG. 2 shows an embodiment similar to the FIG. 1 apparatus where the actuator (940) has a drive axis Y that is arranged non-coaxially relative to the travel axis of the valve pin (1040), the actuator housing (940h) being mounted to or on or in direct thermal communication with the heated manifold (40) via mounting of the actuator (940) to a linear travel converter (940l, 940h) which is in turn mounted on or to or in direct thermal communication or contact with the heated manifold (40).

FIGS. 2A to 2E show an embodiment where the electric actuator (940) has a drive axis Y that is arranged non-coaxially relative to the travel axis of the valve pin (1040), the actuator housing (940h) and the electric drive (940d) being mounted to or on or in close physical proximity to the heated manifold (40) via mounting of the actuator (940) to a rotational speed reducing device (46) that is in turn mounted to a rotary to linear travel converter (940*l*, 940*h*) which is in turn mounted on or to or in close physical proximity to a heated manifold (40) with the cooling device (940*mc*, 940*mc*1, 940*mc*2, 941*mc*, 942*mc*) disposed between the heated manifold (40) and the rotary to linear travel converter (940*l*, 940*h*), the rotational speed reducing device (46), the actuator housing (940*h*, 941*h*, 942*h*) and the electric drive (940*d*). The cooling device is adapted to substantially isolate or insulate at least the electrical drive (940*d*, 941*d*, 942*d*) from substantial communication with heat emanating or emitted from the heated manifold (40). The cooling device is also typically adapted and arranged to isolate or insulate the actuator housing (940*h*) and the rotary to linear converter (940*l*) and the rotational speed reducing device (46) from substantial communication with heat emanating or emitted from the heated manifold (40).

In this embodiment the rotary to linear converter 940*l* and its housing 940*lh* together with the speed reducing device 46 and actuator 940 to which the converter 940*l* is subassembled are mounted to the heated manifold (40) via standoffs or mounts 60 that are preferably comprised of a heat insulative material such as titanium, bismuth, stainless steel, lead, chromium or the like.

Figure 2A:
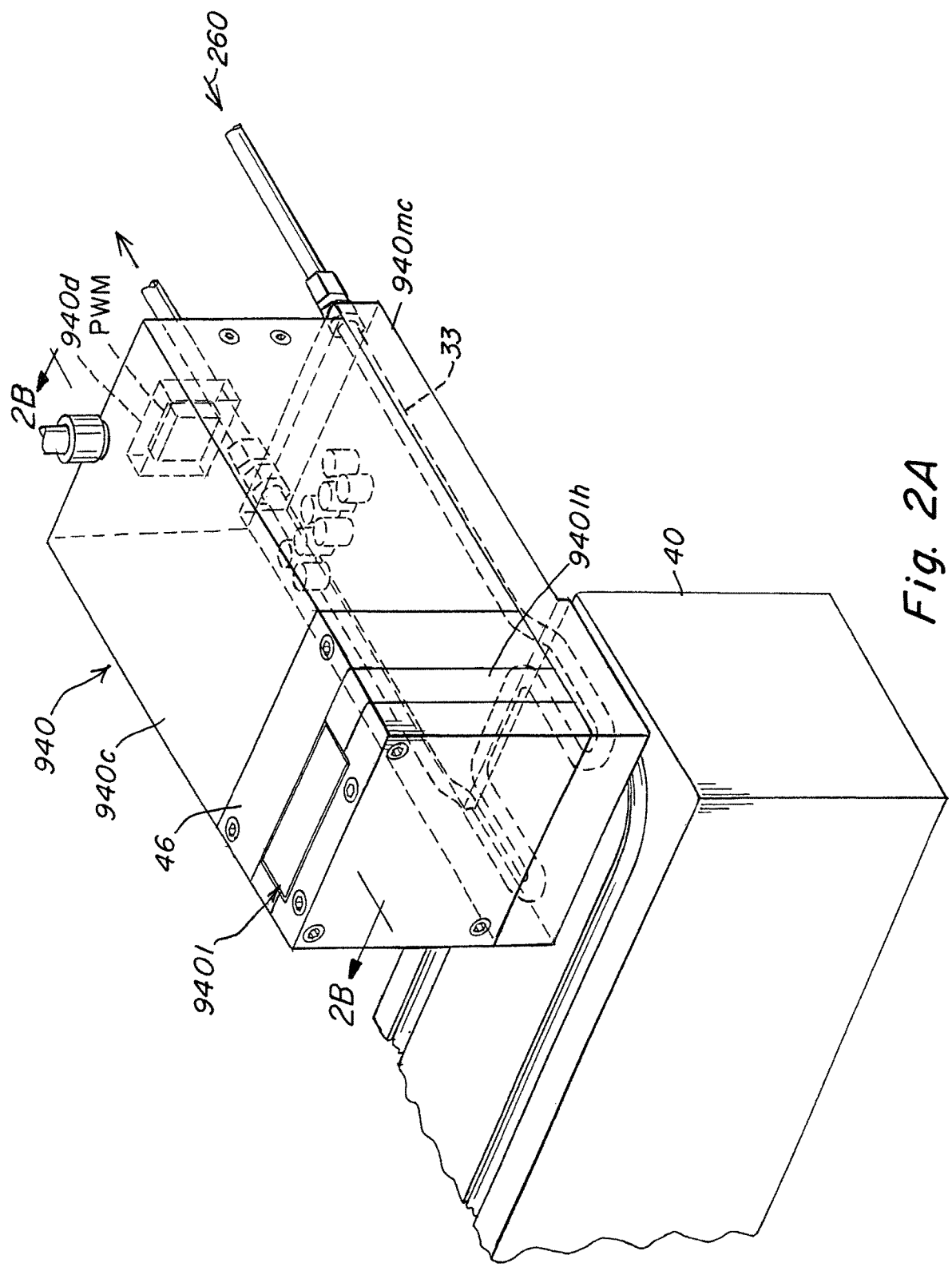
FIG. 2A is a top front perspective view of an embodiment of comprised of an electric actuator (940) having a drive axis Y that is arranged non-coaxially relative to the travel axis of the valve pin (1040), the actuator housing (940h) and the electric drive (940d) being mounted to or on or in close physical proximity to the heated manifold (40) via mounting of the actuator (940) to a rotational speed reducing device (46) that is in turn mounted to a rotary to linear travel converter (940l, 940h) which is in turn mounted on or to or in close physical proximity to a heated manifold (40) with a cooling device (940mc, 940mc1, 940mc2, 941mc, 942mc) being disposed between the heated manifold (40) and the linear travel converter (940l, 940h), the rotational speed reducing device (46), the actuator housing (940h, 941h, 942h) and the electric drive (940d) the cooling device being adapted to substantially isolate or insulate at least the electrical drive (940d, 941d, 942d) from substantial communication with heat emanating or emitted from the heated manifold (40).
Figure 2B:
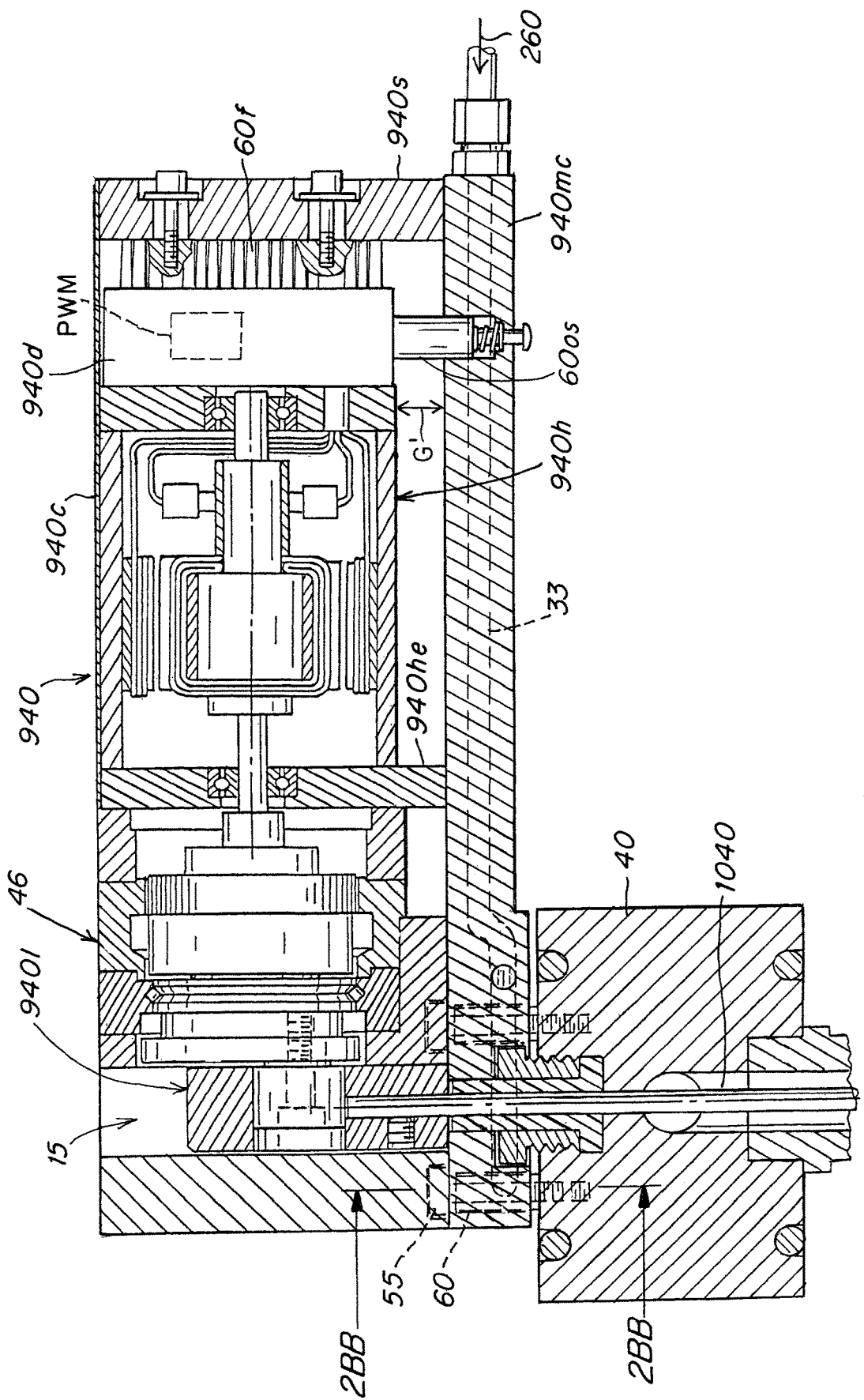
FIG. 2B is a side sectional view of the FIG. 2A apparatus taken along lines 2B-2B.

In an alternative embodiment, the mounts 60 such as mount 60*s*, FIG. 2B, can be comprised of a highly heat conductive material such as copper such that heat is more readily conducted from the actuator housing 940*h* to the actively cooled mount 940*mc*.

An example of direct metal to metal contact is as shown in the FIG. 2B embodiment where actuator housing 940*h* is mounted in direct metal to metal contact with the heated manifold 40 via mounts 60 that are typically comprised of a heat insulative material. The actuator housing 940*h* is mounted in direct metal to metal contact with mounts 60*s* that are typically comprised of a heat conductive material mounted in direct metal to metal contact with the actively cooled mount 940*mc* such that heat is conducted from the actuator housing 940*h* to the actively cooled mount 940*mc* that acts as a heat sink for heat contained in the actuator housing 940*h*. The actively cooled mount 940*mc* is itself is mounted to the heated manifold 40 via direct metal to metal contact or communication with mounts 60 which are in turn mounted in direct metal to metal contact with the heated manifold 40. Thus the direct metal to metal contact of mounts 60, 60*s* as described substantially accomplishes a direct metal to metal communication or contact of the actuator housing 940*h* and the electric drive 940*d* with the heated manifold 40.

Figure 2C:
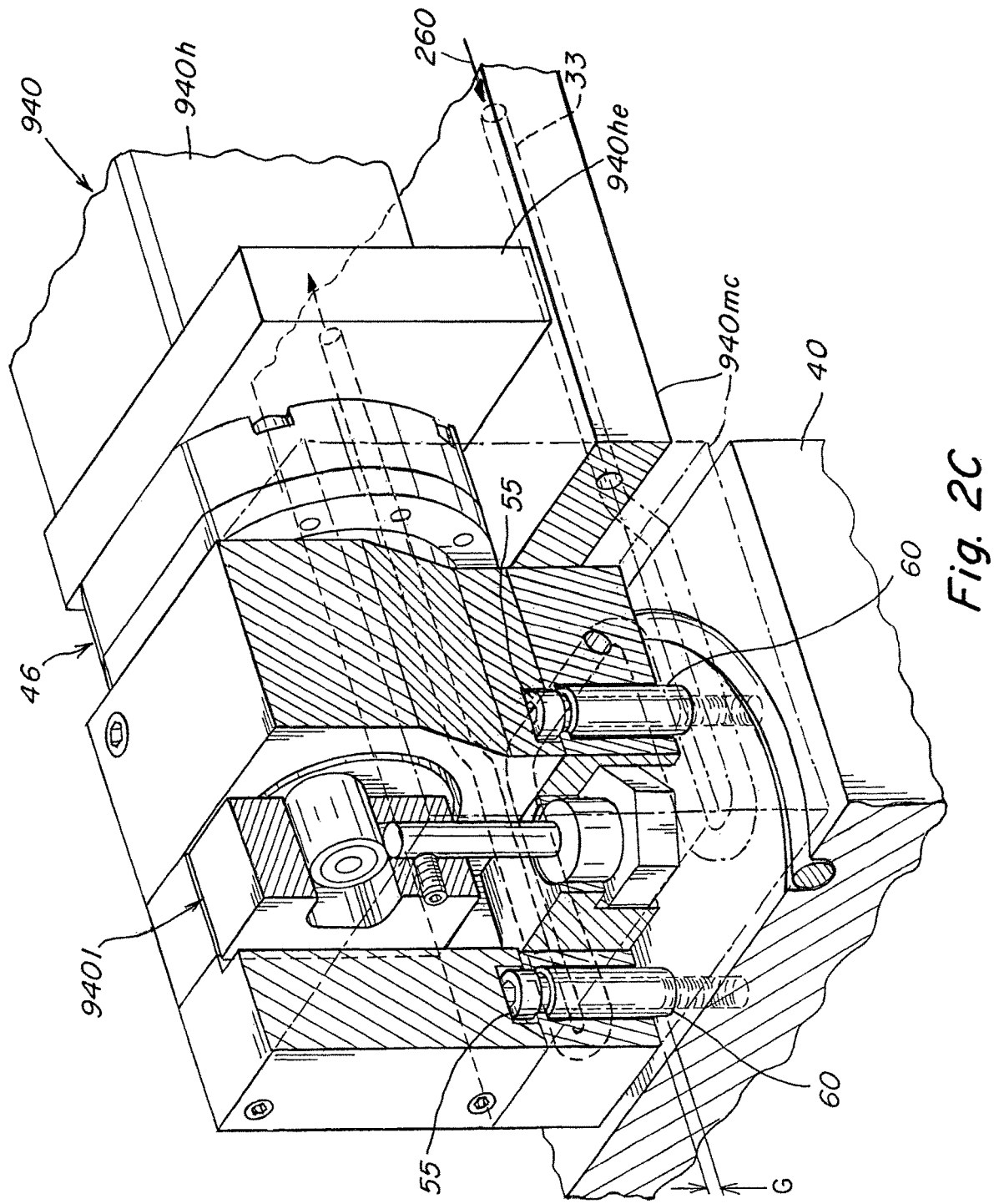
FIG. 2C is a top front partial sectional perspective view of the FIGS. 2B, 2BB subassembly.
Figure 2D:
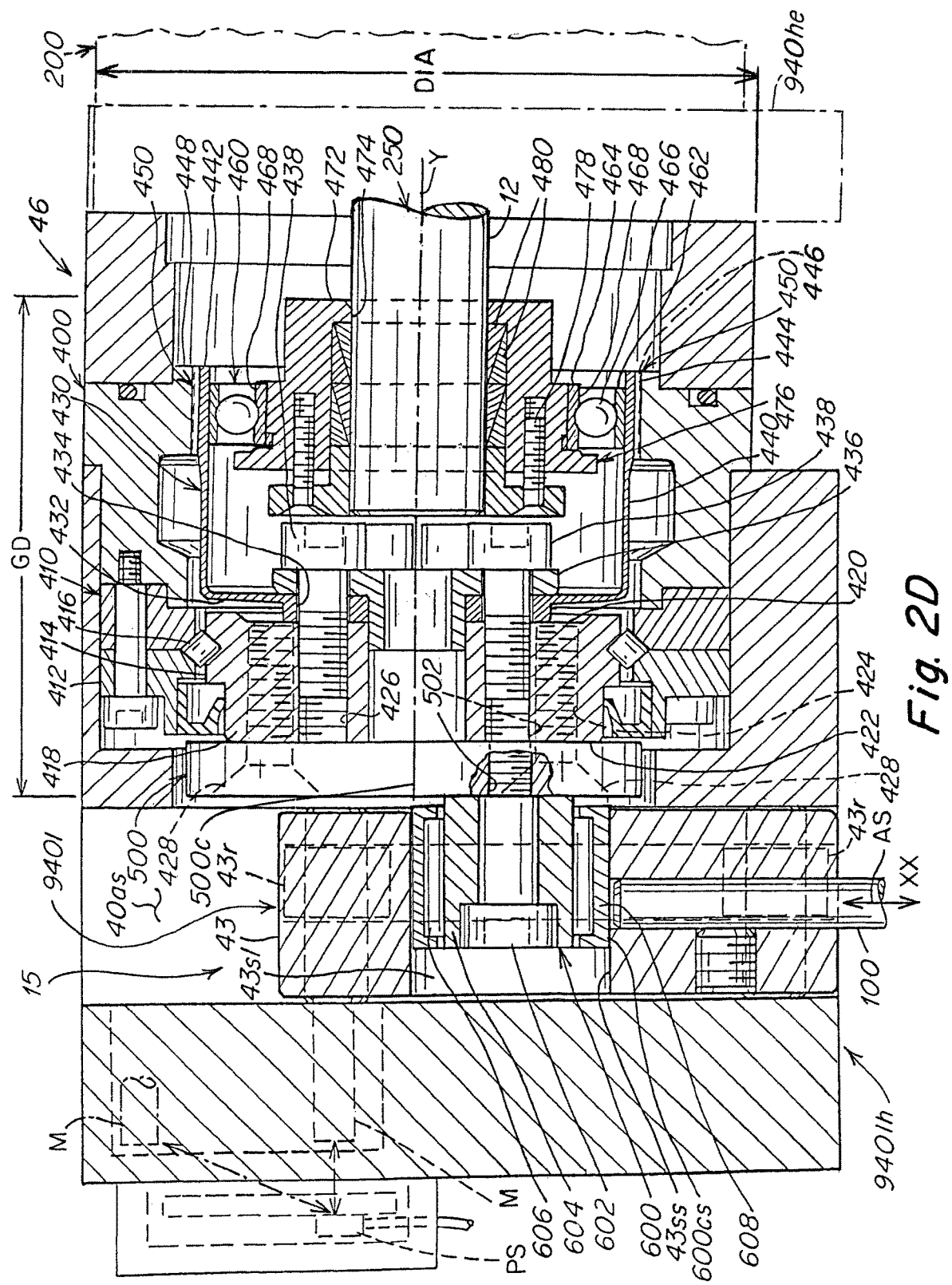
FIG. 2D is a side sectional view of the subassembled rotational speed reducing device 46, a harmonic, and rotary to linear converter device 940l components of the subassembly shown in FIGS. 2A, 2B, 2BB, 2C.

As shown in FIG. 2D the rotational speed reducing device 46 comprises a harmonic device and the rotary to linear converter device 940*l* comprises a wheel or disc that uses an eccentric or eccentrically disposed pin or projection to drive the valve pin along pin axis X.

In the FIGS. 2A to 2E embodiment the conversion of motor movement is conversion of rotary motion of the rotor directly to non coaxial linear motion of the drive member 940*l* along axis X of the valve pin.

Figure 2E:
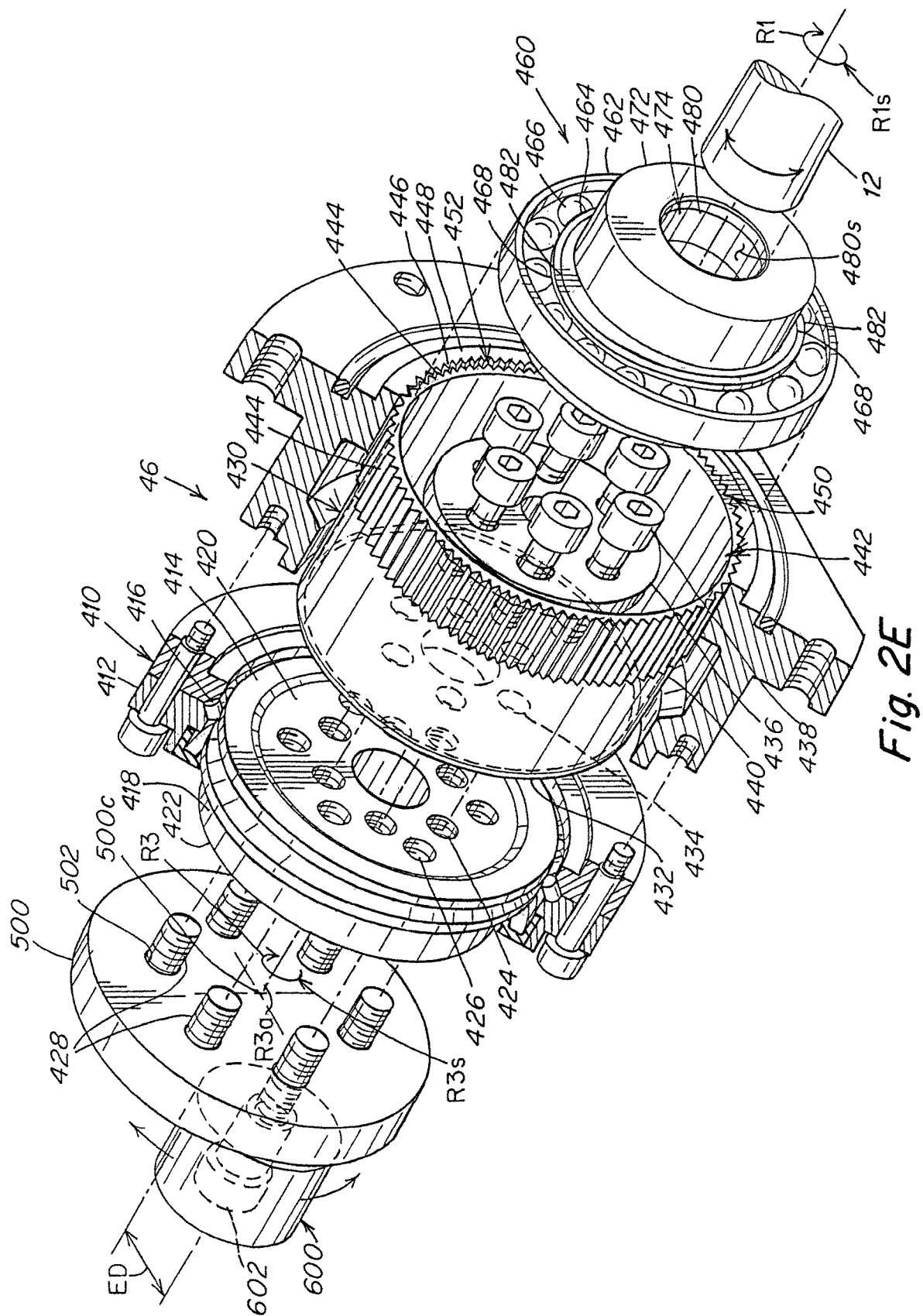
FIG. 2E is a top rear exploded perspective view of the rotational speed reducing device 46 shown in FIGS. 2A, 2B, 2BB, 2C, 2D.
Figure 2F:
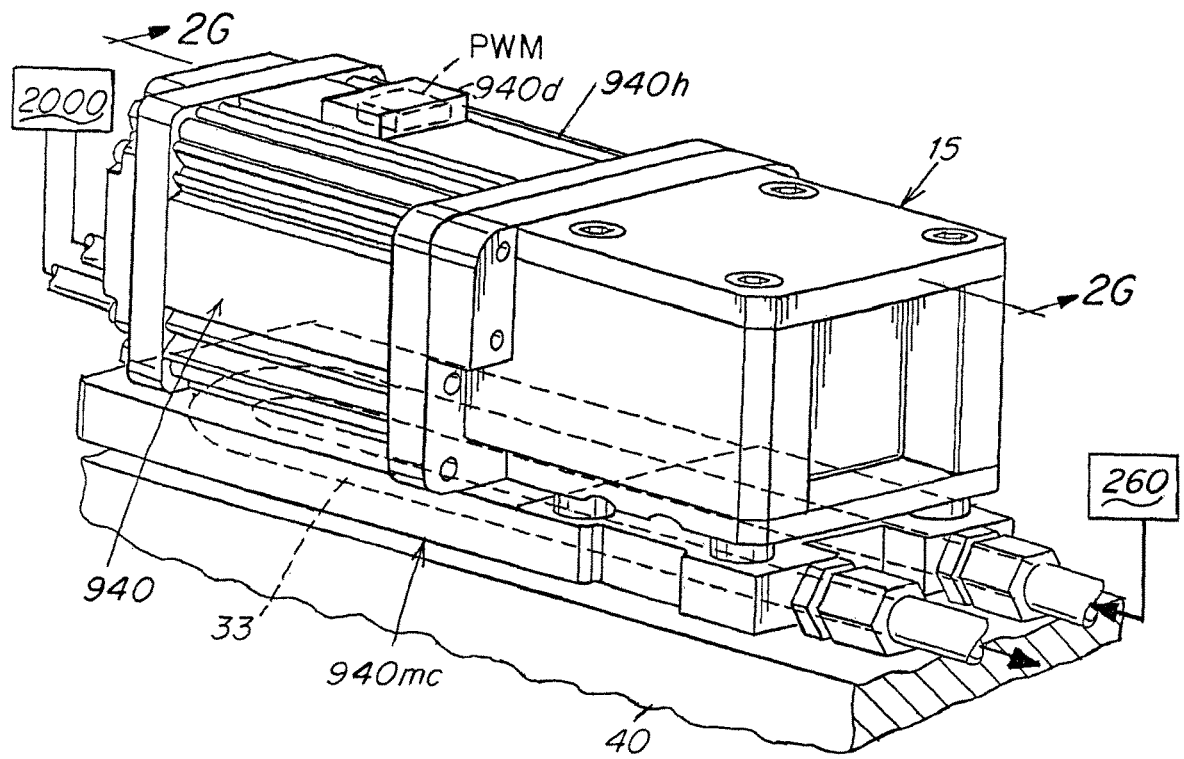
FIG. 2F is a top front perspective view of another embodiment comprised of an actuator having a drive axis Y that is arranged non-coaxially relative to the travel axis of the valve pin (1040), the actuator housing (940h) being mounted to, on or in close physical proximity to the heated manifold (40) via mounting of the actuator (940) to a rotary to linear travel converter (940l, 940lh) which is in turn mounted on, to or in close physical proximity to a heated manifold (40) with a cooling device (940mc, 940mc1, 940mc2, 941mc, 942mc) being disposed between the heated manifold (40) and the linear travel converter (940l, 940h), the actuator housing (940h, 941h, 942h) and the electric drive (940d), the cooling device being adapted to substantially isolate or insulate at least the electrical drive (940d, 941d, 942d) from substantial communication with heat emanating or emitted from the heated manifold (40).
Figure 2G:
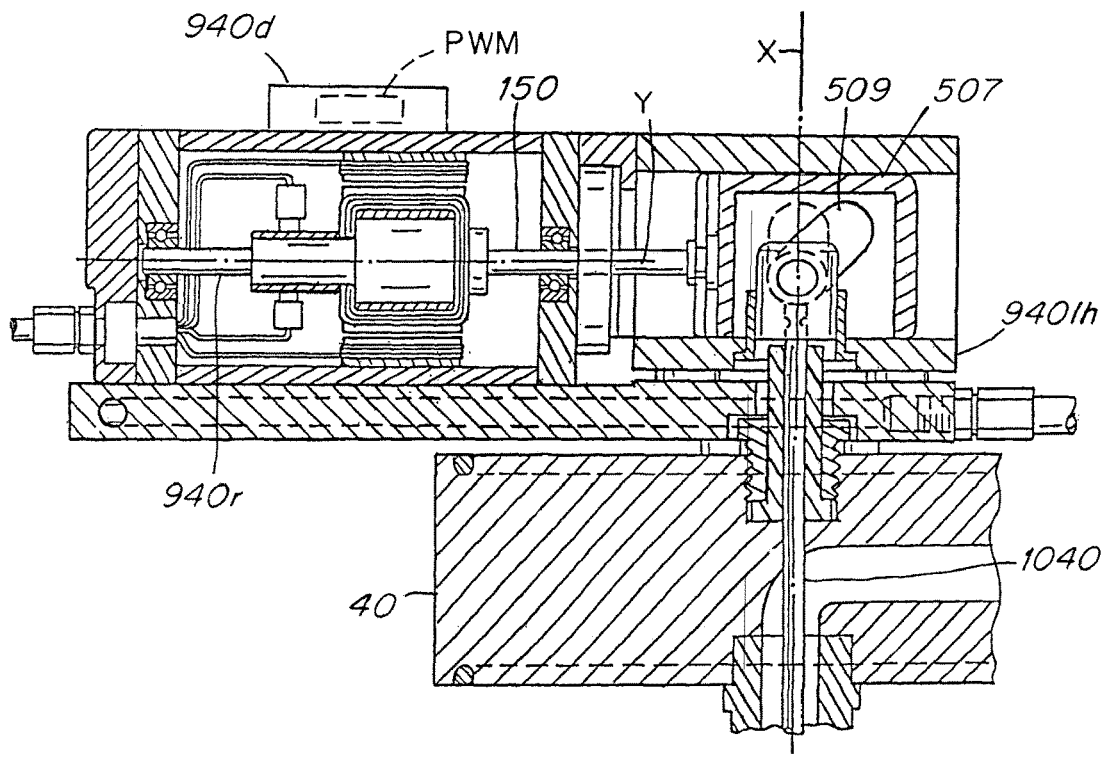
FIG. 2G is a sectional view of the apparatus of FIG. 2F along lines 2G-2G.

FIGS. 2F, 2G show another embodiment comprised of an actuator having a drive axis Y that is arranged non-coaxially relative to the travel axis of the valve pin (1040). The actuator housing (940*h*) is mounted to, on or in close physical proximity to the heated manifold (40) via mounting of the actuator (940) to a rotary to linear travel converter (940*l*, 940*lh*) which is in turn mounted on, to or in close physical proximity to a heated manifold (40) with a cooling device (940*mc*, 940*mc*1, 940*mc*2, 941*mc*, 942*mc*) disposed between the heated manifold (40), the linear travel converter (940*l*, 940*h*), the actuator housing (940*h*, 941*h*, 942*h*) and the electric drive (940*d*). The cooling device is adapted and arranged to substantially isolate or insulate at least the electrical drive (940*d*, 941*d*, 942*d*) from substantial communication with heat emanating or emitted from the heated manifold (40). As shown the FIGS. 2F, 2G cooling device (940*mc*) comprises a single unitary elongated plate on which both the actuator housing (940*h*), electric drive (940*d*), converter (940) and converter housing (940*lh*) are mounted with the cooling device being adapted and arranged to isolate or insulate all of the electric drive (940*d*), the actuator housing (940*h*) and the rotary to linear converter (940*l*) from substantial communication with heat emanating or emitted from the heated manifold (40).

Figure 2H:
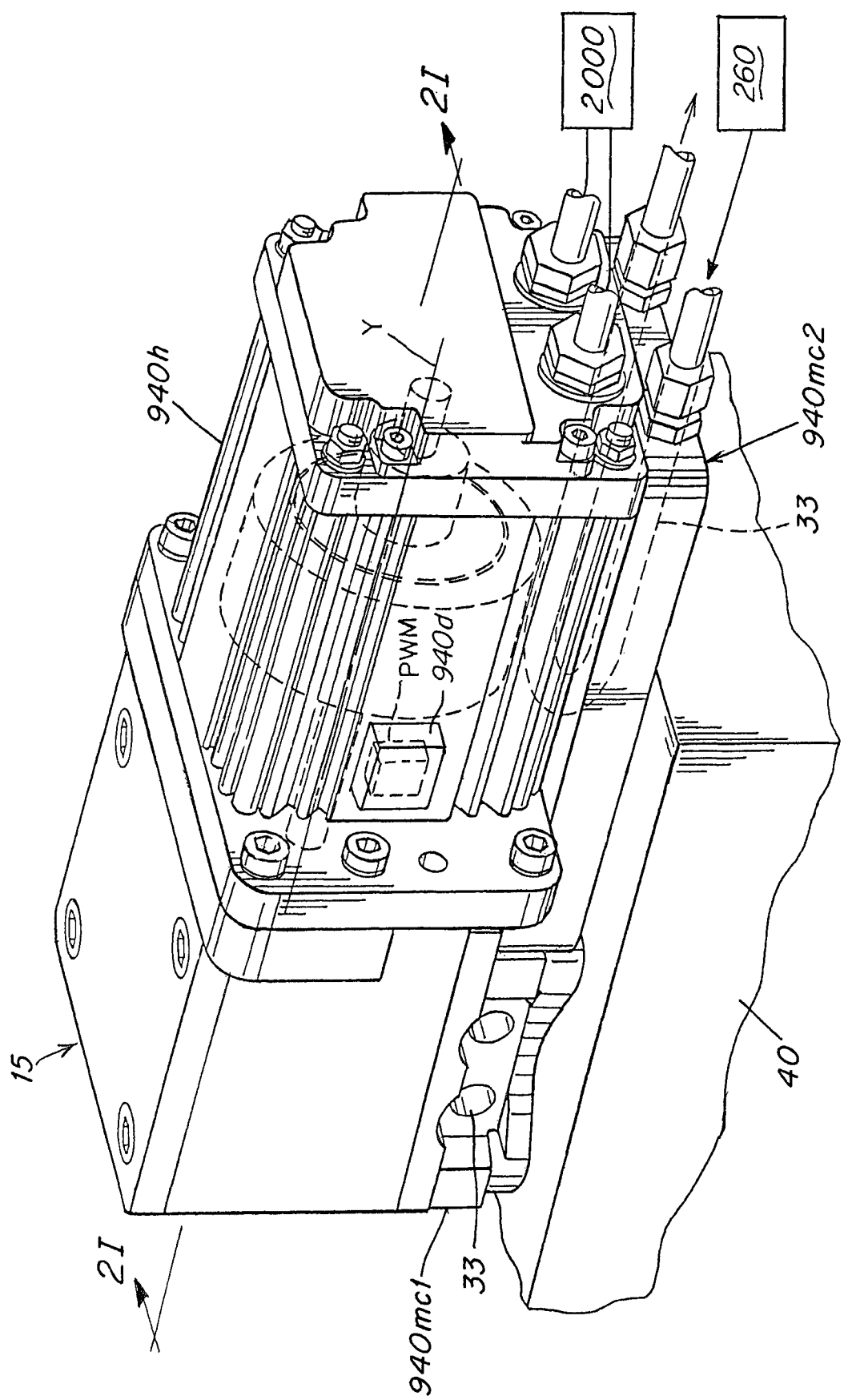
FIG. 2H is a top front perspective view of another embodiment comprised of an actuator having a drive axis Y that is arranged non-coaxially relative to the travel axis of the valve pin (1040), the actuator housing (940*h*) being mounted to, on or in close physical proximity to the heated manifold (40) via mounting of the actuator (940) to a linear travel converter (940*l*, 940*h*) which is in turn mounted on or to or in close physical proximity to a heated manifold (40) with a cooling device (940*mc*, 940*mc*1, 940*mc*2, 941*mc*, 942*mc*) being disposed between the heated manifold (40) and the linear travel converter (940*l*, 940*h*), the actuator housing (940*h*, 941*h*, 942*h*) and the electric drive (940*d*) the cooling device being adapted to substantially isolate or insulate at least the electrical drive (940*d*, 941*d*, 942*d*) from substantial communication with heat emanating or emitted from the heated manifold (40).

FIG. 2H shows another embodiment comprised of an actuator having a drive axis Y that is arranged non-coaxially relative to the travel axis of the valve pin (1040), the actuator housing (940*h*) being mounted to, on or in close physical proximity to the heated manifold (40) via mounting of the actuator (940) to a linear travel converter (940*l*, 940*h*) which is in turn mounted on or to or in close physical proximity to a heated manifold (40) with a separate unitary body cooling device such as a plate (940*mc*1) being disposed and arranged between the heated manifold (40) and the rotary to linear travel converter (940*l*, 940*h*). The actuator housing (940*h*) is separately mounted on or to a separate unitary body cooling device (940*mc*2). The cooling devices (940*mc*1, 940*mc*2) are each separately adapted and arranged to substantially isolate or insulate at least the electrical drive (940*d*, 941*d*, 942*d*) from substantial communication with heat emanating or emitted from the heated manifold (40). As shown the linear to linear converter (15) is mounted to the separate cooling device (940*mc*1) in an arrangement such that the linear to linear converter (940*l*) and electric drive (940*d*) are substantially isolated or insulated from substantial communication with heat emanating or emitted from the heated manifold (40). And, as shown the actuator housing (940*h*) is mounted to the separate cooling device (940*mc*2) in an arrangement such that the actuator housing (940*h*) and the electric drive (940*d*) are substantially isolated or insulated from substantial communication with heat emanating or emitted from the heated manifold (40). As shown each of the separate cooling devices or plates (940*mc*1, 940*mc*2) separately contain fluid channels (33) for receiving cool or cooled fluid that cools the cooling devices. In the FIGS. 2F, 2G, 2H, 2I embodiment, the linear to linear converter 940*l* comprises a travel converter that is comprised of a sliding body 507 fixedly interconnected a linear drive shaft 150 of the actuator. An undersurface of the sliding body 507 is slidably mounted on a mounting surface of a bottom wall of a subassembled body housing such that the sliding body 507 is controllably drivable along the first linear drive axis (Y) by controlled drive of the actuator with the controller 16. As shown in the specific embodiment, the sliding body 507 is formed to include an aperture or slot within the body 507 that is configured and adapted to cause the valve pin 1040 to be driven at one or more selected speeds along axis X in relation to the rotational speed of drive of the actuator 940. The upstream end of the valve pin is fixedly connected to a follower pin around which is typically mounted one or more wheels that are typically rotatably mounted on the follower pin as disclosed in WO2018/194961 the disclosure of which is incorporate herein by reference in its entirety as if fully set forth. The housing, follower pin, valve pin and manifold are assembled such that the guide slot receives the follower pin and wheels in an arrangement where the outside surfaces of the wheels engage against the guide surface of the slot. As the sliding body 507 is moved along axis Y the slot moves along axis X and the follower pin is forced by engagement against the moving slot surface to move along the non coaxial axis X, the valve pin thus moving along the axis X together with movement of the sliding body 507 along axis Y. The speed of movement of the valve pin 1040 depends both on the contour or profile of the surface of guide slot and on the speed of movement of the linear drive member 150 of actuator 940. Typically the linear drive member 150 of the FIGS. 2F, 2G, 2H embodiment is driven linearly along axis Y in the same fashion as the linear drive member 940l of the FIGS. 3A, 3B embodiment is driven along a coaxial pin axis X via a rotor nut 940 having threads 940rt that are screwably engaged with the male threads 940lt of the drive member 940l. In a similar manner, the linear drive member 150 of the FIGS. 2F, 2G embodiments can include a nut (not shown) that is fixedly disposed on the distal end of the linear drive member 150 the nut being screwably engaged with a complementary male thread 940rt disposed on the distal end of the motor's rotor 940r in an arrangement that causes the drive member 150 to be driven reciprocally along a linear axis Y that is non coaxial relative to the linear pin axis X. In all cases the linear drive member 150, 940, 940ld is driven linearly along a selected axis X, Y and is interconnected to the valve pin 1040, 1041 in an arrangement adapted to drive the valve pin reciprocally along the valve pin axis X. In the embodiment of FIGS. 2F to 2I, the slot has a linear or straight configuration such that the speed of movement of valve pin 1040 varies directly or linearly with the speed of movement of linear drive member 150. Alternatively, the slot 509 can have a stepped or curved surface configuration comprised of two separate straight steps of differing slopes or degrees of angle relative to linear movement axis X which results in the velocity of valve pin 1040 increasing when the valve pin is withdrawn upstream and reaches higher upstream positions. Thus the velocity of movement of the valve pin 1040 along the X axis can be changed relative to a constant linear drive member 150 velocity via a stepped or curved slot profile.

In the FIGS. 2F, 2G, 2H, 2I embodiment the conversion of motion of the motor is rotary motion of the rotor to linear motion of the drive member 150, 940l along axis Y to non coaxial linear motion of the valve pin along axis X.

As can be readily imagined, the contour or profile of the slot included in member 507 can be selected to be of any stepped, curved or other non linear configuration such that the velocity V of movement of the valve pin 80 along the linear axis X has any selected or predetermined non linear or varying correlation to the velocity of movement of the linear drive member 150, in particular such that the velocity along axis X changes to one or more greater or less preselected velocities over the course of travel of the valve pin 1040 between gate closed and gate full open positions where the velocity of the linear drive member 150 is constant over the same course of travel of the valve pin 1040.

Other configurations of linear converters that cause the pin to be driven as varying velocities over the course of an injection cycle can be used such as disclosed in WO2018/194961.

Figure 3A:
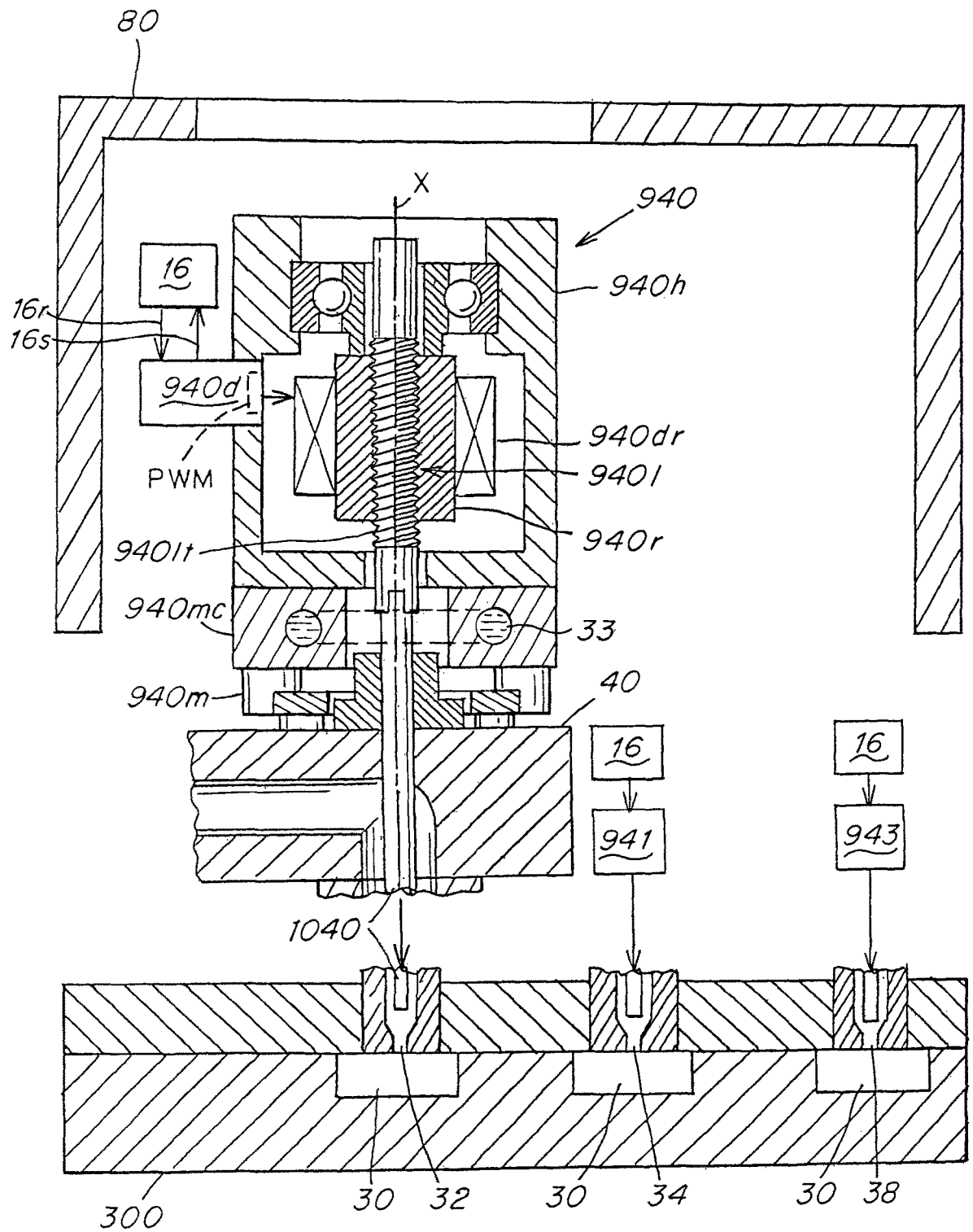
FIG. 3A is a side sectional schematic view of an electric actuator in an apparatus similar to the FIG. 1 apparatus where the actuator (940) has a drive axis Y that is coaxial with the travel axis of the valve pin (1040), the actuator housing (940*h*) being mounted to or on or in close physical proximity to the heated manifold (40) with a cooling device (940*mc*, 940*mc*1, 940*mc*2, 941*mc*, 942*mc*) being disposed between the heated manifold (40) and the actuator housing (940*h*, 941*h*, 942*h*) and the electric drive (940*d*) the cooling device being adapted to substantially isolate or insulate at least the electrical drive (940*d*, 941*d*, 942*d*) from substantial communication with heat emanating or emitted from the heated manifold (40).

FIG. 3A shows another embodiment of an electric actuator where the actuator (940) has a drive axis Y that is coaxial with the travel axis X of the valve pin (1040), the actuator housing (940h) being mounted to or on or in close physical proximity to the heated manifold (40) with a cooling device (940mc, 940mc1, 940mc2, 941mc, 942mc) being disposed between the heated manifold (40) and the actuator housing (940h, 941h, 942h) and the electric drive (940d). In this embodiment, the cooling device is adapted to substantially isolate or insulate at least the electrical drive (940d, 941d, 942d) from substantial communication with heat emanating or emitted from the heated manifold (40). The cooling device is also typically adapted and arranged to isolate or insulate the actuator housing (940h) and the rotary to linear converter (940l) from substantial communication with heat emanating or emitted from the heated manifold (40). The cooling device is also typically adapted to heat sink heat from the actuator housing (940h) and the rotary to linear converter (940l) to the cooling device.

Figure 3B:
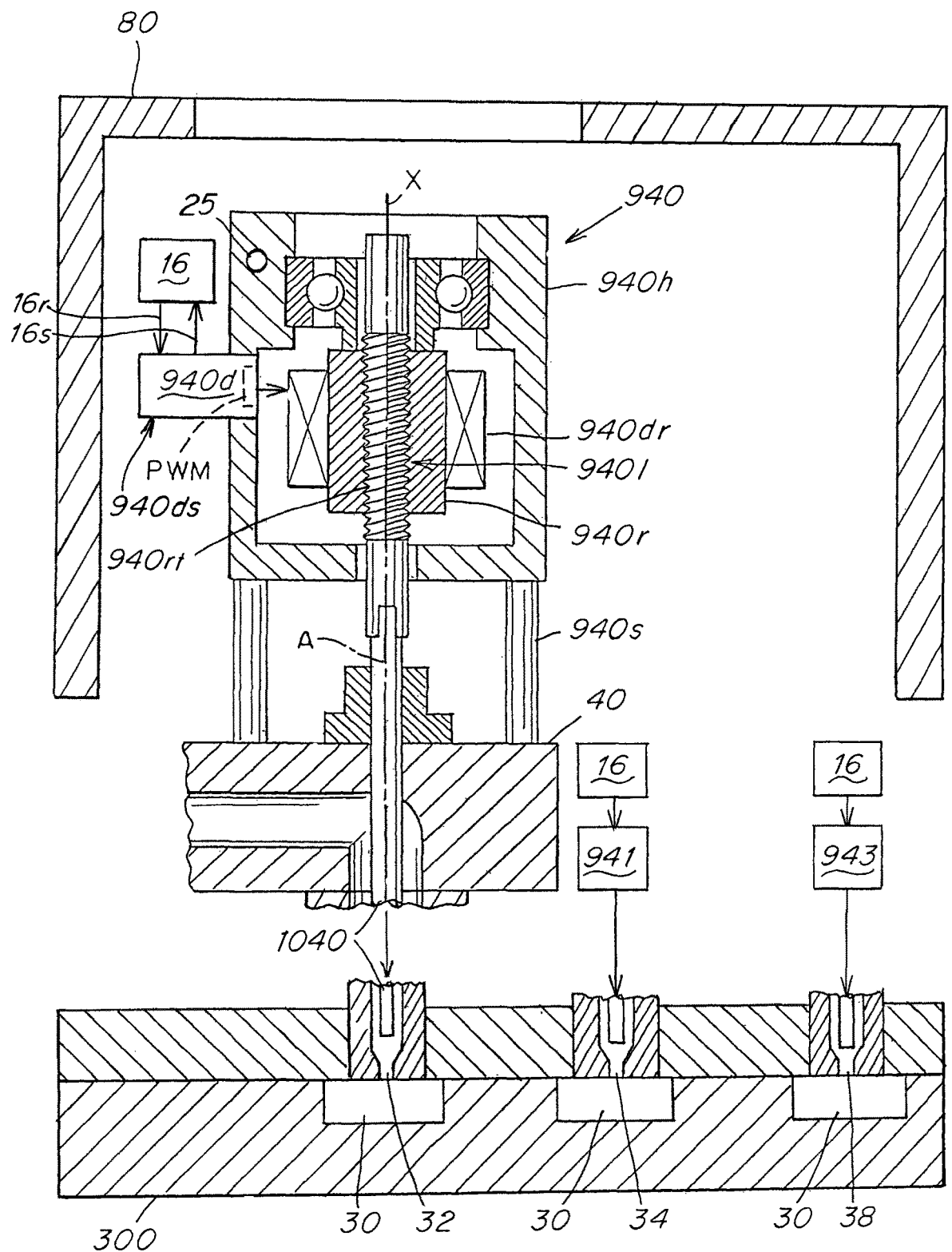
FIG. 3B is a side sectional schematic view of an electric actuator in a apparatus similar to the FIG. 1 apparatus where the actuator (940) has a drive axis Y that is coaxial with the travel axis of the valve pin (1040), the actuator housing (940*h*) being mounted to or on or in direct thermal communication with the heated manifold (40) via mounts (940*s*) mounted on or to or in direct thermal communication or contact with the heated manifold (40).

FIG. 3B shows an embodiment where the actuator (940) has a drive axis Y that is coaxial with the travel axis of the valve pin (1040), the actuator housing (940h) being mounted to or on or in direct thermal communication with the heated manifold (40) via mounts (940s) mounted on or to or in direct thermal communication or contact with the heated manifold (40). The cooling device is also typically adapted to heat sink heat from the actuator housing (940h) and the rotary to linear converter (940l) to the cooling device. The mounts 940s can be comprised of highly heat conductive material such as copper or alternatively comprised of heat insulative material such as titanium.

Figure 21:
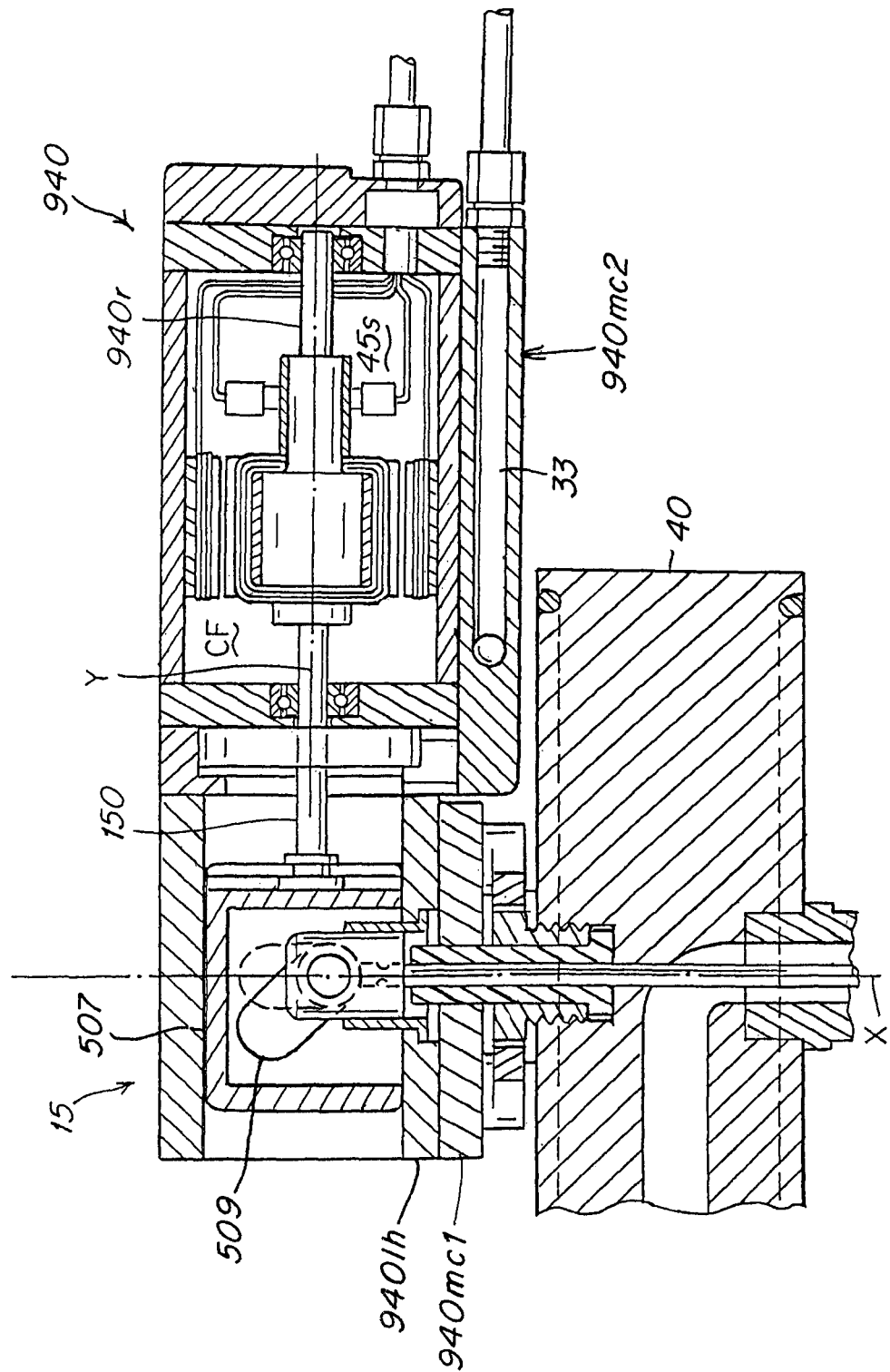
FIG. 21 is a schematic side sectional view of the armature and drive rod components of a linear drive proportional solenoid that can be substituted for the assembly of rotary motion enabling components of the rotary electric actuators described herein to enable direct linear actuation movement of the drive rod by the armature when energized with electricity.
Figure 22:
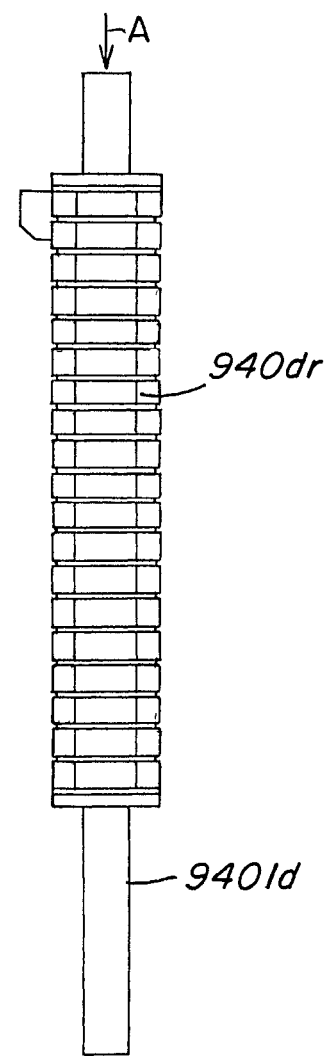
FIG. 22 is a schematic side sectional view of the armature and drive rod components of a linear motor that can be substituted for the assembly of rotary motion enabling components of the rotary electric actuators described herein to enable direct linear actuation movement of the drive rod by the armature when energized with electricity.

In all embodiments where the electric actuator 940 drives a linear drive member such as drive members 150, 940l, 940ld, the drive member can be driven directly by electromagnetic force 940ef generated by the driver 940r as described herein with reference to the solenoid and linear motor devices of FIGS. 21, 22. The selected axis A of drive of the drive member 150, 940l, 940ld can be coaxial or non coaxial relative to the pin axis X.

FIG. 4 shows an embodiment where the actuator (940) has a drive axis (Y) that is arranged non-coaxially relative to the travel axis of the valve pin (1040), the actuator housing (940h) being mounted in one iteration (940) both to a top clamp plate (80) and to or on or in direct thermal communication with the heated manifold (40) via mounting of the actuator (940) to a linear travel converter (940l, 940h) which is in turn mounted on or to or in direct thermal communication or contact with the heated manifold (40). In another iteration (940a) the housing of the actuator may or may not be mounted also to the top clamp plate 80.

Figure 5:
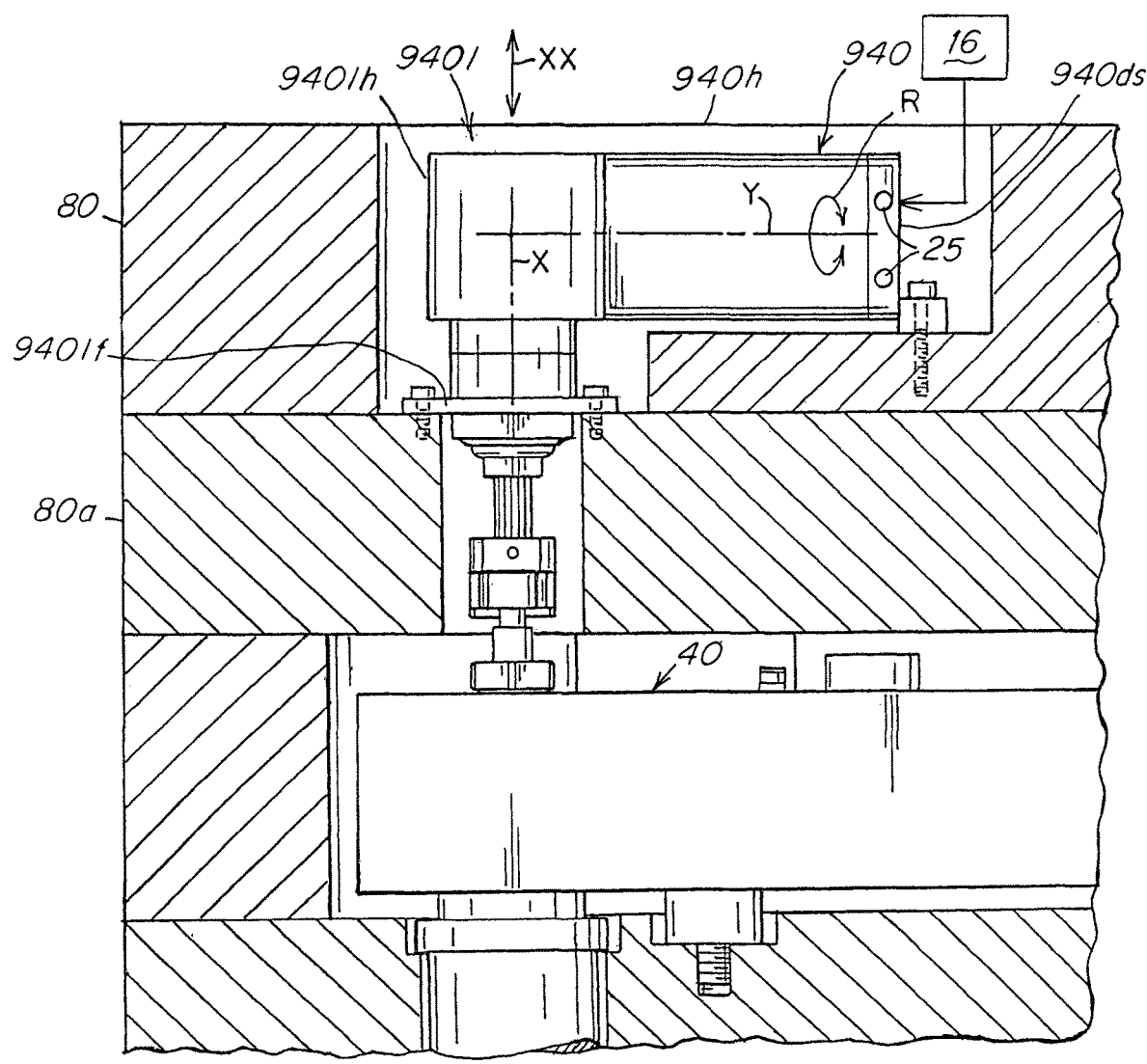
FIG. 5 is a side sectional schematic view of another electric actuator in a apparatus similar to the FIGS. 1, 2 apparatus where the actuator (940) has a drive axis Y that is arranged non-coaxially relative to the travel axis of the valve pin (1040), the actuator housing (940*h*) being mounted to or on or in direct thermal communication with the heated manifold (40) via mounting of the actuator (940) to a linear travel converter (940*l*, 940*h*) which is in turn mounted on or to a top clamping plate (80), the linear travel converter being disposed in direct thermal communication with the heated manifold (40).

FIG. 5 shows an apparatus similar to the FIG. 2 apparatus where the actuator (940) has a drive axis Y that is arranged non-coaxially relative to the travel axis X of the valve pin (1040), the actuator housing (940h) being mounted to or on or in direct thermal communication with the heated manifold (40) via mounting of the actuator (940) to a linear travel converter (940l) having a housing (940lh) which is in turn mounted on or to a top clamping plate (80) via a flange (940lf), the linear travel converter (940l) being disposed in direct thermal communication with the heated manifold (40).

The system includes an actuator (5) comprised of a rotor (250) having a drive axis (Y) and a driver (100, 200) interconnected to the rotor (250) adapted to drive the rotor around the drive axis, the driver (100, 200, FIGS. 1, 4, receiving electrical energy or power that generates drive heat.

The actuator (5) has a housing jacket (20) comprised of radial (20r, 20ri, 20rit, 20ro, 20roa, 20rob, 20roc, 20rod) and axial walls (20a, 20ai, 20aue, 20ade) that form an enclosed chamber (45) containing a heat conductive chamber fluid (CF), the rotor and driver (250, 100, 200) being mounted within the chamber (45) in intimate heat conductive contact with the heat conductive fluid. The radial walls

20*r*, 20*ri*, 20*ro*, 20*roa*, 20*rob*, 20*roc*, 20*rod* are generally disposed in a radial position or location relative to the axis Y of the rotor 250. And, the axial walls are generally disposed in an axial position or location relative to the axis Y of the rotor 250.

The radial 20*r*, 20*ri*, 20*rit*, 20*ro*, 20*roa*, 20*rob*, 20*roc*, 20*rod* walls and the axial walls 20*a*, 20*ai*, 20*aue*, 20*ade* are interconnected to form an independent housing jacket body 20 that is typically removably attached to and preferably readily detachable from the housing 120 of a linear travel converter or transmission 15. The housing 120 of the linear travel converter or transmission typically comprises one or more converter or transmission walls (120*r*, 120*rb*, 120*rc*, 120*ri*, 120*ro*, 120*a*) that are comprised of a heat conductive material. The converter or transmission walls (120*r*, 120*rb*, 120*rc*, 120*ri*, 120*ro*, 120*a*) are typically mounted to the heated manifold (300) in an arrangement such that the manifold heat 300 is communicated to the converter or walls (120*r*, 120*rb*, 120*rc*, 120*ri*, 120*ro*, 120*a*).

As shown in FIGS. 6, 6A, 6B, 7, 7A one or more of the radial and axial walls (20*r*, 20*ro*, 20*ri*, 20*roa*, 20*rob*, 20*roc*, 20*rod*, 20*a*, 20*ai*, 20*aue*, 20*ade*) are disposed in heat conductive contact or communication with heat generated by the manifold (300) or heat generated within the enclosed chamber (45). One or more of the radial or axial walls of the actuator housing can comprise a first unitary body (20*r*, 20*a*, 20*ri*, 20*ai*) that is comprised of a heat conductive material having an inner surface (20*ris*, 20*ais*, 20*riis*, 20*aiis*) disposed in intimate heat conductive contact with the interior space (45*s*) of the chamber. One or more of the radial or axial walls comprise a second unitary body (20*ro*, 20*ao*) comprised of a heat conductive material that has an inner surface (20*rois*, 20*aois*) in intimate heat conductive contact or communication with a heat communicating surface (20*rihcs*, 20*aihcs*) of the first unitary body (20*ri*, 20*ai*) or of one or more intermediate unitary bodies (not shown) that are comprised of a heat conductive material and have a second inner surface (20*riis*, 20*aiis*) that is disposed in intimate heat conductive contact or communication with the interior space (45*s*) of the chamber (45).

The actuator tube or channel (25) can be disposed within the second unitary body (20*ro*, 20*ao*). The first unitary body (20*r*, 20*a*, 20*ri*, 20*ai*) is typically comprised of a heat insulative material and the second unitary body (20*ro*, 20*ao*) is typically comprised of a highly heat conductive material.

In embodiments in which an actuator or converter housing wall includes two or more unitary wall bodies, such as a first inner wall body (20*r*, 20*a*, 20*ri*, 20*ai*, 120*r*, 120*a*, 120*ri*, 120*ai*) and a second outer body (20*ro*, 20*ao*, 120*ro*, 120*ao*), the outer wall body is preferably attached to an inner wall body in compressed surface to surface contact such that the attached two or more unitary wall bodies function as a single wall body for purposes of heat absorption and dissipation, the active cooling channel in the outer wall body acting to receive and dissipate heat from the one or more inner wall bodies to which the outer wall body is attached as if the cooling channel were disposed within the inner wall body.

The driver 100, 200, 940*dr*, 941*dr*, 942*dr* of the motor when supplied with electrical power to drive the rotor 250 become heated and in turn heat the gas or fluid CF that resides or is contained or enclosed within the motor chamber 45 with which the driver 100, 200, 940*dr*, 941*dr*, 942*dr* is in contact with. The driver 100, 200, 940*dr*, 941*dr*, 942*dr* is typically comprised of conventional electric motor stator and armature copper or other electrically conductive metal wires or coils. Thus when the coils or wires of driver 100, 200, 940*dr*, 941*dr*, 942*dr* are heated, the gas CF within the chamber 45 is heated and the heated gas CF in turn heats up the housing walls 20*r*, 20*ro*, 20*ri*, 20*roa*, 20*rob*, 20*roc*, 20*rod*, 20*a*, 20*ai*, 20*aue*, 20*ade* which the heated gas CF is in contact with. The rotor 250 and driver 100, 200, 940*dr*, 941*dr*, 942*dr* are rotatably supported within the chamber by the radial and axial walls (20*r*, 20*ro*, 20*ri*, 20*roa*, 20*rob*, 20*roc*, 20*rod*, 20*a*, 20*ai*, 20*aue*, 20*ade*).

The driver 100, 200, 940*dr*, 941*dr*, 942*dr* is controllably drivable by a controller 16, 2000 that includes a program that can be programmed to controllably position the axial or linear position of one or more valve pins driven by associated actuator motors that may be contained within any injection molding system 1000.

One or more of the radial and axial walls (20*r*, 20*ro*, 20*ri*, 20*roa*, 20*rob*, 20*roc*, 20*rod*, 20*a*, 20*ai*, 20*aue*, 20*ade*) are comprised of a heat conductive material, such as steel, aluminum or the like. One or more of the walls have an inner surface, 20*is*, 20*iis*, 20*ais*, disposed in heat conductive contact with the heat conductive fluid (CF) contained within the enclosed chamber 45. The one or more radial or axial walls (20*r*, 20*ro*, 20*ri*, 20*roa*, 20*rob*, 20*roc*, 20*rod*, 20*a*, 20*ai*, 20*aue*, 20*ade*) absorb heat from the heat conductive fluid (CF) contained within the chamber (45).

An actuator tube or channel (25) is typically embedded or bored or formed within the solid material body of selected ones of the radial or axial walls (20*r*, 20*ro*, 20*ri*, 20*roa*, 20*rob*, 20*roc*, 20*rod*, 20*a*, 20*ai*, 20*aue*, 20*ade*) such that the tube or channel is surrounded around its circumference by and maintained in intimate heat conductive contact or communication with the heat conductive material of which a radial or axial wall is comprised.

A source (260) of heat absorptive fluid (25*f*) which is typically actively cooled, is sealably interconnected to the tube or channel (25) such that the fluid is actively pumped or routed through the tube or channel (25) in a flow that absorbs and transports heat away from the one or more actuator heat conductive walls (20*r*, 20*ro*, 20*ri*, 20*roa*, 20*rob*, 20*roc*, 20*rod*, 20*a*, 20*ai*, 20*aue*, 20*ade*) typically to a larger actively cooled source of the fluid. The cooling fluid 25*f* typically comprises water, antifreeze or a similar inert fluid that can be readily pumped through the cooling channels or pipes 25. Where a tube, as opposed to a bore in the wall material, is used as the vehicle for cooling fluid flow, the tube 25 is typically comprised of a highly heat absorptive or conductive material such as copper or the like. And where a tube is used, the tube is embedded within the body of the wall material such that the outer circumference of the walls of the tube are in intimate heat conductive contact with the wall material.

As shown, a valve pin (800) having a pin axis (X), the valve pin is interconnected to the rotor (250) such that the valve pin is oriented or disposed along a linear path of travel (XX) that is typically coaxial with the pin axis (X).

The system 1000 includes a heated manifold (300) that generates manifold heat. The housing (20) of the actuator 5 is typically mounted in heat conductive communication with the heated manifold (300) such that manifold heat is absorbed by or communicated to the one or more radial and axial walls (20*r*, 20*ro*, 20*ri*, 20*roa*, 20*rob*, 20*roc*, 20*rod*, 20*a*, 20*ai*, 20*aue*, 20*ade*) of the housing.

The one or more radial or axial walls can comprise a unitary body (20*r*, 20*ro*, 20*a*, 20*a0*) comprised of the heat conductive material. The unitary wall body has an inner surface (20*ris*, 20*ais*) that can be disposed directly in intimate heat conductive contact with the fluid (CF) contained within the chamber.

Alternatively, the radial or axial walls of the actuator 5 can comprise a first outer unitary body that is mounted or attached to a second inner or intermediate unitary wall body (20ri, 20ai). In such an embodiment the outer unitary body has an inner surface (20rois, 20aois) that is disposed in intimate heat conductive contact with an intermediate heat communicating surface (20rihcs, 20aihcs) of the inner or intermediate unitary body (20ri, 20ai). In such an embodiment, the inner or intermediate wall body is comprised of a heat conductive material having a second inner surface (20riis, 20aiis) that is disposed in direct intimate heat conductive contact with the fluid (CF) contained within the chamber (45).

In embodiments where the one or more radial or axial walls comprise a first outer unitary body (20ro, 20a0) and a second inner or intermediate unitary body (20ri, 20ai), first or outer unitary body is typically comprised of a first heat conductive material that is a heat insulative or low-heat conductive material such as titanium. And, the second outer or intermediate unitary wall body is typically comprised of a highly heat conductive material such as copper, aluminum or the like.

The system can further comprise a linear travel converter (15) interconnected between the rotor (250) and the valve pin (800) in an arrangement that converts rotation movement of the rotor to linear movement (XX) of the valve pin (800). The linear travel converter (15) typically comprises a converter housing (120) that is comprised of one or more converter walls (120r, 120rb, 120rc, 120ri, 120ro, 120a) that are comprised of a heat conductive material. The converter walls (120r, 120rb, 120rc, 120ri, 120ro, 120a) can be mounted to the heated manifold (300) in an arrangement such that the manifold heat is communicated to the converter walls (120r, 120rb, 120rc, 120ri, 120ro, 120a).

The converter tube or channel (125) is typically embedded or bored within the body of selected ones of the converter walls (120r, 120rb, 120rc, 120ri, 120ro, 120a) such that the tube or channel 125 is surrounded by and disposed in intimate heat conductive contact with the heat conductive material of one or more of the converter walls (120r, 120rb, 120rc, 120ri, 120ro, 120a).

A source of heat absorptive fluid (125f) as described above is typically sealably interconnected to the converter tube or channel (125) in an arrangement such that the heat absorptive fluid (125f) is actively pumped or routed through the converter tube or channel (125) in a flow that absorbs the manifold heat communicated to the converter walls.

One or more of the converter walls (120r, 120rb, 120rc, 120ri, 120ro, 120a) can have an outer surface (120aos, 120ros) that is disposed in heat conductive communication or contact with a heat conductive surface (20aos) of one or more of the radial and axial walls (20r, 20ro, 20roa, 20rob, 20roc, 20rod, 20a, 20aue, 20ade) of the actuator (5) such that heat absorbed by or contained with the converter walls is conducted or transmitted to or from the actuator walls.

One or more of the converter walls (120r, 120rb, 120rc, 120ri, 120ro, 120a) can have an inner surface (120ris, 120ais) that disposed in heat conductive communication with a linear travel device (127) that is interconnected between the rotor (250) and the valve pin to convert rotation movement of the rotor to linear movement (XX) of the valve pin (800). In such an embodiment the converter walls are arranged so as to form an enclosure or chamber 55, 127c within which the linear travel device 127 is mounted or disposed. The inner surface (120ris, 120ais) of the converter walls is typically in heat conductive contact or communication with the linear travel device 127.

One or more of the converter walls can comprise a unitary body comprised of a heat conductive material (120r, 120a, 120ro, 120ao) that has an inner surface 120ris, 120ais that is in direct heat conductive or communicative contact with the chamber 127c or the linear travel device 127 itself.

In an alternative embodiment the one or more converter walls can comprise a first outer unitary body (120ro, 120ao) of heat conductive material and a second intermediate or inner unitary body (120ri) to which the first outer unitary body is attached. In such an embodiment, the outer or first unitary body 120ro, 120ao has an inner surface (120rois) in heat conductive contact with a heat communicating surface (120rihcs) of the inner or intermediate unitary body (120ri). The inner or intermediate unitary body is comprised of a heat conductive material having a second inner surface (20riis) that is disposed in heat conductive contact or communication with the linear travel device 127 or with the air or gas contained within the chamber 55, 127c.

In another alternative embodiment, the linear travel converter (15) can be mounted within the same enclosed chamber 45 as the driver 100, 200, 940dr, 941dr, 942dr in contact with the heat conductive chamber fluid (CF). In such an embodiment, the housing (20) of the actuator 5 is typically mounted in heat conductive communication with the heated manifold (300) such that manifold heat is absorbed by or communicated to the one or more radial and axial walls (20r, 20ro, 20ri, 20roa, 20rob, 20roc, 20rod, 20a, 20ai, 20aue, 20ade) of the housing 20. The heat absorptive fluid (25f) is routed in a flow such that the manifold heat is absorbed by or communicated to the one or more radial and axial walls (20r, 20ro, 20ri, 20roa, 20rob, 20roc, 20rod, 20a, 20ai, 20aue, 20ade) of the housing. In such an embodiment, the rotor axis Y and the travel axis of the valve pin X, XX are typically adapted to be coaxial.

A system according to the invention can include a transmission that is typically comprised of one or more gears, racks, screws or nuts (16a, 16b, 72, 190, 191, 195, 950, 960, 970) that are adapted to convert rotational movement of the rotor (250) around the rotor axis Y to linear movement of the valve pin along an axis (X, XX) that is non-coaxial relative to the rotor axis (Y). In such an embodiment, one or more of the transmission walls (120r, 120ro, 120ri, 120a, 120ao, 120ai) form an enclosed chamber 55 that houses or encloses one or more of the gears, racks, screws or nuts (16a, 16b, 72, 190, 191, 195, 950, 960, 970). The one or more transmission walls (120r, 120ro, 120ri, 120a, 120ao, 120ai) are typically comprised of a heat conductive material. A converter tube or channel (125) is embedded within or surrounded by and in intimate heat conductive contact with the heat conductive material of which the one or more of the transmission walls (120r, 120ro, 120ri, 120a, 120ao, 120ai) is comprised. As described above with reference to the actuator housing walls, a source of heat absorptive fluid (125F) is sealably interconnected to the converter tube or channel (125) in an arrangement such that the heat absorptive fluid (125f) is pumped or routed through the converter tube or channel (125) in a flow that absorbs heat absorbed by or communicated to the one or more transmission walls (120r, 120ro, 120ri, 120a, 120ao, 120ai).

In an alternative embodiment, the actuator housing 20 can be removably mounted and attached to a top clamping or mounting plate 1002 that is mounted upstream of the manifold 300 and interconnected to the mold. The clamping or mounting plate 1002 is typically maintained in a cool condition relative to the heated manifold either by being mounted in spaced apart relationship to the heated manifold 300 or by active cooling with fluid channels or tubes fed with cooling fluid, the channels or tubes being embedded within the clamp plate 2002 in intimate contact with the body of the clamp plate 1002.

In another alternative embodiment, the housing 120 of the linear travel converter 15 can be mounted and removably attached to a top clamping or mounting plate 1002 that is mounted upstream of the manifold and interconnected to the mold. Again, the clamping or mounting plate 1002 is typically maintained in a cool condition relative to the heated manifold either by being mounted in spaced apart relationship to the heated manifold 300 or by active cooling with fluid channels or tubes fed with cooling fluid, the channels or tubes being embedded within the clamp plate 2002 in intimate contact with the body of the clamp plate 1002.

Typically one or the other or both of the linear travel converter 15 and the actuator 20 is mounted to the heated manifold 300.

The actuator typically has a housing (20) comprised of radial (20r, 20ri, 20ro, 20roa, 20rob, 20roc, 20rod) and axial walls (20a, 20ai, 20aue, 20ade) that form an enclosed chamber (45) containing a heat conductive chamber fluid (CF), the rotor and driver (100, 200, 940dr, 941dr, 942dr) being mounted within the chamber (45) in intimate heat conductive contact with the heat conductive fluid. The rotor and driver are typically supported within the chamber by the radial and axial walls (20r, 20ro, 20ri, 20roa, 20rob, 20roc, 20rod, 20a, 20ai, 20aue, 20ade) in an arrangement such that the rotor (250) and driver (100, 200, 940dr, 941dr, 942dr) are drivably rotatable within the chamber (45).

One or more of the radial and axial walls (20r, 20ro, 20ri, 20roa, 20rob, 20roc, 20rod, 20a, 20ai, 20aue, 20ade) typically comprise a heat conductive material that has an inner surface disposed in heat conductive contact with the heat conductive fluid (CF) contained within the enclosed chamber. The one or more radial or axial walls (20r, 20ro, 20ri, 20roa, 20rob, 20roc, 20rod, 20a, 20ai, 20aue, 20ade) absorb heat from the heat conductive fluid (CF) contained within the chamber (45) and have an actuator tube or channel (25) surrounded by and in intimate heat conductive contact with the heat conductive material of a first one of the radial and axial walls (20r, 20ro, 20ri, 20roa, 20rob, 20roc, 20rod, 20a, 20ai, 20aue, 20ade). A source (260) of heat absorptive fluid (25f) is sealably interconnected to the tube or channel (25) in an arrangement such that the heat absorptive fluid (25f) is routed through the tube or channel (25) in a flow that absorbs heat from the one or heat conductive walls (20r, 20ro, 20ri, 20roa, 20rob, 20roc, 20rod, 20a, 20ai, 20aue, 20ade).

In some embodiments at least one of the radial walls can comprise a non-actively cooled unitary body (20rot) having an inner surface (20rotis) in intimate heat conductive contact with an outer surface (20roos) of the first one of the radial and axial walls (20r, 20ro, 20ri, 20roa, 20rob, 20roc, 20rod, 20a, 20ai, 20aue, 20ade).

The at least one of the radial walls that comprises the non-actively cooled unitary body can further comprise an intermediate unitary body (20ri) having a heat conductive surface (20rihcs) in intimate heat conductive contact with the inner surface (20rotis) of the non-actively cooled unitary body (20rot). The intermediate unitary body is typically comprised of a heat conductive material having a second inner surface (20ris, 20riis, 20aiis) that is disposed in intimate heat conductive contact with the fluid (CF) contained within the chamber (45).

The first one of the radial or axial walls can comprise a unitary body (20r, 20a) comprised of a heat conductive material having an inner surface (20ris, 20ais) disposed in intimate heat conductive contact with the fluid (CF) contained within the chamber or can comprise a unitary body (20ro, 20ao) comprised of a heat conductive material that has an inner surface (20rois, 20aois) in intimate heat conductive contact with a heat communicating surface (20rihcs, 20aihcs) of an intermediate unitary body (20ri, 20ai) comprised of a heat conductive material having a second inner surface (20riis, 20aiis) that is disposed in intimate heat conductive contact with the fluid (CF) contained within the chamber (45).

Such apparatuses include a heated manifold (300) generating manifold heat, the housing (20) of the actuator being mounted in heat conductive communication with the heated manifold (300) such that manifold heat is absorbed by or communicated to the one or more radial and axial walls (20r, 20ro, 20ri, 20roa, 20rob, 20roc, 20rod, 20a, 20ai, 20aue, 20ade) of the housing, the heat absorptive fluid (25f) absorbing the manifold heat absorbed by or communicated to the one or more radial and axial walls (20r, 20ro, 20ri, 20roa, 20rob, 20roc, 20rod, 20a, 20ai, 20aue, 20ade) of the housing.

In some embodiments the apparatus can further comprise a linear travel converter (15, 940l) interconnected between the rotor (250) and the valve pin (1041, 800) in an arrangement that converts rotation movement of the rotor to linear movement (XX) of the valve pin (1041, 800). The linear travel converter (15, 940l) typically comprises a converter housing (120, 940lh) comprised of one or more converter walls (120r, 120rb, 120rc, 120ri, 120ro, 120a) that are comprised of a heat conductive material, the converter walls (120r, 120rb, 120rc, 120ri, 120ro, 120a) being mounted to the heated manifold (300) in an arrangement such that the manifold heat is communicated to the converter walls (120r, 120rb, 120rc, 120ri, 120ro, 120a). The converter walls include a converter tube or channel (125) surrounded by and in intimate heat conductive contact with the heat conductive material of one or more of the converter walls (120r, 120rb, 120rc, 120ri, 120ro, 120a). A source of heat absorptive fluid (125F) is sealably interconnected to the converter tube or channel (125) in an arrangement such that the heat absorptive fluid (125f) is routed through the converter tube or channel (125) in a flow that absorbs the manifold heat communicated to the converter walls.

In such embodiments one or more of the converter walls (120r, 120rb, 120rc, 120ri, 120ro, 120a) can have an outer surface (120aos, 120ros) disposed in heat conductive communication with a heat conductive surface (20aos) of one or more of the radial and axial walls (20r, 20ro, 20roa, 20rob, 20roc, 20rod, 20a, 20aue, 20ade) of the actuator (5). One or more of the converter walls (120r, 120rb, 120rc, 120ri, 120ro, 120a) can have an inner surface (120ris, 120ais) disposed in heat conductive communication with a linear travel device (127) that is interconnected between the rotor (250) and the valve pin to convert rotation movement of the rotor to linear movement (XX) of the valve pin (1041, 800).

In such embodiments one or more of the converter walls typically comprises a unitary body (120ro) comprised of the heat conductive material having an inner surface (120rois) in heat conductive contact with a heat communicating surface (120rihcs) of an intermediate unitary body (120ri) comprised of a heat conductive material having a second inner surface (20riis) that is disposed in heat conductive communication with a linear travel device (127) that is interconnected between the rotor (250) and the valve pin to convert rotation movement of the rotor to linear movement (XX) of the valve pin (800).

In some embodiments, the rotor (250) has a rotor axis (Y) and the system can includes a transmission comprised of one or more gears, racks, screws or nuts adapted to convert rotational movement of the rotor (250) around the rotor axis (Y) to linear movement of the valve pin along an axis (X, XX) that is non-coaxial relative to the rotor axis (Y). In such embodiments one or more transmission walls (120*r*, 120*ro*, 120*ri*, 120*a*, 120*ao*, 120*ai*) form an enclosed chamber (55) that encloses one or more of the gears, racks, screws or nuts, the one or more transmission walls (120*r*, 120*ro*, 120*ri*, 120*a*, 120*ao*, 120*ai*) being comprised of a heat conductive material.

In some embodiments a converter tube or channel (125) is surrounded by and in intimate heat conductive contact with the heat conductive material of one or more of the transmission walls (120*r*, 120*ro*, 120*ri*, 120*a*, 120*ao*, 120*ai*). A source of heat absorptive fluid (125F) is sealably interconnected to the converter tube or channel (125) in an arrangement such that the heat absorptive fluid (125*f*) is routed through the converter tube or channel (125) in a flow that absorbs heat absorbed by or communicated to the one or more transmission walls (120*r*, 120*ro*, 120*ri*, 120*a*, 120*ao*, 120*ai*).

In some embodiments the actuator housing (20) can be removably attached to a top clamping or mounting plate (1002) that is mounted upstream of the manifold and interconnected to the mold.

In some embodiments the linear travel converter (15) is removably attached to a top clamping or mounting plate (1002) that is mounted upstream of the manifold and interconnected to the mold.

Thus a linear travel converter 15 is a device that either converts linear motion or rotary motion to linear motion along an axis X, XX that is not coaxial with the axis Y of the motor.

Figure 16:
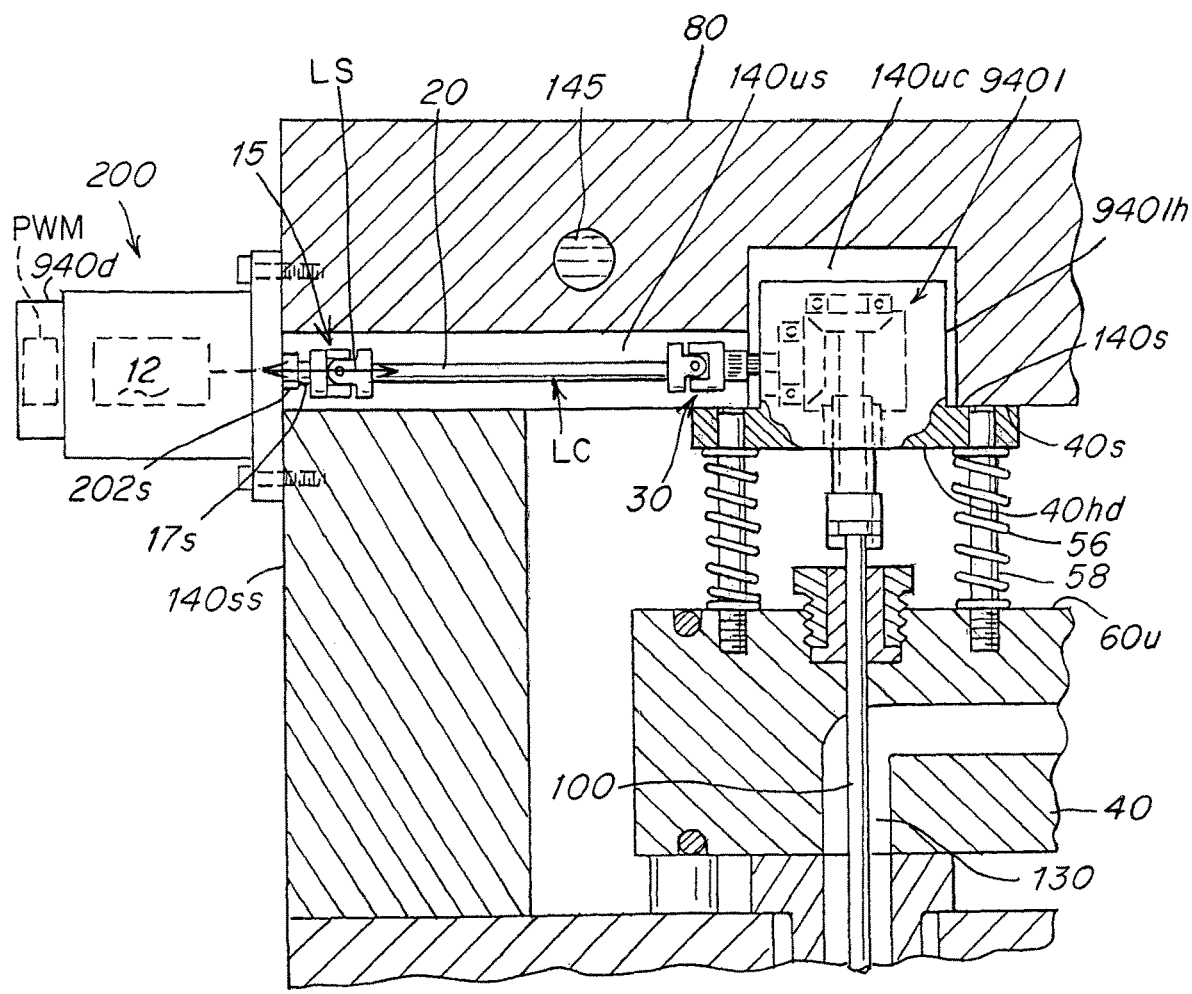
FIG. 16 is a side sectional schematic view of another embodiment of an injection molding system having electric actuators with electric drive 940d mounted on or to the actuator housing, the actuators and electric drive 940d being mounted in an extended spaced apart relationship relative to the heated manifold such that the actuator and electric drive 940d are isolated or insulated from substantial or significant heat communication with the heated manifold 40. In the embodiment shown the actuator and electric drive are mounted to a cool or cooled top clamp plate 140 and are interconnected to a rotary to linear drive converter device, the linear drive converter device also being mounted to the top clamp plate.

FIG. 16 shows another embodiment where electric actuators 200 with electric drive 940*d* are mounted in an extended spaced apart relationship relative to the heated manifold such that the actuator and electric drive 940*d* are isolated or insulated from substantial or significant heat communication with the heated manifold 40. In the embodiment shown the actuator and electric drive are mounted to a cool or cooled top clamp plate 80 and are interconnected to a rotary to linear drive converter device, the linear drive converter device also being mounted to the top clamp plate. As shown in FIG. 16, the electrically powered actuator 200 is mounted on side surface 140*ss* of the top clamp plate 140 and the elongated shaft 20 and converter 940*l* are mounted within apertures or channels 140*us*, 140*uc* formed on the interior or underside of the top clamp plate. Again, the top clamp plate 80 is typically cooled via water that flows through cooling channels 145 bored within the top clamp plate 80. In the FIG. 16 embodiment, the converter 940*l* is mounted to the heated manifold 40 via bolts 58 and springs 56. The bolts 58 cause the converter housing 940*lh* and its interconnected valve pin 100 to travel radially R together with radial expansion or travel of the heated manifold thus minimizing the necessity for prevention of pin decoupling or pin deformation due to radial expansion of the heated manifold 40. The springs 56 are resiliently compressibly engaged between an upstream surface 60*u* of the manifold 60 and a downstream surface 40*hd* of the housing 940*lh* to cause an upstream facing heat conductive surface 40*s* of the housing 40 to compressibly engage with a downstream facing heat conductive surface 140*s* of the cooled top clamp plate 80 thus working to cause heat from the manifold 40 that is transmitted to housing 940*lh* to be transmitted from housing 940*lh* to the cooled top clamp plate 80 thus cooling the converter housing 940*h* and the converter components 40*c* generally.

Figure 17:
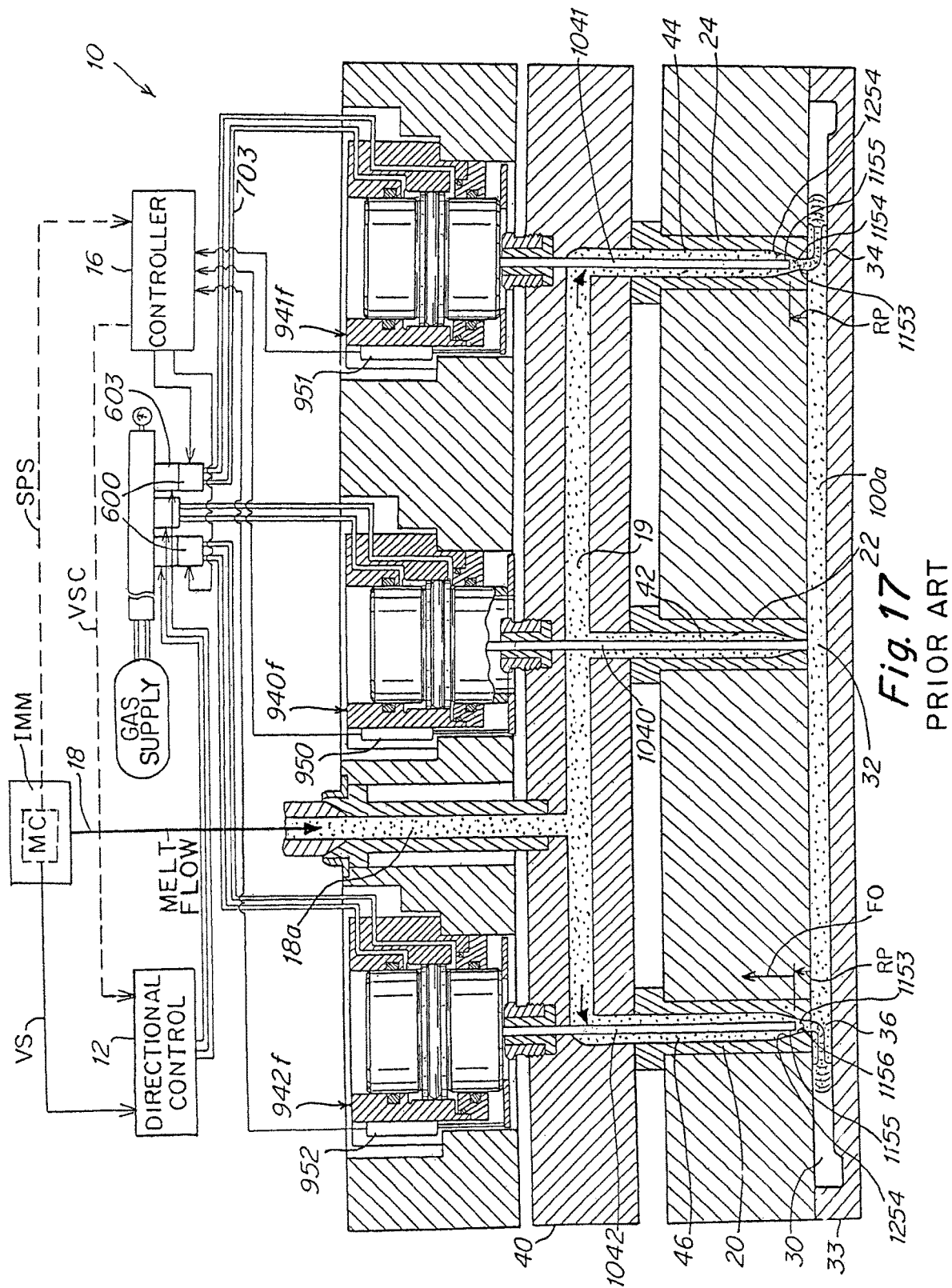
FIG. 17 is a side schematic view of a prior art injection molding apparatus in which an injection molding machine (IMM) includes a stock or standard IMM controller or signal generator that sends a standard IMM controller signal to the solenoid of a directional flow control valve that directs the position of the valve to move between a valve gate closed and valve gate open position.

FIG. 17 shows a conventional prior art pneumatically (or hydraulically) driven apparatus 10 with a central nozzle 22 feeding molten material 18 from an injection molding machine IMM through a main inlet 18*a* to a distribution channel 19 of a manifold 40. The IMM typically comprises a barrel (not shown) and a controllably rotatably drivable or driven screw BS that initiates and ends an injection cycle at selected points in time when the screw BS is rotatably driven to generate flow of injection fluid 18. The beginning of an injection cycle is typically defined at a selected point in time when the screw BS is initially rotated from a standstill position or at a time that occurs shortly after the time when the screw BS is initially begun rotating. The end of the cycle is typically defined by a time at which the screw BS is stopped from rotating following and after the selected time that defines the beginning of the cycle when the screw BS is drivably rotated. The distribution channel 19 commonly feeds three separate nozzles 20, 22, 24 which all commonly feed into a common cavity 30 of a mold 33. One of the nozzles 22 is controlled by fluid driven actuator 940*f* and arranged so as to feed into cavity 30 at an entrance point or gate that is disposed at about the center 32 of the cavity. As shown, a pair of lateral nozzles 20, 24 feed into the cavity 30 at gate locations that are distal 34, 36 to the center gate feed position 32.

Figure 18:
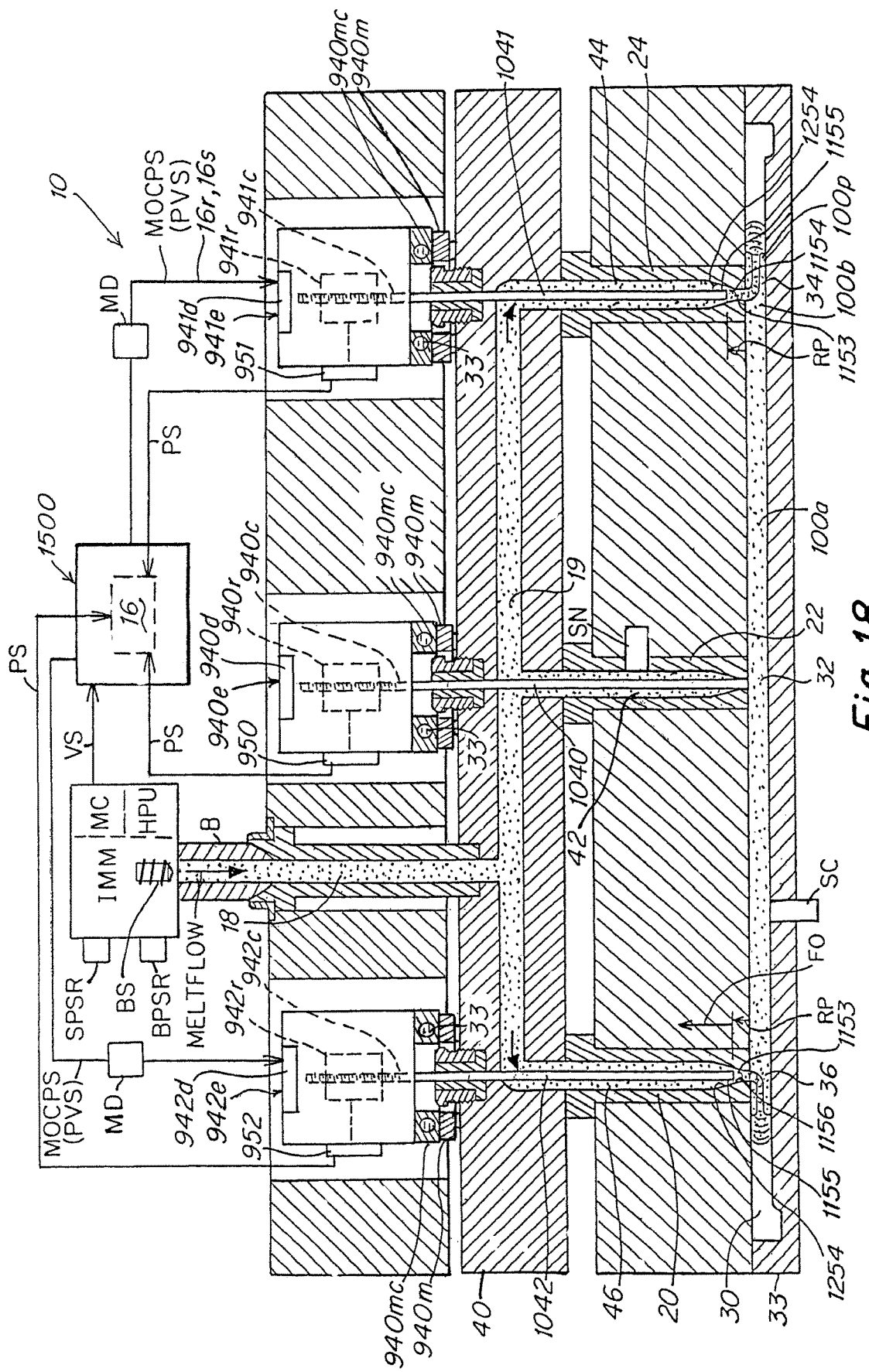
FIG. 18 is a side schematic view of one embodiment of an injection molding apparatus according to the invention where the valve gates include an electrically powered or electric motor containing actuator, the apparatus including a machine signal converter that receives a standard signal generated by an injection machine controller converts the signal to a control signal compatible with the signal receptor of the electrically powered actuators used in the apparatus, the converter routing the converted signal to the actuator processor.

As shown in FIGS. 17 and 18 the injection cycle using apparatuses according to the present invention are most preferably a cascade process as described in U.S. Pat. No. 1,056,945, the disclosure of which is incorporated by reference as if fully set forth herein, where injection is effected or initiated in a sequence from the center nozzle 22 first and at a later predetermined time from the lateral nozzles 20, 24.

As described for example in U.S. Pat. No. 1,056,945, the injection cycle is started by first opening the pin 1040 of the center nozzle 22 and allowing the fluid material 100 (typically polymer or plastic material) to flow up to a position the cavity just before the distally disposed entrance into the cavity 34, 36 of the gates of the lateral nozzles 24. After an injection cycle is begun, the gate of the center injection nozzle 22 and pin 1040 is typically left open only for so long as to allow the fluid material to travel to a position just past the positions at which the downstream gates 34, 36 are located. Once the fluid material has travelled just past the lateral or downstream gate positions 34, 36, the center gate 32 of the center nozzle 22 is typically closed by pin 1040. The lateral or downstream gates 34, 36 are then opened by upstream withdrawal of lateral nozzle pins 1041, 1042. The rate of upstream withdrawal or travel velocity of lateral pins 1041, 1042 is typically carried out such that one or both of the downstream pins 1041, 1042 are first withdrawn upstream over some portion of the full upstream withdrawal path of the pins 1041, 1042 at a first relatively slow speed or velocity and subsequently at a higher speed as described in detail in U.S. Pat. No. 9,011,736, the disclosure of which is incorporated by reference as if fully set forth herein. The center gate 32 and associated actuator 940*f* and valve pin 1040 can remain open at, during and subsequent to the times that the lateral or downstream gates 34, 36 are opened such that fluid material flows into cavity 30 through both the center gate 32 and one or both of the lateral gates 34, 36 simultaneously. When the lateral or downstream gates 34, 36 are opened and fluid material is allowed to first enter the mold cavity into the stream that has been injected from center nozzle 22 past gates 34, 36, the two streams mix with each other. If the velocity of the fluid material is too high, such as often occurs when the flow velocity of injection fluid material through gates 34, 36 is at maximum, a visible line or defect in the mixing of the two streams will appear in the final cooled molded product at the areas where gates 34, 36 inject into the mold cavity. By injecting fluid at a reduced flow rate for a relatively short period of time at the beginning when a downstream gate 34, 36 is first opened and following the time when fluid first enters the first downstream flowing stream, the appearance of a visible line or defect in the final molded product can be reduced or eliminated.

The rate or velocity of upstream and downstream travel of pins 1041, 1042 starting from either the gate closed position or the fully open upstream position is controlled via an actuator controller 16 which controls the rate and direction of flow of pneumatic or hydraulic fluid from the drive system 14 to the actuators 940f, 941f, 942f. A predetermined profile of valve pin or actuator positions versus elapsed time can be input into the actuator controller 16 as the basis for controlling upstream and downstream travel of the valve pin(s) 1041 et al. at one or more selected velocities over the course of travel of the valve pin through the stroke length either upstream or downstream. For example the actuator controller 16 can include instructions that instruct the actuators to move at a reduced velocity relative to one or more selected higher velocities of withdrawal. The higher velocity is typically selected to be the highest velocity at which the system is capable of driving the actuators. Typically, the instructions instruct the actuators to move the valve pins upstream from the gate closed position at a reduced velocity over the course of travel where the tip end of the valve pin restricts the flow of injection fluid 18 to less than the flow would otherwise be if the valve pin were disposed fully upstream, the restriction occurring as a result of the tip end of the valve pin restricting the size of the flow path or opening at or near the gate 32, 34, 36 to a size that is less than the size of the opening or flow path would otherwise be if the valve pin were disposed fully upstream of the gate 32, 34, 36.

In the FIG. 17 prior system, the actuator controller 16 typically receives a signal in real time from a pressure sensor 603 (or 605, 607) disposed in the drive fluid line communicating with the exit of the metering valve 600, the signal being indicative of the reduced drive fluid pressure in line 703 (or 705, 707). In a system where an electric motor apparatus is used in conjunction with an apparatus according to the invention, the actuator controller 16 typically receives a signal in real time indicative of the position of the actuator or the valve pin 1041, 1042. The actuator controller 16 instructs the valve 600 or the electric actuator 941e, 942e to move according to a predetermined profile of drive pressures or electric actuator or valve pin positions that effect the initial slow and subsequent fast moving valve pin velocity protocols described herein.

As shown in the apparatus of FIG. 17 the injection molding machine IMM includes its own internal manufacturer supplied machine controller that generates standardized beginning of cycle gate closed and end of cycle gate open and gate closed machine voltage signals VS typically 0 volts for gate open and 24 volts for gate open (or 0 volts and 120 volts respectively). The standardized machine voltage signals VS are typically sent either directly to the solenoids of a master directional control valve 12 (that controls the direction of flow of actuator drive fluid into or out of the drive chambers of all of the plurality of fluid driven actuators 940f, 941f, 942f) to cause the directional control valve 12 (DCV) to move to a gate closed or gate open actuator drive fluid flow position. Or, the same standardized voltage signals VSC can be sent to the directional control valve 12 via the actuator controller 16 which generates the same standardized voltage signals VSC as the VS signals in response to receipt from a screw position sensor SPSR of a machine screw position signal SPS sent by the injection molding machine IMM to the actuator controller 16, the actuator controller 16 thus generating the same beginning of cycle and end of cycle control voltage signals VSC as the machine IMM can otherwise generate and send VS directly to the directional control valve 12. Thus, where conventional standardized directional control valves 12 are used, the sending of start of cycle and end of cycle signals can be simplified via electrical or electronic signal connections directly to the internal signal generator or controller contained within the injection molding machine.

Electrically powered actuators or electric motors and proportional directional control valves cannot directly receive and utilize a standardized 0 volt (gate closed), 24 volt (gate open) or 0 volt (gate closed) 120 volt (gate open) signals generated by the start and stop cycle controller or signal generator that is typically included in a conventional injection molding machine.

Figure 11:
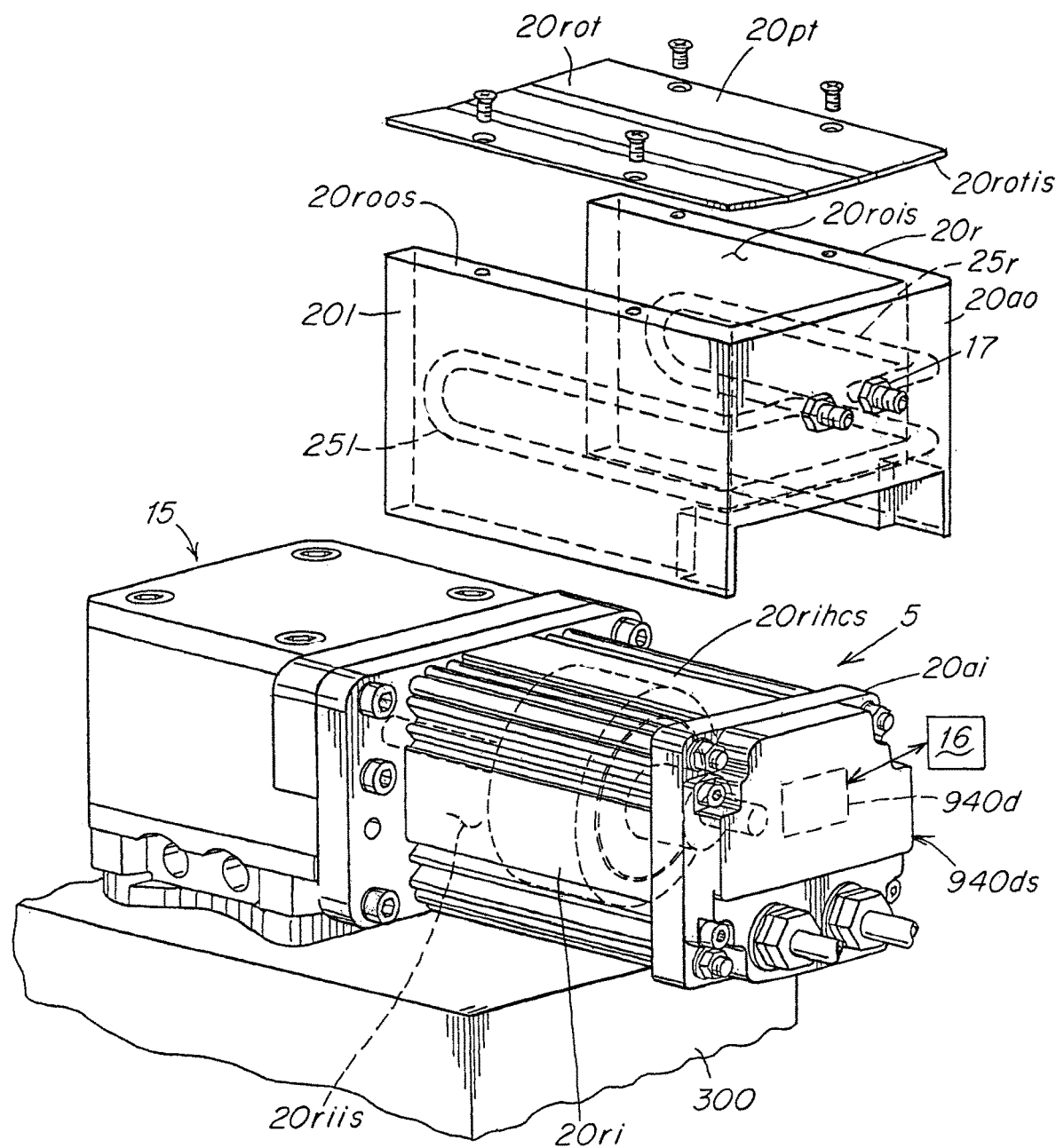
FIG. 11 is an exploded perspective view of the FIG. 9 system.
Figure 19:
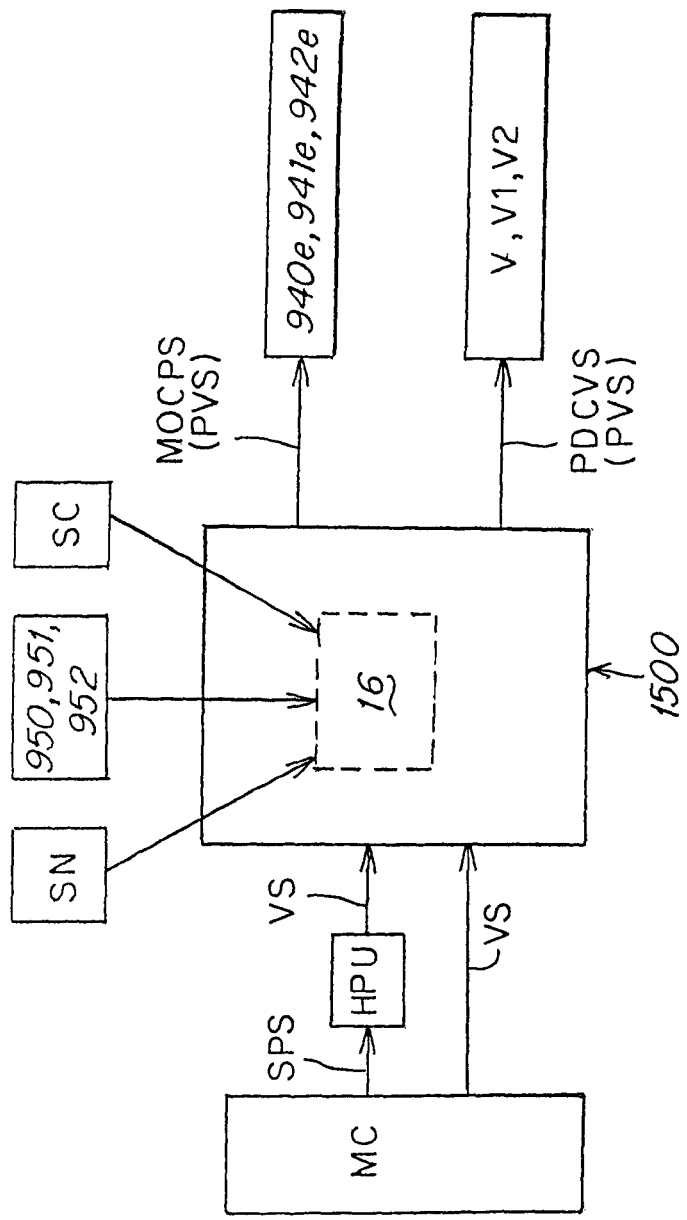
FIG. 19 is a generic schematic diagram of an arrangement of signal communications between an injection molding machine controller, sensors, a signal converter and electric actuators or the interface of a proportional directional control valve.

As shown in a generic schematic form in FIG. 19, an apparatus 10 according to the invention incorporates a signal converter 1500 that can receives standardized injection machine generated start of cycle and end of cycle signals VS (such as 0 volts, 24 volts or 120 volts) and converts the received standardized signal VS to an output power signal MOCPS or PDCVS that is compatible for receipt and use by an electric motor or a proportional direction control valve power signal. The two different actuator based systems, namely electric motor and proportional directional control valve, are shown together in the generic FIG. 11 for illustration purposes only. More typically, a practical implementation of a system as shown in FIG. 11 would be such that the converter 1500 would contain a single microcontroller and an interconnected driver that is configured to work with one or the other of an electric actuator based system or a proportional directional control valve system.

FIG. 18 shows an electric actuator based apparatus in simplified schematic form. As shown in FIG. 1, electric actuators 940e, 941e, 942e each have a rotating rotor 940r, 941r, 942r that is driven by electrical power (typically delivered via the converter 1500) one or more of the precise polarity, amplitude, voltage and strength of which is controlled for input to the motors by actuator controller 16 and the program contained in the actuator controller 16. The rotating rotors 940r, 941r, 942r are interconnected to a translationally movable shaft or other suitable connecting devices 940c, 941c, 942c that interconnect the valve pins 1040, 1041, 1042 to the driven rotors 940r, 941r, 942r. A typical interconnection between a shaft driven by a rotor and the head of a valve pin is shown in U.S. Reexamination Certificate 6,294,122 C1 and U.S. Pat. No. 9,492,960 the disclosures of which are incorporated herein by reference in their entirety as if fully set forth herein.

FIG. 18 illustrates an example of an apparatus 10 according to the invention having a plurality of electric power driven actuators 940e, 941e, 942e, with a central nozzle 22 feeding molten material 18 from an injection molding machine IMM through a main inlet 18a from a barrel of the injection molding machine IMM to a distribution channel 19 of a manifold 40. As in the conventional apparatus of FIG. 1 in the FIGS. 2, 3 apparatus the IMM typically comprises a barrel (not shown) and a controllably rotatably drivable or driven screw BS disposed within the barrel to generate a pressurized supply of injection fluid 18 the pressure of which can be detected by a barrel pressure sensor BPSR which can send a signal indicative of barrel pressure to a controller 16 for use in controlling positioning and velocity of the valve pin 1040, 1041, 1042. The screw BS of the IMM initiates and ends an injection cycle at selected points in time when rotation of the screw BS is started and stopped. The beginning of an injection cycle is typically defined at a first selected point in time when the screw BS is initially rotated from a standstill position or at a time that occurs shortly after the time when the screw is initially rotated. The end of the cycle is typically defined by a selected second time following and after the first selected time at which second time the screw is stopped from rotating and injection fluid 18 is stopped from being injected into the heated manifold 40.

The distribution channel 19 commonly feeds three separate nozzles 20, 22, 24 which all commonly feed into a common cavity 30 of a mold 33. One of the nozzles 22 is controlled by an electric motor actuator 940e and arranged so as to feed into cavity 30 at an entrance point or gate that is disposed at about the center 32 of the cavity. As shown, a pair of lateral nozzles 20, 24 feed into the cavity 30 at gate locations that are distal 34, 36 to the center gate feed position 32.

As with the apparatus of FIG. 17, an injection cycle using the apparatuses of FIGS. 18, 19 typically are used to carry out a cascade or sequential valve gate process where injection is effected in a sequence from the center nozzle 22 first and at later predetermined times from the lateral nozzles 20, 24. The cascade process is discussed in detail as an example only, the invention encompassing configurations and protocols where a single valve pin and valve gate inject into a single cavity.

Also as with the FIG. 17 apparatus, the FIGS. 18,19 apparatuses 10 include an actuator controller 16 that typically includes a program that converts a standard voltage signal (such as 0V, 24V, 120V) received from an injection machine controller MC into an instruction signal IS that is compatible with, receivable and interpretable by a motor driver MD to cause the motor driver MD to generate a motor operating control power signal MOCPS that signals the start of an injection cycle and the end of injection cycle, the start typically being a power signal that drives the motor to withdraw the valve pin 1040, 1041, 1042 from a gate closed position and the end being a power signal that drives the motor to drive the valve pin from an upstream position to a gate closed position. The controller 16 can include a program with instructions that can move and drive the valve pin to and along any predetermined position or velocity profile including at reduced velocities as described above. Reduced velocity in the case of the FIG. 2 apparatus means a velocity that is less than the maximum velocity at which the electric actuator is capable of driving the pin, typically less than about 75% of maximum and more typically less than about 50% of maximum velocity whether upstream or downstream.

The actuator controller 16 typically includes additional instructions that can instruct a valve pin 1041, 1042, 1040 to be driven either upstream or downstream starting from either a fully closed downstream or a fully upstream, gate open position at one or more reduced upstream or reduced downstream velocities over at least the beginning portion of the upstream path of travel of the valve pins 1040, 1041, 1042 or the latter portion of the downstream path of travel of the valve pins toward the gates 32, 34, 36 where the tip end 1142 of the pin 1041 restricts flow of the injection fluid through the gate such as shown and described in U.S. Pat. No. 10,569,458.

In one embodiment, an electric actuator 940e, 941e, 942e is drivably interconnected to a valve pin 1040, 1041, 1042 in an arrangement wherein the electric motor drives the valve pin along the axis A of the valve pin and drives the tip end of the valve pin between a first position where the tip end of the valve pin obstructs the gate 34 to prevent the injection fluid from flowing into the cavity, a second position upstream of the first position wherein the tip end of the valve pin restricts flow 1153 of the injection fluid along at least a portion of the length of the drive path extending between the first position and the second position, and a third maximum upstream position where the injection fluid material flows freely without restriction from the tip end of the pin.

The electric motor 940e, 941e, 942e can be configured and arranged relative to its associated valve pin 1040, 1041, 1042 such as shown in FIG. 3 such that the driven rotor 940r, 941r, 942r and shaft components of the motor are axially aligned with the axis A of the valve pin 1040, 1041. Alternatively, a motor configuration can be used such as in U.S. Pat. No. 9,492,960 and FIGS. 2, 4, 5, 6 where the driven rotor and shaft components are arranged at an angle to the axis A, X FIGS. 2, 4, 5, 6 of the valve pin 1040, 1041, 1042.

In an embodiment such as shown in FIG. 18 an injection cycle can be started by first opening the pin 1040 of the center nozzle 22, and allowing the fluid material 100a (typically polymer or plastic material) to flow up to a position the cavity just before 100b the distally disposed entrance into the cavity 34, 36 of the gates of the lateral nozzles 24, 20. After an injection cycle is begun, the gate of the center injection nozzle 22 and pin 1040 is typically left open only for so long as to allow the fluid material 100b to travel to a position just past 100p the positions 34, 36. Once the fluid material has travelled just past 100p the lateral gate positions 34, 36, the center gate 32 of the center nozzle 22 is typically closed by pin 1040 at some predetermined time during the injection cycle. The lateral gates 34, 36 are then opened by upstream withdrawal of lateral nozzle pins 1041, 1042.

In alternative embodiments, the center gate 32 and associated actuator 940e, and valve pin 1040 can remain open at, during and subsequent to the times that the lateral gates 34, 36 are opened such that fluid material flows into cavity 30 through both the center gate 32 and one or both of the lateral gates 34, 36 simultaneously. When the lateral gates 34, 36 are opened and fluid material 100a is allowed to first enter the mold cavity into the stream that has been injected from center nozzle 22 past gates 34, 36, the two streams mix with each other. If the velocity of the fluid material is too high, such as often occurs when the flow velocity of injection fluid material through gates 34, 36 is at maximum, a visible line or defect in the mixing of the two streams will appear in the final cooled molded product at the areas where gates 34, 36 inject into the mold cavity. By injecting from a downstream gate 34, 36 at a reduced flow rate for a relatively short period of time at the beginning when the gate 34, 36 is first opened and following the time when fluid first enters the flow stream 100a, the appearance of a visible line or defect in the final molded product can be reduced or eliminated.

Figure 10:
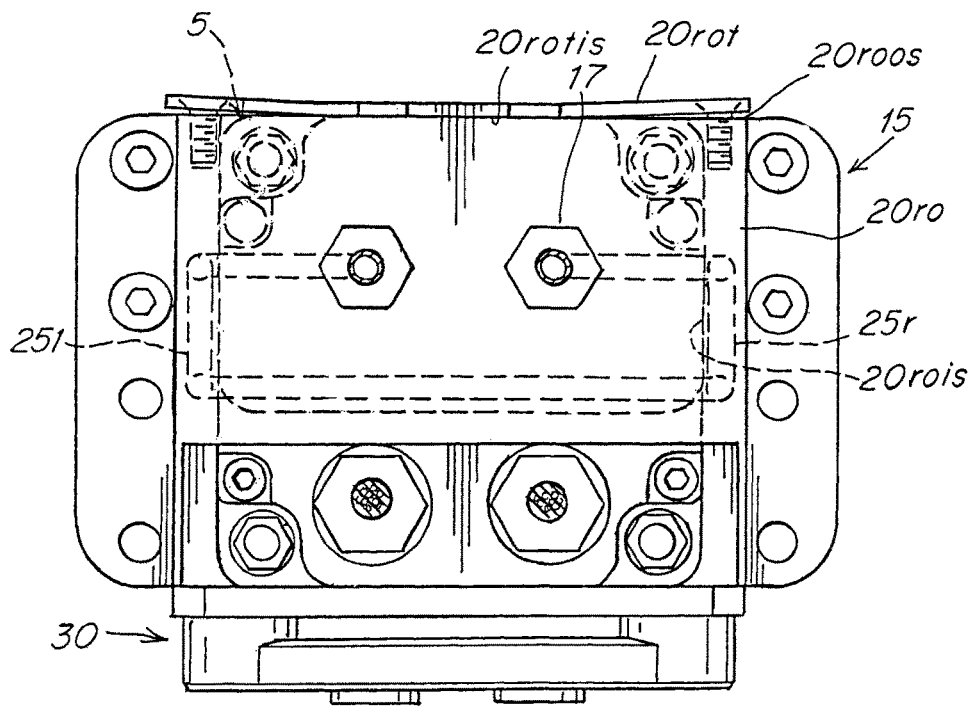
FIG. 10 is an end view of the FIG. 9 apparatus.

A signal converter 1500, FIGS. 18, 19 is provided that enables a user to connect the standardized voltage signal output (VS, VSC) of a conventional IMM controller to the input of the electric motors 940e, 941e, 942e, FIGS. 2, 3, 4, 5, 6, 10, 11, 12 in the same manner that the user interconnected an IMM controller in a conventional apparatus as in FIG. 1 to DCVs. The signal converter 1500 receives and converts received IMM voltage signals (such as 0 volts, 24 volts, 120 volts) to control signals (MOCPS or PDCVS that operate to begin cycle and end cycle). As shown in FIGS. 10, 11, 12 the standardized voltage signals VS can be alternatively generated by an HPU (hydraulic power unit) that is physically separate but interconnected to the machine controller MC, the HPU unit, FIGS. 10, 11, 12 receiving a barrel screw position signal SPS from the machine controller and generating therefrom a corresponding standardized VS signal that is in turn sent to the controller 16 for conversion to an instruction signal IS usable by either a motor driver MD, or by a proportional directional valve driver HVD, PVD, to drive either a motor or a proportional directional valve to initiate and end an injection cycle.

Thus the standard start and stop control signals generated by an IMM (VS, VSC) can operate in conjunction with the converter 1500 to instruct either the electric actuators, 940e, 941e, 942e or the fluid driven actuators 940p, 941p, 942p, to at least initiate or begin an injection cycle (such as by instructing the actuators 940e, 941e, 942e, 940p, 941p, 942p to drive a valve pin upstream from a gate closed position) and to end or stop an injection cycle (such as by instructing the actuators 940e, 941e, 942e, 940p, 941p, 942p to drive a valve pin downstream from a gate open position into a gate closed position).

Most preferably the physical or mechanical electric signal connectors that are typically used to connect a wire or cable from the IMM (or machine controller MC) to the signal conversion device 1500, are the same physical or mechanical connectors that are used in conventional apparatuses to connect the IMM (or machine controller MC) to the DCVs of a conventional apparatus as described with reference to FIG. 10.

Figure 20:
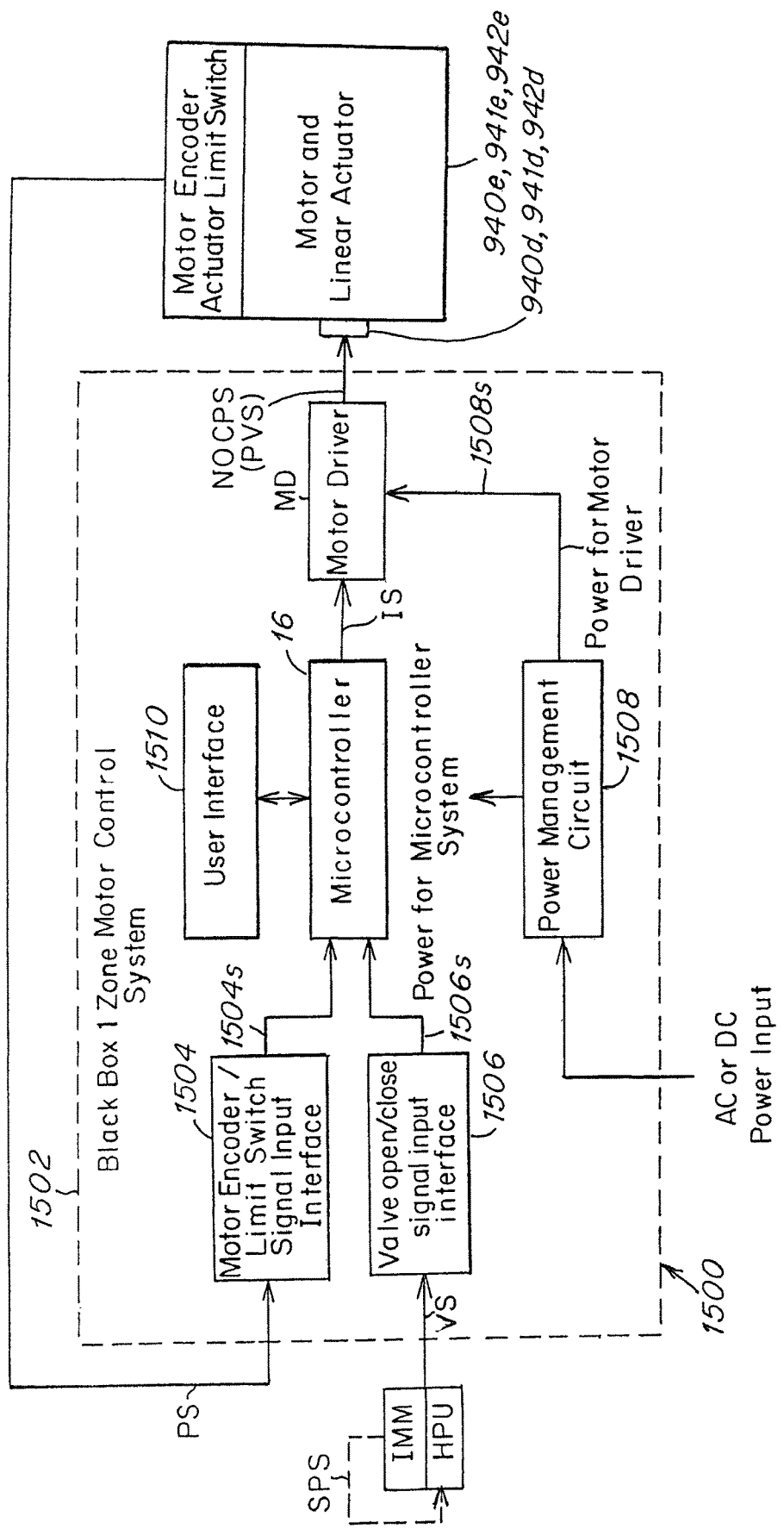
FIG. 20 is a schematic diagram of an arrangement of signal communications between an injection molding machine controller, position sensors, a signal converter and electric actuators.
Figure 21:
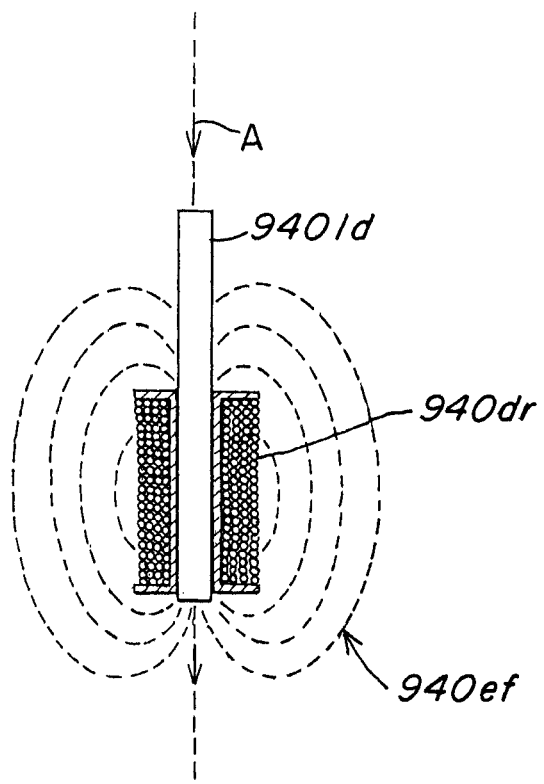

As shown in FIGS. 18, 19, 20 the signal output VS of the IMM can be connected directly to signal converter 1500 which converts the VS signal into a motor open close power signal MOPCS or a proportional directional control valve signal PDCVS that is compatible with and processable by the motors 940e, 941e, 942e or the proportional directional control valves V, V1, V2. Alternatively, the signal output of the IMM of the machine controller MC of the FIG. 10, 11, 12 embodiment can comprise a barrel screw position signal SPS that is sent to an intermediate HPU unit by a screw position sensor SPSR.

The MOCPS and PDCVS signals include signals that correspond to the VS signals that operate to affect the beginning and end of an injection cycle.

Typically the FIG. 18 apparatus 10 includes one or more position sensors, 950, 951, 952 or other sensors, SN, SC that detect a selected condition of the injection fluid 18 in one or more of the manifold fluid flow channel 19, a nozzle flow channel 42, 44, 46 or in the cavity 30 of the mold 33.

The actuator controller 16 can include a program that receives and processes a real time signal indicative of a condition of the injection fluid 18 or a component of the apparatus (10) such as rotational position of a rotor 940r, 941r, 942r or axial linear position of a valve pin 1040, 1041, 1042. The real time signals sent to and received by the actuator controller 16 are generated by one or more of position sensors 950, 951, 952 or fluid condition sensors SN, SC. The sensors detect and send a signal to the actuator controller that is typically indicative of one or more of rotational position (sensors 950, 951, 952) of a rotor 940r, 941r, 942r or of linear axial position of a valve pin 1040, 1041, 1042. The fluid condition sensors typically comprise one or more of a pressure or temperature sensor SN that senses injection fluid 18 within a manifold channel 19 or a nozzle channel 42, 44, 46 or senses pressure or temperature of the injection fluid SC within the cavity 30 of the mold 33.

The actuator controller 16 can include a program that processes the received signal(s) from one or more of the sensors 950, 951, 952, SN, SC according to a set of instructions that use the received signals as a variable input or other basis for controlling one or more of the position or velocity of the actuators 940e, 941e, 942e or their associated valve pins 1040, 1041, 1042 throughout all or selected portion of the duration of an injection cycle or all or a portion of the length of the upstream or downstream stroke of the actuators 940e, 941e, 942e.

As shown the controller 16 can be included within and comprise a component of the converter 1500, FIGS. 10, 11, 12. Where the converter 1500 includes a controller 16 that includes position and velocity control instructions, the converter 1500 can thus send its machine open close power signals MOCPS (or valve open close signals PDCVS) together with position velocity signals (PVS) to either the electric actuators 940e, 941e, 942e or proportional directional control valves V, V1, V2. The control signals MOCPS and PDCVS thus include a signal that has been converted from and corresponds to one or the other of the converted VS signals received by the converter 1500 from the IMM controller MC or the HPU. The position or velocity control signals PVS can control the position or velocity of the valve pin according to any predetermined profile of pin position or velocity versus time of injection cycle. The form, format, intensity and frequency of the MOCPS, PDCVS and PVS signals are compatible with the signal receiving interface of the electric actuators 940e, 941e, 942e or valves V, V1, V2.

In the embodiments shown in FIGS. 2A, 2B, 2BB, 2C, 2D, 2E, the controllably rotatable shaft of the electric actuator 940 is interconnected downstream to a rotational speed reducing device 46. In the specific embodiment shown, the speed reducing device 46 comprises a strain wave gear that is in turn interconnected to an eccentric pin drive mechanism 940l that converts rotational motion to linear motion of the valve pin 1040. In such an embodiment, the valve pin 1040 can be interconnected to or interengaged with a cam member 600 that is driven eccentrically around an output rotation axis such as the axis 12a of the motor rotor or the axis R3 of the speed reducing, torque increasing device 46. The eccentricity of the cam member 600 enables variable speed and higher torque control over the linear drive movement of the pin 1040 along linear axis A.

In the embodiments of FIGS. 3A, 3B, 13A, 14A, the motor rotor axis is coaxial with the valve pin axis and thus the actuator housing (940h, 941h, 942h) is mounted on, to and in direct heat communicative contact with the cooling device (940mc) via heat insulative mounts (60). The mounts (60) can be adapted to form a heat insulative gap (G') between the cooling device and one or the other or both of the housing (940h) and the electric drive (940d).

Similarly as shown for example in the embodiments of FIGS. 2A through 2E where the motor rotor axis (Y) is arranged non coaxial relative to the axis (X) of travel of the valve pin (1040), the mounts (60) can be adapted to form a gap (G') between the cooling device (940mc) and the rotary to linear converter (940l, 941l, 940h, 941lh). In these embodiments, by virtue of the intermediate interconnection of the rotary to linear converter (940l, 941l, 940h, 941lh) between the actuator housing (940h) and mounting of the actuator housing (940h) and electric drive (940d) on or to the cooling device (940mc) via mounting of the rotary to linear converter (940l, 940lh) on or to the cooling device (940mc), the mounts (60) also effectively form a heat insulative gap (G'), FIG. 2BB, between the cooling device (940mc) and one or the other or both of the housing (940h) and the electric drive (940d) as well as the rotary to linear converter (940l, 940lh, 9411, 9411h).

The specific strain wave gear and downstream eccentric rotary to linear drive mechanism of FIGS. 2A to 2E is described in detail in U.S. international application publication WO2019/100085 A1, the disclosure of which is incorporated by reference in its entirety as if fully set forth herein.

As shown in FIG. 2D, the converter 940l can comprise a mount or alignment support 40a and a sled or slide 43 to which is interconnected a valve pin 100. The alignment support 40a has a guide surface 40as against which a complementary surface 43s of the sled or slide 43 slides as the sled 43 is driven reciprocally along a linear path A by the eccentric drive components that include the cam member 47. The sled 43 has freely rotatably wheels 43r that facilitate upstream downstream sliding of the sled along surface 40as. In an alternative embodiment, wheels 43r are not necessary and the lateral surface 43s can be adapted to slide directly against surface 40as without wheels. The alignment support 40a is attached to a rotation speed reducer 46. The converter 940l is mounted as shown to the heated manifold 60.

The converter 940l includes a drive or mounting wheel or disc 500 having a rotational center 500c to which is axially attached or interconnected the rotatable drive shaft 12 of the actuator 940 either directly or indirectly via rotatably interconnected elongated shaft 20, 20f or a connector shaft such as a splined shaft 42s. The electrically powered rotatably driven rotor or drive shaft 12 of the motor is rotatably interconnected to the center 500c of the drive wheel or disc 500 of the rotary to linear converter 940l mechanism. An eccentrically mounted cam member 600, typically a freely rotatable disc or wheel, is mounted to the rotatably driven disc or wheel 500 a selected eccentric off center distance ED from the rotational center 500c of the driven wheel or disc 500.

The electrically powered drive of the motor rotor 12 drivably rotates R3 the drive wheel 500 at a controllably selectable speed and direction. As shown, the drive wheel 500 of the converter 940l is rotatably driven, the eccentrically mounted cam member 600 rotates R3 around the center 500c of the drive wheel 500. As shown, the converter 940l includes a slide or sled 43 that is provided with a cam slot 43sl that is attached to the support 40a in an arrangement such that an outside circumferential surface 600cs, of the cam member 600 engages a complementary interior cam surface 43ss of the slide or sled 43 member. The cam surface 43ss of the slide 43 is configured and adapted relative to the diameter D of the cam member 600 and the eccentric distance ED to enable the outside surface 600cs of the cam member 600 to forcibly engage the interior surface 43ss of the slide 43 and thus cause the slide 43 to be forcibly driven in a linear direction up and down or back and forth in or along a linear direction or axis A, FIGS. 5-9 as the cam member 600 is eccentrically drivably rotated R3 around the center of driven disc or wheel member 500. As shown, valve pin 100 is fixedly attached to the driven slide or sled member 43 in an arrangement such that the valve pin 100 is linearly driven together with the linear movement A of the slide 43.

Because of the eccentric mounting of the cam member 600, the linear or axial speed, A31, A32, A33 of the valve pin 1040 and sled 43 along the linear path A varies A31, A32, A33 according to the rotational or angular position of the cam member 600 during the course of a constant rotational speed R3. The linear or axial speed A32 is at a maximum when the cam member 600 is at the ninety degree rotational position and at a lesser speed when the cam member 600 is at the 45 degree position and the 135 degree rotational position.

Conversely because of the eccentric mounting of the cam member 600, the torque force, exerted by the eccentric cam 600 on the valve pin 1040 and sled 43 along the linear path A varies according to the rotational or angular position of the cam member 600 the rotational speed R3 is constant. The torque force is at a minimum when the cam member 600 is disposed at the ninety degree rotational position and at a higher torque when the cam member 600 is at the 45 degree position and the 135 degree rotational position.

The absolute highest torque position is a position where the cam is disposed in the absolute maximum moment position which is typically the 0 degree position, or the 180 degree position.

Rotation of the cam member 600 can be limited to travelling through an arc segment that is something less than the full 360 degrees that the shaft or output device would otherwise rotate, such as between 70 degrees above and below the 90 and 270 degree positions, most preferably between 40 degrees above and below the 90 and 270 degree positions.

Figure 6:
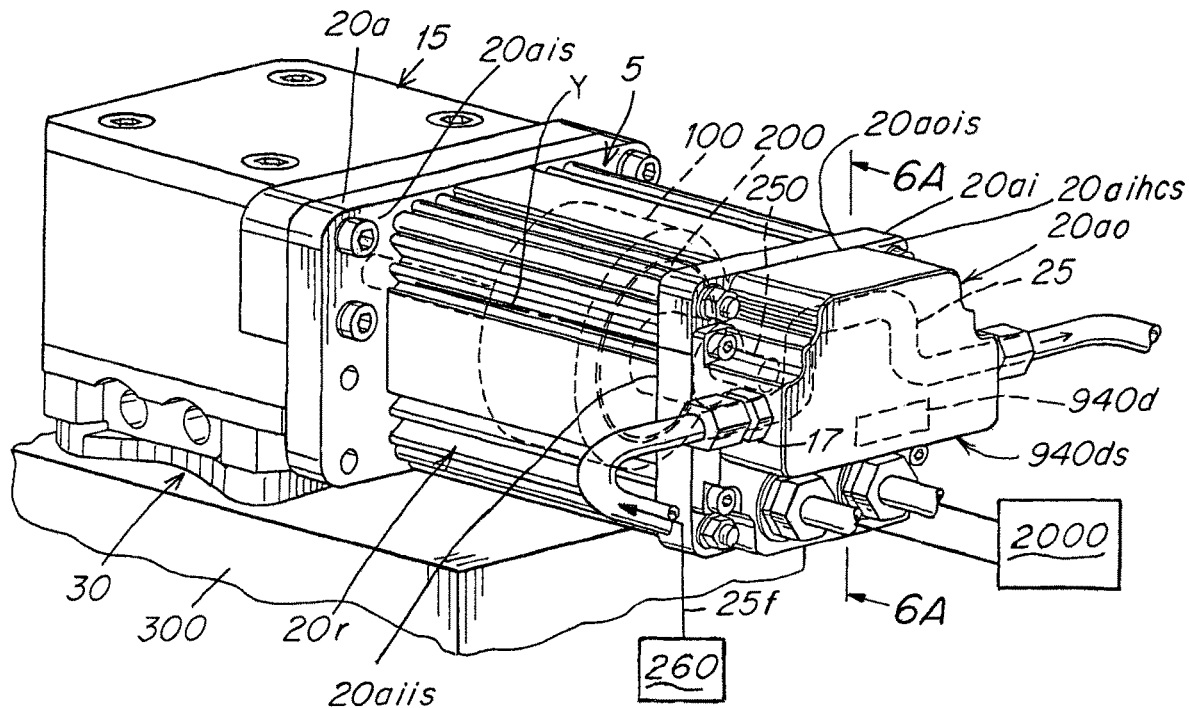
FIG. 6 is a top rear left perspective view of an injection molding system similar to the FIG. 1 system showing a specific configuration of a distal end housing cooling component with a specific configuration of actively cooled channels incorporated into the body of the component.
Figure 6A:
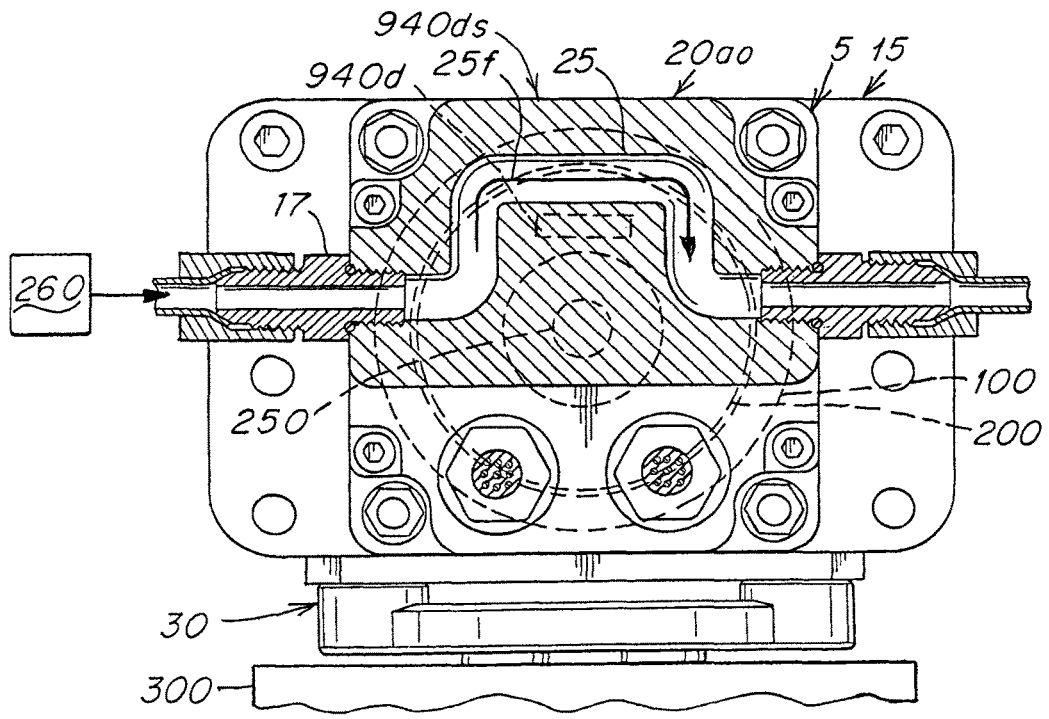
FIG. 6A is a sectional end view of the FIG. 6 system along lines 6A-6A showing details of the distal end cooling housing component.
Figure 6B:
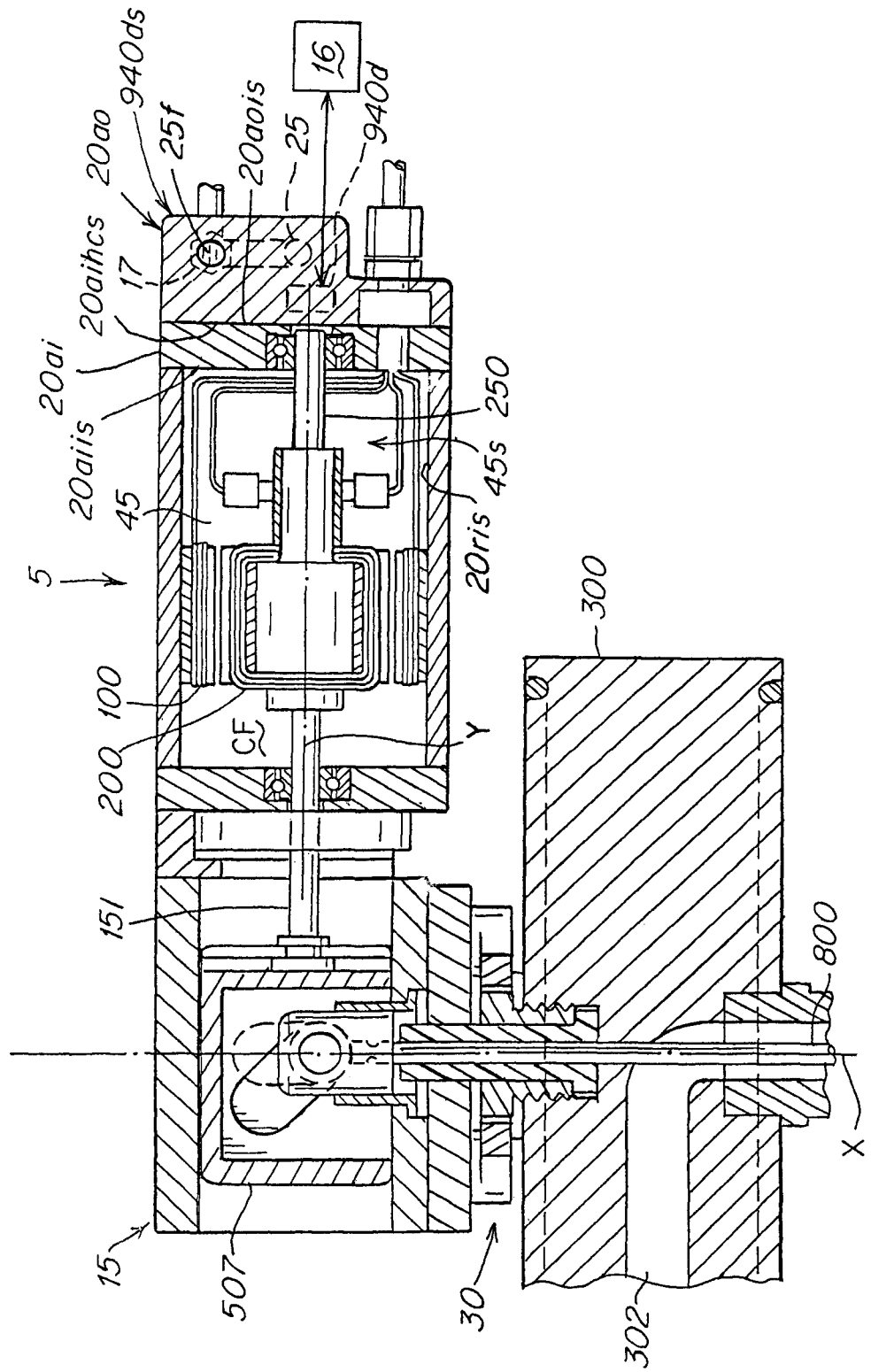
FIG. 6B is a side sectional view of the FIG. 6 injection molding system showing details of the rotor and driver, stator and armature, components and the manner in which they are mounted within the actuator housing.
Figure 7:
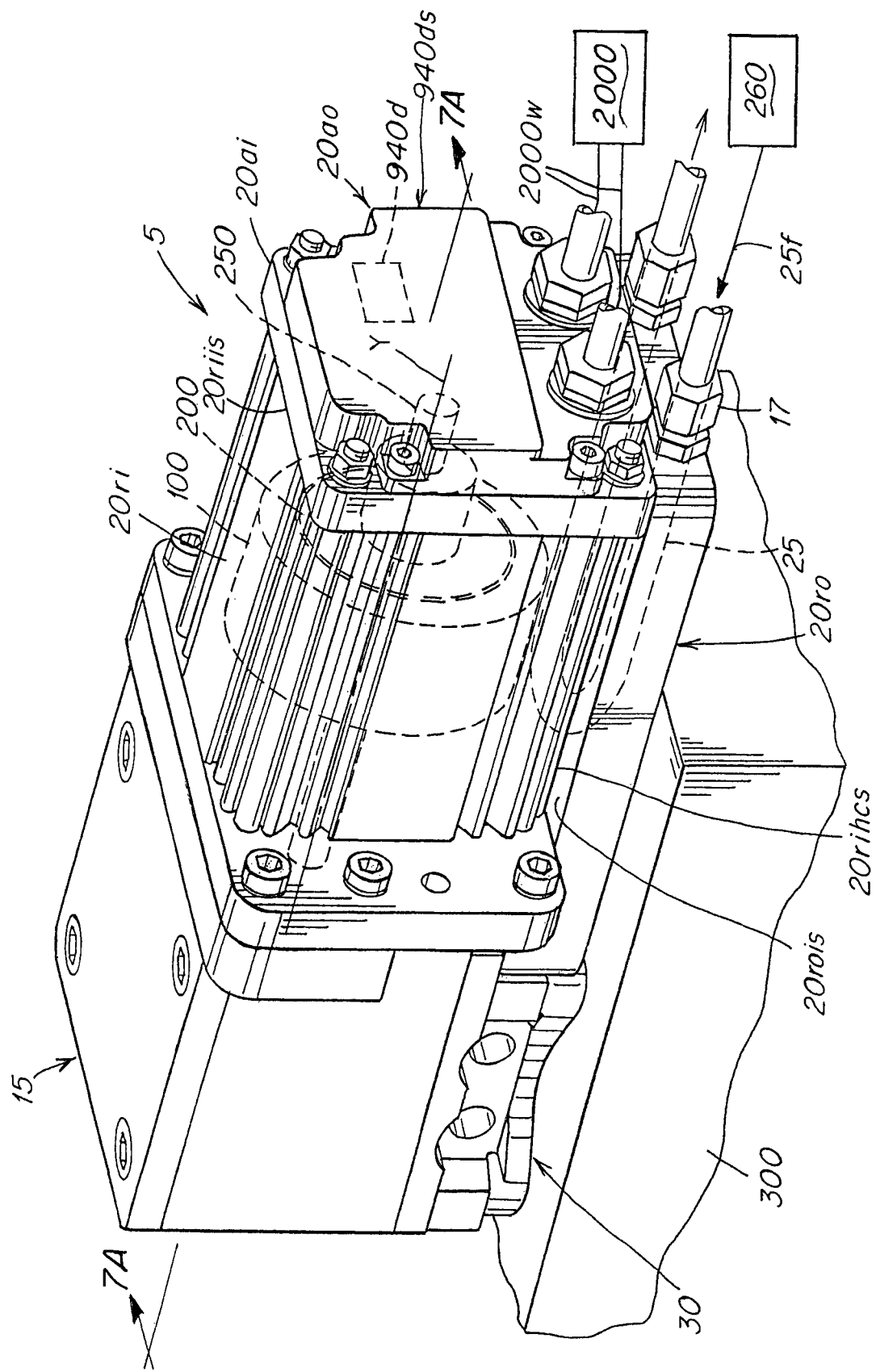
FIG. 7 is a top left rear perspective view of an injection molding system with the housing cooling component disposed and extending along a bottom radial wall of the housing with actively cooled cooling channels disposed within the radial wall.
Figure 7A:
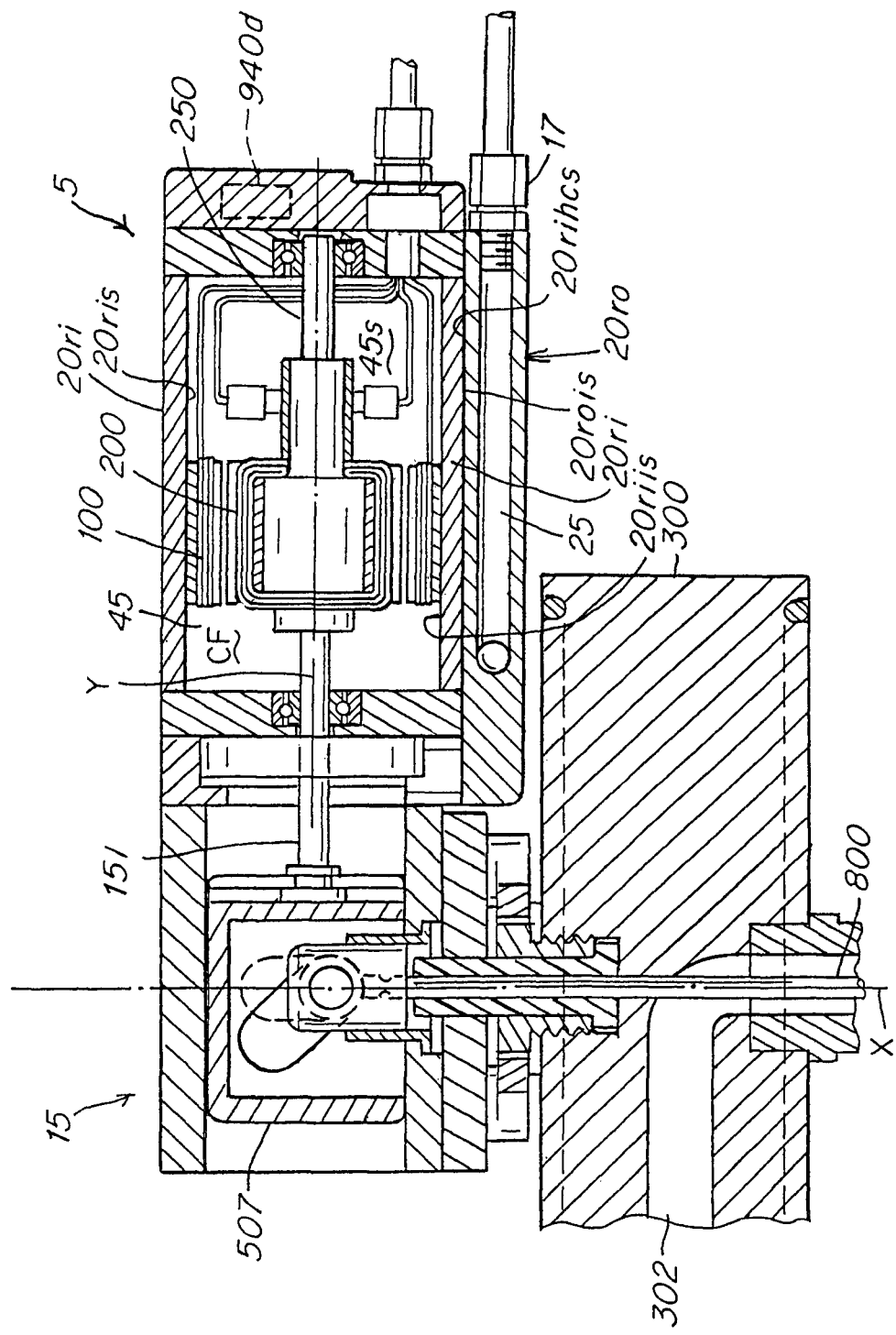
FIG. 7A is a side sectional view of the FIG. 7 system along lines 7A-7A of FIG. 7.

The cam device (600) is eccentrically disposed or mounted off center a selected distance (ED, R) from the output rotation axis (12a, R3a) in an arrangement such that when the shaft (12) or rotation device (16, 430, 500) is rotatably driven, the cam member (600) is eccentrically rotatably drivable around the output rotation axis (12a, R3a) to selectable angular positions above and below either a 270 degree position or a 90 degree position, FIGS. 6A, 6B, 6C.

In such a preferred embodiment, a controller (16) is interconnected to the shaft (12) or output rotation device (16, 430, 500), the controller (1000) can include an algorithm that controllably limits rotation of the shaft (12) or output rotation device (16, 430, 500) during the course of an entire injection cycle to angular positions between about 70 degrees above and 70 degrees below the 270 degree position, or between about 70 degrees above and 70 degrees below the 90 degree position. A preselected angular position between the 270 or 90 degree position and 70 degrees above defines a fully open valve pin position (PFO) and a preselected angular position between the 270 or 90 degree position and 70 degrees below defines a valve pin position where the gate is closed (PFC).

As shown a slide, sled or linear travel device (43, 40,) is adapted to guide the valve pin along a linear path of travel (A, AS). The rotary to linear converter device (40, 43) can include stops or linear travel limiters (not shown) that are fixed to the alignment supports 40a of the rotary to linear converter 940l or otherwise fixedly attached relative to the sled 43. The stops are typically mounted and adapted to limit linear travel of the slide or sled 43 such that when the cam member 600 is rotated to a preselected maximum angular position 70 degrees or less above or below the 270 (or 90) degree position, travel of the cam 600 and the valve pin is stopped. Typically, such preselected maximum angular positions above and below the 270 or 90 degree positions are selected so as to define a corresponding preselected valve fully open position (PFO) and a corresponding valve fully closed position (PFC).

The algorithm can controllably limit rotation of the shaft (12) or output rotation device (16, 430, 500) during the course of an entire injection cycle to angular positions between about 40 degrees above and 40 degrees below the 270 degree position or between about 40 degrees above and 40 degrees below the 90 degree position wherein a preselected angular position between 40 degrees above the 270 or 90 degree position defines the fully open valve pin position (PFO) and a preselected angular position 40 below the 270 or 90 degree position defines the valve pin position where the gate is closed (PFC).

An alternative manner of describing how rotation of the cam 600 is limited is that the algorithm of the controller 16, 1000 limits rotation of the shaft (12) or output rotation device (16, 430, 500) to selectable angular positions that create a moment arm M that extends between a selected minimum moment arm M2, and a selected maximum moment arm, M1, the selectable angular positions being between 70 degrees above and 70 degrees below the preselected angular position (270 degrees) that corresponds to the selected maximum moment arm M1. Typically the absolute maximum moment arm M1 exists when the rotational or angular position of the cam 600 is disposed at 270 degrees or 90 degrees, although other angular positions could be preselected to define or correspond to the absolute maximum moment arm position.

As shown the driven wheel or disc component 500 is typically mounted on the forward face 500m of the driven rotating disc or wheel component 700 of a speed reducing device 46 which is reduced in rotational speed relative to the rotational speed of the rotor or drive shaft 12 of the actuator 200.

The rotational speed reducing device 46 can comprise a strain wave gear that includes a rotatable elliptical or other non circular shaped such as a three node containing shaped disk or ring that generates a reduction in rotation speed output relative to the rotation speed of the input rotor. The strain wave gear is typically comprised of three basic components: a wave generator, a flex spline and a circular spline. The wave generator is typically made up of an elliptical or other non circular shaped such as a three node containing shaped disk called a wave generator plug and an outer ball bearing, the outer bearing having an elliptical or other non circular shaped such as a three node containing shape as well. The flex spline is typically shaped like a shallow cup. The circumferential side walls of the spline are very thin, but the bottom is relatively rigid. This results in significant flexibility of the walls at the open end close to the thin wall, and in the closed side being quite rigid and able to be tightly secured to an output shaft. Teeth are positioned radially around the outside of the flex spline. The flex spline fits tightly over the wave generator, so that when the wave generator plug is rotated, the flex spline deforms to the shape of a rotating ellipse or other non circular shape such as a three node containing shape and does not slip over the outer elliptical or other non circular shaped such as a three node containing shaped ring of the ball bearing. The ball bearing lets the flex spline rotate independently to the wave generator's shaft. The circular spline is a rigid circular ring with teeth on the inside. The flex spline and wave generator are placed inside the circular spline, meshing the teeth of the flex spline and the circular spline. Because the flex spline is deformed into an elliptical or other non circular shaped such as a three node containing shape, its teeth only actually mesh with the teeth of the circular spline in two regions on opposite sides of the flex spline (located on the major axis of the ellipse or other non circular shaped such as a three node containing shape).

As the wave generator plug rotates, the flex spline teeth which are meshed with those of the circular spline change position. The major axis of the flex spline's ellipse or other non circular shaped such as a three node containing shape rotates with wave generator, so the points where the teeth mesh revolve around the center point at the same rate as the wave generator's shaft. The key to the design of the strain wave gear is that there are fewer teeth (often for example two fewer) on the flex spline than there are on the circular spline. This means that for every full rotation of the wave generator, the flex spline would be required to rotate a slight amount (two teeth in this example) backward relative to the circular spline. Thus the rotation action of the wave generator results in a much slower rotation of the flex spline in the opposite direction. For a strain wave gearing mechanism, the gearing reduction ratio can be calculated from the number of teeth on each gear.

The apparatus most preferably includes a position sensor 950, 951, 952 that senses a rotational position of the rotor 12 of the electric actuator or motor 200 or a position sensor that senses the linear position of the valve pin 1040 or a linearly moving member such as sled 43 that moves together with linear movement of the valve pin 1040. In the FIGS. 1, 2 embodiment, the position sensor typically comprises an encoder that senses the rotational position of the rotor 12 or a rotating element of the strain wave gear 400 such as the flexible spline 430 which in turn corresponds to the linear position of the pin 1040. The linear position sensor PS can comprise a Hall Effect sensor (HES or H.E.S.) that senses a change in a magnetic field generated by a magnet that is mounted to and linearly moves together with linear movement of the pin 1040, the sensor converting change in magnetic field to position of the valve pin 1040.

In the embodiments shown, the strain wave gear 400 is comprised of the wave generator or thin walled bearing 460 that is mounted within and against the inner circumferential wall of the flex spline 430 that is in turn mounted within the inner splined circumference of a rigid circular spline 448 as shown for example in FIGS. 2C, 2D, 2E. An inner bearing race 464 pressed on the elliptical or other non circular shaped such as a three node containing surface of the hub 472 either having or taking a shape complementary to the cam or elliptical or other non circular shaped such as a three node containing surfaces of the hub 472 and imparting forces 470 through the ball bearings 466 to the complementarily shaped outer race 462 that is also generally elliptical or other non circular shaped such as a three node containing shape and to the flex spline teeth 444, forcing them to mesh with the ring gear teeth 446 as the cam turns on shaft 12.

The input shaft comprises the motor shaft 12 that rotates around the shaft axis 12a, the outer surface of which is compressibly mated with the inner circumferential surface 480 of the shaft receiving bore 474 of the hub of the gear. In the embodiment shown, output shaft or disc being the inner race 414 of an output bearing 410, the interface surface 420 of the inner race 414 being attached to a complementary end surface 432 of the flexspline 430. The strain wave gear as shown is comprised of a housing 400 on which a slewing ring bearing is mounted at the front end. The outer race 412 of the bearing is bolted to the housing and the inner race 414 is part of an armature 418 which is supported by rollers 416. The slewing ring bearing provides superior stability against any forward to backward movement of the armature as it turns in the housing. The forward end or face 422 of the armature has a bolt pattern 424 on which the drive disc 500 is fastened by screws 428 which pass through bolt pattern 502. The cam member 600 is bolted to armature 418 through one of the holes in bolt pattern 502 of the drive disc 500 and is rotated eccentrically a distance ED around output rotation axis R3a. The shoulder bolt 602 clamps a boss 604 to the disc 500 that is drivably rotated around the gear reducer rotation axis. The boss forms an inner race for roller bearings 606. The outer race 608 has an outer surface 600cs that drives the sled 43 up and down. At the rearward end 420 of the armature there is a bolt pattern 426 to which the flex spline 430 is bolted. The flex spline is cup shaped. The forward end 432 is closed and has a bolt pattern 436 for securing the end of the flex spline to the armature by means of clamping plate 436 and bolts 438. The sidewall 440 of the flex spline is thin for flexibility but retains good torsional strength. The rearward end of the cup shape 442 is open to receive the wave generator 460. The exterior surface of the rim has gear teeth 444 which selectively engage teeth 446 on the ring gear 448 as the wave generator rotates. The wave generator is mounted on the motor drive shaft 12 by hub 472. Hub 472 has an aperture 474 lined with compressible wedge shaped sleeves 480. When screws 478 are tightened, they force the clamping ring 476 rearward compressing the sleeves and self-centering and clamping the hub to the shaft 12 without the use of Allen set screws or keyways for smoother operation. The wave generator 460 is composed of an oval shaped cam formed on hub 472 on which is mounted by force fit, a ball bearing assembly with a flexible inner race that is force fit on the cam portion of hub 472. Lobes 482 on the hub form the inner race 464 into a cam with two lobes 468 formed 180 degrees apart in an oval shape. The outer race 462 can be rigid in the form an ellipse or other non circular shaped such as a three node containing shape complementary to the elliptical shape or other non circular shaped such as a three node containing shape of the hub 472 and the inner race 464 or can be thin and flexible so it can conform to the shape of the cam such that it projects outward (arrows 470) together with ball bearings 466 as the shaft 12 rotates, to force the gear teeth 444, 446 to mesh at locations 450. The teeth 444 at locations 452 flex inward after the lobes have passed to allow clearance for one or more of the teeth 444 to skip the ring gear teeth 446 and allow the flex spline 430 to rotate in relation to the ring gear 448 as dictated by the gear ratio and number of teeth.

The nature of the arrangement of the operative components (wave generator, flex spline, circular spline) of the strain wave gear 46, 400 in a nested fashion provide a physical device depth GD, diameter DIA or physical size that is adapted to be compact and space efficient enough or sufficient to enable the device to be mounted to the housing of the rotary to linear converter 40, and to be readily mountable to and dismountable from, alone or together with the rotary to linear converter, either one or the other of the top clamping plate and the heated manifold.

Alternatively the speed reducing, torque increasing device can comprise an assembly such as a worm gear assembly, a spur gear assembly), a planetary gear assembly where the rotor 12 of the motor is connected to and rotates the highest speed rotating gear or gear tooth containing component of the assembly and the intermediate shaft is connected to and rotated by the highest rotating gear or gear tooth containing component of the assembly to effectively reduce the rotational speed and increase the torque output of the rotor 12 that is transmitted to the output shaft that is driven at a reduced speed and higher torque. Other assemblies such as helical gear assemblies, or belts and pulley arrangements and assemblies can be used to affect such speed changing and torque changing.

As used in this application with regard to various monitoring and control systems, the terms "controller," "component," "computer" and the like are intended to refer to a computer-related entity, either hardware, a combination of hardware and software, software, or software in execution. For example, a component or controller may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Claimed methods of the present invention may also be illustrated as a flow chart of a process of the invention. While, for the purposes of simplicity of explanation, the one or more methodologies shown in the form of a flow chart are described as a series of acts, it is to be understood and appreciated that the present invention is not limited by the order of acts, as some acts may, in accordance with the present invention, occur in a different order and/or concurrent with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In various embodiments of the invention disclosed herein, the term "data" or the like means any sequence of symbols (typically denoted "0" and "1") that can be input into a computer, stored and processed there, or transmitted to another computer. As used herein, data includes metadata, a description of other data. Data written to storage may be data elements of the same size, or data elements of variable sizes. Some examples of data include information, program code, program state, program data, other data, and the like.

As used herein, computer storage media or the like includes both volatile and non-volatile, removable and non-removable media for storage of information such as computer-readable instructions, data structures, program modules, or other data. Computer storage media includes RAM, ROM, EEPROM, FLASH memory or other memory technology, CD-ROM, digital versatile disc (DVDs) or other optical disk storage, magnetic cassettes, magnetic tape, magnetic disk storage or other magnetic storage devices, or any other medium which can be used to store desired information and which can be accessed by the computer.

The methods described herein may be implemented in a suitable computing and storage environment, e.g., in the context of computer-executable instructions that may run on one or more processors, microcontrollers or other computers. In a distributed computing environment (for example) certain tasks are performed by remote processing devices that are linked through a communications network and program modules may be located in both local and remote memory storage devices. The communications network may include a global area network, e.g., the Internet, a local area network, a wide area network or other computer network. It will be appreciated that the network connections described herein are exemplary and other means of establishing communications between the computers may be used.

A computer may include one or more processors and memory, e.g., a processing unit, a system memory, and system bus, wherein the system bus couples the system components including, but not limited to, the system memory and the processing unit. A computer may further include disk drives and interfaces to external components. A variety of computer-readable media can be accessed by the computer and includes both volatile and nonvolatile media, removable and nonremovable media. A computer may include various user interface devices including a display screen, touch screen, keyboard or mouse.

A "controller," as used herein also refers to electrical and electronic control apparatus that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position. In addition, although fluid driven actuators are employed in typical or preferred embodiments of the invention, actuators powered by an electric or electronic motor or drive source can alternatively be used as the actuator component.

The actuator controller 16 typically includes additional instructions that can instruct a valve pin 1041, 1042, 1040 to be driven either upstream or downstream starting from either a fully closed downstream or a fully upstream, gate open position at one or more reduced upstream or reduced downstream velocities over at least the beginning portion of the upstream path of travel of the valve pins 1040, 1041, 1042 or the latter portion of the downstream path of travel of the valve pins toward the gates 32, 34, 36 where the tip end 1142 of the pin 1041 restricts flow of the injection fluid through the gate such as shown and described in U.S. Pat. No. 10,569,458.

In one embodiment, an electric actuator 940, 941, 942 is drivably interconnected to a valve pin 1040, 1041, 1042 in an arrangement wherein the electric motor drives the valve pin along the axis A of the valve pin and drives the tip end of the valve pin between a first position where the tip end of the valve pin obstructs the gate 34 to prevent the injection fluid from flowing into the cavity, a second position upstream of the first position wherein the tip end of the valve pin restricts flow 1153 of the injection fluid along at least a portion of the length of the drive path extending between the first position and the second position, and a third maximum upstream position where the injection fluid material flows freely without restriction from the tip end of the pin.

In an embodiment such as shown in FIG. 1 an injection cycle can be started by first opening the pin 1040 of the center nozzle 22, and allowing the fluid material 100a (typically polymer or plastic material) to flow up to a position the cavity just before 100b the distally disposed entrance into the cavity 34, 36 of the gates of the lateral nozzles 24, 20. After an injection cycle is begun, the gate of the center injection nozzle 22 and pin 1040 is typically left open only for so long as to allow the fluid material 100b to travel to a position just past 100p the positions 34, 36. Once the fluid material has travelled just past 100p the lateral gate positions 34, 36, the center gate 32 of the center nozzle 22 is typically closed by pin 1040 at some predetermined time during the injection cycle. The lateral gates 34, 36 are then opened by upstream withdrawal of lateral nozzle pins 1041, 1042.

In alternative embodiments, the center gate 32 and associated actuator 940e, and valve pin 1040 can remain open at, during and subsequent to the times that the lateral gates 34, 36 are opened such that fluid material flows into cavity 30 through both the center gate 32 and one or both of the lateral gates 34, 36 simultaneously. When the lateral gates 34, 36 are opened and fluid material 100a is allowed to first enter the mold cavity into the stream that has been injected from center nozzle 22 past gates 34, 36, the two streams mix with each other. If the velocity of the fluid material is too high, such as often occurs when the flow velocity of injection fluid material through gates 34, 36 is at maximum, a visible line or defect in the mixing of the two streams will appear in the final cooled molded product at the areas where gates 34, 36 inject into the mold cavity. By injecting from a downstream gate 34, 36 at a reduced flow rate for a relatively short period of time at the beginning when the gate 34, 36 is first opened and following the time when fluid first enters the flow stream 100a, the appearance of a visible line or defect in the final molded product can be reduced or eliminated.

A linear actuator that effects direct linear drive movement of the drive element such as a rod 940l or plunger 940ld, FIGS. 21, 22, can be used as an alternative to use of a rotary motion or rotor based actuator 940 as described with reference to the embodiments of FIGS. 1 to 12.

One example of a linear actuator is a proportional solenoid as shown in FIG. 24 that effects analog positioning of a solenoid plunger or rod 940ld as a function of coil current contained in the armature or driver 940dr. As shown a solenoid, FIG. 21, or linear motor, FIG. 22, employs a flux carrying geometry that can produce a high starting force on the plunger or rod 940ld to cause the plunger or rod 940ld to be controllably driven along the linear drive axis Y. The resulting force (torque) profile as the solenoid progresses through its operational stroke is nearly flat or descends from a high to a lower value. The solenoid can be useful for positioning, stopping mid-stroke, or for low velocity linear actuation movement of the plunger or rod 940ld, especially in a closed loop control system. The proportional concept is more fully described in SAE publication 860759 (1986) the disclosure of which is incorporated by reference in its entirety as if full set forth herein. Another example of a linear actuator is a linear motor, FIG. 25, that instead of producing torque (rotation) produces a linear force along its drive axis Y. A typical mode of operation is as a Lorentz-type actuator, in which applied force is linearly proportional to applied current and magnetic field. Thus a linear actuator 940 that effects linear driven movement of a rod, plunger or equivalent element 940ld can be employed as an alternative device for interconnection to a valve pin 1040 to effect controllable driven linear movement of the valve pin 1040 along its axis X of reciprocal movement as described hereinabove.

A linear actuator is particularly suited for use in a configuration where the drive axis Y of the actuator and the pin movement axis X are coaxially arranged such as in the embodiments described with reference to FIGS. 3A, 3B, 12E, 12G, 12H, 13A, 13B, 14A and the like. A linear actuator as described can be used to drive any drive member 940l as an alternative to the rotor based actuators described herein.

What is claimed is:

1. An injection molding apparatus, comprising:
a heatable manifold arranged to receive molten injection fluid from an injection molding machine and substantially maintain the molten injection fluid at a selected temperature;
one or more nozzles;
a flow channel formed through the manifold and at least one of the one or more nozzles, the flow channel arranged to pass the molten injection fluid received by the manifold and deliver the molten injection fluid to a gate of a mold cavity;
an electrical drive having an interface arranged to receive and distribute electrical energy in controllably varied amounts during an injection cycle;
a valve pin;
an actuator coupled to the valve pin and arranged to control a flow of molten injection fluid toward the mold cavity by controllably moving the valve pin, the actuator having:
a driver, arranged to receive the controllably varied electrical energy from the electrical drive and drive the actuator in response to the controllably varied electrical energy from the electrical drive; and
an actuator housing that houses the driver, wherein the electrical drive is housed within or by the actuator housing or mounted on or to the actuator housing via a drive mount;
a source of heat absorptive fluid; and
at least one channel formed in or proximate one or the other or both of the actuator housing and the drive mount and sealably interconnected to the source, wherein concurrent the injection cycle, the heat absorptive fluid is routed through the at least one channel in a flow that absorbs heat from one or the other or both of the actuator housing and the drive mount.

2. An apparatus according to claim 1 wherein the drive mount is mounted in heat communication with the actuator housing.

3. An apparatus according to claim 1 wherein one or the other or both of the actuator housing and the electrical drive are in substantial heat communication with the heatable manifold.

4. An apparatus according to claim 1 wherein the at least one channel is disposed within a heat conductive housing body mountable in heat communication with the actuator housing.

5. An apparatus according to claim 1 wherein the at least one channel is disposed within a heat conductive mount mounted in heat conductive communication with the heatable manifold, and wherein one or more of the actuator housing and the electrical drive is mounted in heat conductive communication with the heat conductive mount.

6. An apparatus according to claim 1 further comprising:
a linear travel converter interconnected to the actuator in an arrangement that allows the valve pin to be driven along a linear axis (X) that is either non coaxial or coaxial relative to a drive axis (Y) of the actuator.

7. An apparatus according to claim 6 wherein the at least one channel is disposed within a heat conductive mount mounted in heat conductive communication with the heatable manifold, and the linear travel converter is mounted in heat conductive communication with the heat conductive mount.

8. An apparatus according to claim 1 wherein the actuator further comprises:
a drive member; and
a drive mechanism, the drive mechanism being either a transmission that permits the driver to rotatably drive the drive member linearly via a rotor or a linear drive mechanism that permits the driver to directly drive the drive member linearly.

9. An apparatus according to claim 1 wherein one or the other or both of the actuator housing and the drive mount are comprised, at least in part, of a metal material and mounted in substantially direct metal to metal heat conductive communication with the heatable manifold.

10. An apparatus according to claim 1 wherein the electrical drive includes a pulse-width modulator (PWM) that converts received electrical energy into a reciprocating voltage waveform signal, the reciprocating voltage waveform signal being adapted to drive a corresponding phase-coil of the actuator driver.

11. An apparatus according to claim 7 wherein the linear travel converter further comprises:
a converter housing mounted in direct or indirect heat conductive communication to or with the heatable manifold and the actuator housing.

12. An apparatus according to claim 1, further comprising:
one or more sensors arranged to generate one or more sensor signals indicative of one or more of:
a rotational position of the actuator;
a linear position of the actuator;
a position of a valve pin associated with the actuator;
a pressure of the molten injection fluid within the flow channel;
a temperature of the molten injection fluid within the flow channel of the heatable manifold;
a pressure of the molten injection fluid within a nozzle channel;
a temperature of the molten injection fluid within the nozzle channel;
a pressure of the molten injection fluid within the mold cavity;
a temperature of the molten injection fluid within the mold cavity;
a pressure of the molten injection fluid within a barrel of the injection molding machine; and
a temperature of the molten injection fluid within the barrel of the injection molding machine; and
an actuator controller (16) arranged, in response to at least one of the one or more sensor signals, to direct at least one operation of the actuator (5, 940, 941, 942) or its associated valve pin, the at least one operation including to:
travel during the injection cycle to positions that correspond to a predetermined profile, wherein the predetermined profile is associated with a set of injection fluid pressures, linear or rotational pin positions, linear actuator or valve pin positions, barrel screw positions, barrel pressures or actuator drive fluid pressures corresponding to the at least one of the one or more sensor signals;
withdraw from a closed gate position upstream at a reduced velocity over a selected path of upstream travel;
travel downstream at a reduced velocity over a selected path of downstream travel where a distal tip end of the valve pin travels to a gate closed position; or
travel upstream or downstream to an intermediate position between a gate closed position and a fully upstream position, wherein the valve pin is maintained in the intermediate position for a selected period of time during the injection cycle, and wherein, in the intermediate position, the distal tip end of the valve pin restricts flow of the molten injection fluid to less than a maximum flow.

13. An injection molding method, comprising:

providing an actuator housing adapted to support an electrical drive, wherein supporting the electrical drive includes housing the electrical drive within the actuator housing or mounting the electrical drive on or to the actuator housing via a drive mount;

heating a manifold;

receiving at the manifold a molten injection fluid from an injection molding machine;

substantially maintaining the molten injection fluid at a selected temperature;

receiving the molten injection fluid from the manifold in a flow channel formed through the manifold and at least one nozzle;

delivering the molten injection fluid to a gate of a mold cavity;

distributing, with the electrical drive, electrical energy in controllably varied amounts during the course of an injection cycle to a driver;

driving an actuator in response to the controllably varied electrical energy;

moving a valve pin with the actuator and thereby controlling a flow of molten injection fluid toward the mold cavity;

concurrent the injection cycle, routing a heat absorptive fluid through at least one channel formed in or proximate one or the other or both of the actuator housing and the drive mount; and absorbing heat from one or the other or both of the actuator housing and the drive mount into the heat absorptive fluid.

14. A method according to claim 13, wherein driving the actuator includes:

driving a drive member along a linear drive axis (Y); and driving the valve pin along a non-coaxial pin axis (X).

15. A method according to claim 13, wherein driving the actuator includes:

driving a drive member along a linear drive axis (X); and driving the valve pin along a coaxial pin axis (X).

16. An injection molding apparatus, comprising:

an electrical drive having an interface arranged to receive and distribute electrical energy as controllably varied electrical energy during an injection cycle;

an actuator configured to be driven by a driver, the driver adapted to drive the actuator via the controllably varied electrical energy from the electrical drive;

a drive mount;

a valve pin coupled to the actuator, the valve pin arranged to control a flow of molten injection fluid distributed through a heated manifold toward a mold cavity by controllably moving the valve pin according to the controllably varied electrical energy;

an actuator housing that houses the actuator, wherein the electrical drive is housed within or by the actuator housing or mounted on or to the actuator housing via the drive mount; and at least one channel formed in or proximate one or the other or both of the actuator housing and the drive mount, the at least one channel being sealably interconnected to a source of heat absorptive fluid, wherein concurrent the injection cycle, the heat absorptive fluid is routed through the at least one channel in a flow that absorbs heat from one or the other or both of the actuator housing and the drive mount.

17. An apparatus according to claim 16, comprising:

a heat conductive housing body mountable in heat communication with the actuator housing, the heat conductive housing body having the at least one channel disposed within.

18. An apparatus according to claim 16, comprising:

a heat conductive mount mounted in heat conductive communication with the heated manifold, the heat conductive mount having the at least one channel disposed within; and linear travel converter is mounted in heat conductive communication with the heat conductive mount.

19. An apparatus according to claim 16 wherein the electrical drive includes a pulse-width modulator (PWM) that converts received electrical energy into a reciprocating voltage waveform signal, the reciprocating voltage waveform signal being adapted to drive a corresponding phase-coil of the actuator driver.

20. An apparatus according to claim 17, further comprising:

one or more sensors arranged to generate one or more sensor signals indicative of one or more of:
  a rotational position of the actuator;
  a linear position of the actuator;
  a position of a valve pin associated with the actuator;
  a pressure of the molten injection fluid within the flow channel;
  a temperature of the molten injection fluid within the flow channel of the heatable manifold;
  a pressure of the molten injection fluid within a nozzle channel;
  a temperature of the molten injection fluid within the nozzle channel;
  a pressure of the molten injection fluid within the mold cavity;
  a temperature of the molten injection fluid within the mold cavity;
  a pressure of the molten injection fluid within a barrel of the injection molding machine; and
  a temperature of the molten injection fluid within the barrel of the injection molding machine; and an actuator controller arranged, in response to at least one of the one or more sensor signals, to direct at least one operation of the actuator or its associated valve pin, the at least one operation including to:
  travel during the injection cycle to positions that correspond to a predetermined profile, wherein the predetermined profile is associated with a set of injection fluid pressures, linear or rotational pin positions, linear actuator or valve pin positions, barrel screw positions, barrel pressures or actuator drive fluid pressures corresponding to the at least one of the one or more sensor signals;
  withdraw from a closed gate position upstream at a reduced velocity over a selected path of upstream travel;
  travel downstream at a reduced velocity over a selected path of downstream travel where a distal tip end of the valve pin travels to a gate closed position; or travel upstream or downstream to an intermediate position between a gate closed position and a fully upstream position, wherein the valve pin is maintained in the intermediate position for a selected period of time during the injection cycle, and wherein, in the intermediate position, the distal tip end of the valve pin restricts flow of the molten injection fluid to less than a maximum flow.

* * * * *